(12) United States Patent
Hosoda

(10) Patent No.: US 6,832,038 B1
(45) Date of Patent: Dec. 14, 2004

(54) TIME CODE ARITHMETIC APPARATUS

(75) Inventor: Takaharu Hosoda, Osaka (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 0 days.

(21) Appl. No.: 09/646,889

(22) PCT Filed: Mar. 1, 2000

(86) PCT No.: PCT/JP00/01198

§ 371 (c)(1),
(2), (4) Date: Oct. 6, 2000

(87) PCT Pub. No.: WO00/52694

PCT Pub. Date: Sep. 8, 2000

(30) Foreign Application Priority Data

| Mar. 2, 1999 | (JP) | 11/53955 |
|---|---|---|
| May 20, 1999 | (JP) | 11/140172 |

(51) Int. Cl.⁷ .............................................. H04N 5/91
(52) U.S. Cl. .............................................. 386/65; 386/60
(58) Field of Search ............................... 386/4, 60, 62, 386/52, 65, 47

(56) References Cited

U.S. PATENT DOCUMENTS

| 4,340,916 A | * | 7/1982 | Menezes | 360/72.2 |
|---|---|---|---|---|
| 4,503,470 A | * | 3/1985 | Mita et al. | 386/65 |
| 5,091,899 A |  | 2/1992 | Adachi et al. |  |
| 5,459,830 A | * | 10/1995 | Ohba et al. | 345/473 |
| 5,963,382 A | * | 10/1999 | Abe | 386/65 |
| 5,982,447 A |  | 11/1999 | Nakamura |  |

FOREIGN PATENT DOCUMENTS

| GB | 2287574 | 9/1995 |
|---|---|---|
| JP | 55-32233 | 3/1980 |
| JP | 1-264686 | 10/1989 |
| JP | 7-203345 | 8/1995 |
| JP | 9-161456 | 6/1997 |
| WO | 95/21505 | 8/1995 |

* cited by examiner

*Primary Examiner*—Thai Tran
*Assistant Examiner*—Christopher Onuaku
(74) *Attorney, Agent, or Firm*—Greenblum & Bernstein, P.L.C.

(57) ABSTRACT

A time code arithmetic apparatus having a very simple configuration is disclosed, in which the mode of two time codes is not required to be the drop mode, and the arithmetic operation of the time code flexibly meeting the requirement of all television transmission systems can be performed. Two time codes input through selector circuits A and B are added/subtracted in arithmetic means as a time code of non-drop mode simply based on the add/subtract information and the result of the arithmetic operation Oab is output. For the arithmetic result Oab and the pre-calculation time code, the total number of frames skipped (dropped) during the time lapse frame by frame from 00:00:00.00 o'clock is calculated, and in the case where the total numbers of two types of drop frames are not equal to each other, the arithmetic result Oab and the difference Nb between the two types of drop frames are returned to the selector circuits A and B, and the arithmetic operation is performed again in the arithmetic device.

9 Claims, 11 Drawing Sheets

Fig.3
Conversion from non-drop mode to drop mode time code
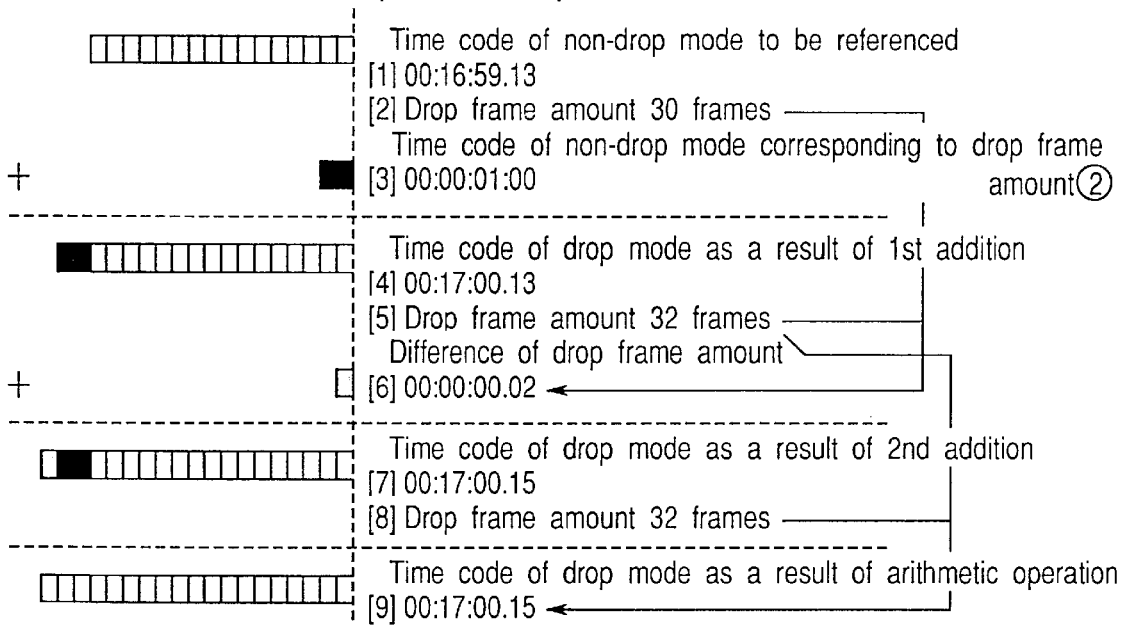
Conversion from drop mode to non-drop mode time code
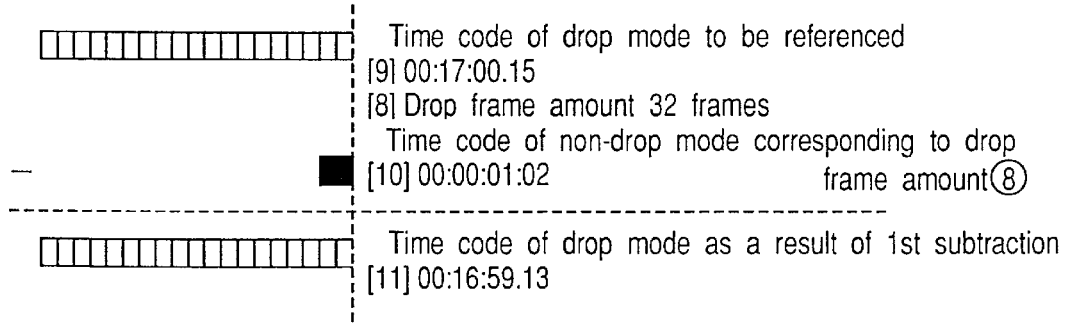

TIME CODE ARITHMETIC APPARATUS

TECHNICAL FIELD

The present invention relates to a time code arithmetic apparatus for calculating the time code written with the video signal of recording media.

BACKGROUND ART

The editing work of the video tape for broadcasting or the nonlinear editing work using the hard disk is carried out accurately based on the absolute address signal recorded in one-to-one relation to the video signal for each frame on the recording-medium (video tape or hard disk). This absolute address signal is called the SMPTE (Society of Motion Picture and Television Engineers)/EBU (European Broadcast Union) time code (hereinafter referred to as the time code) standardized by SMPTE and EBU.

The television transmission system is roughly divided into the NTSC scheme in which a picture for one second configured with 30 images (30 frames) and the PAL and SECAM schemes in which a picture for one second is configured with 25 images (25 frames). The NTSC scheme is employed in Japan, U.S.A. etc., while the PAL and SECAM schemes are used in European countries. The NTSC scheme employs the SMPTE time code reference, and the PAL scheme employs the EBU time code reference.

The unit of the SMPTE/EBU time code is expressed in hours, minutes, seconds and frames, each in two digits for a total of eight digits. The digits of hours, minutes and seconds are counted the same way as the 24-hour clock. The frame digit represents the count 30 for the NTSC scheme, and 25 for the PAL and SECAM schemes, with digits carried up or down to the second digit. Among the TV transmission systems, the NTSC scheme covers 30 frames per second (30 images constituting a picture of one second). Exactly, however, one frame has 33.3 milliseconds, 30 frames per second, and 29.97 Hz per frame (30 Hz: 1000 msec=xHz: 33.3 msec×30 frames). Therefore, the step of the time code is deviated from the real time, though little by little. This deviation, simply calculated, is 108 frames (3.6 sec) per hour, and the long editing work poses the problem of the deviation from the real time. In the PAL or SECAM scheme, the number of frames is 25 per second (25 images constitute a picture for one second). In these television transmission systems, therefore, the real time is coincident with the time code step.

In the NTSC scheme, two modes are specified as the standard for the time code step.

The first mode is called the drop mode, in which in order to obviate the deviation between the real time and time code step for a long time (one minute or longer), two frames (00 frame and 01 frame, hereinafter referred to as the drop frames) from the start of each minute on the minute except for 0, 10, 20, 30, 40 and 50 minutes are skipped (in other words, the frame 29 is followed by not frame 00 but frame 02) thereby to step the time code. In this mode, two drop frames are skipped 54 times per hour, so that 108 frames are skipped per hour in keeping with the real time. Also, in the drop mode, the picture is continuous, but frame 00 and frame 01 are skipped (absent) as the time code corresponding to the picture in one-to-one relation.

The second mode is called the non-drop mode, which is a method based on the assumption that there is a deviation between the real time and the step of the time code o'clock. In this mode, the time code step is not accompanied by any skip of the frame unlike in the drop mode. Only the non-drop mode is employed for the PAL scheme and the SECAM scheme.

Conventionally, a time code arithmetic apparatus for performing the arithmetic operation in time code of drop mode according to the NTSC scheme (hereinafter referred to as the DF time code o'clock) is disclosed in JP-A-7-203345.

For these two types of DF time code o'clock, there are two methods of add/subtract arithmetic operations. One is, as described in prior art of the time code arithmetic apparatus of JP-A-7-203345, is such that the two input time codes counted in drop mode are converted into the time code in non-drop mode (hereinafter referred to as the NDF time code o'clock), respectively, before add/subtract arithmetic operation, and the NDF time code o'clock constituting the calculation result is reconverted to the DF time code o'clock (hereinafter referred to as the drop mode calculation method 1).

The other method is performed by the time code arithmetic apparatus of JP-A-7-203345, in which two input time codes counted in drop mode are not converted into the NDF time code o'clock but the DF time code o'clock itself is used for calculation with the drop frames added thereto (hereinafter referred to as the drop mode calculation method 2).

Now, the arithmetic relation between the DF time code o'clock and the NDF time code o'clock below.

DFt1: DF time code o'clock providing a reference of add/subtract arithmetic operation.

DFt2, DFt3, DFt4: DF time code o'clock

NDFt: NDF time code hour

If DFt2<DFt1<DFt3, DFt4, then $$DFt1-DFt2-\alpha=NDFt \qquad \text{Equation 1}$$

$$DFt1-NDFt-\alpha 2=DFt2 \qquad \text{Equation 2}$$

$$DFt1+NDFt+\alpha 1=DFt3 \qquad \text{Equation 3}$$

$$DFt1+DFt2+\alpha 3=DFt4 \qquad \text{Equation 4}$$

where

α: the number of drop frames skipped from DFt2 o'clock to DFt1 hour

α1: the number of drop frames generated upon the lapse of NDFt o'clock from DFt1 o'clock α2: the number of drop frames generated after returning by NDFt time in the case where the time upon the lapse of the time NDFt from DFt2 o'clock is DFt1.

α3: two frames in the case where a new drop frame is generated in the calculation process of (time DFt1+DFt2 time) and 0 frame in the case where no new drop frame is generated in the same process.

Equation 1 is the relational equation for calculating the NDF time code o'clock corresponding to the number of frames in real time from the difference of two DF time code o'clock. This equation is used for calculating the duration (real editing time) between the edit start time point and the edit end time point in editing on an editing apparatus.

The value α in this equation 1 can be calculated by simply subtracting the number of drop frames skipped during the time from 00:00:00.00 o'clock to DFt2 o'clock from the number of drop frames skipped during 00:00:00.00 o'clock to DFt1 o'clock.

Therefore, this α is the total number of frames dropped in the case where one frame is added each from DFt2 o'clock to DFt1 o'clock.

Also, during the time lapse from Dft2 o'clock to Dft 1 o'clock frame by frame in the case where the result of addition corresponds to a drop frame, +2 frames are skipped and the number of counts is replaced by time data, and then it coincides with the NDFt o'clock.

Equation 2 is the relational equation for calculating the DF time code o'clock obtained when subtracting the NDF time code o'clock representing the number of frames corresponding to an arbitrary real time from DFt1 o'clock. Equation 2 is used, for example, for calculating the DF time code o'clock at the edit start time point before an arbitrary real time after determining the editing end point in editing on an editing apparatus like in equation 1.

The value α2 in this equation 2 is theoretically the total number of frames dropped when subtracting frame by frame until the number of frames becomes zero during the time NDFt from DFt1 o'clock.

This α2, when an attempt to be made to calculate the DFt2 o'clock from the information of DFt1 o'clock and NDFt o'clock, cannot be easily calculated in view of the fact that a new drop frame may occur in the process of calculation, thereby complicating the calculation.

Equation 3 is the relational equation for calculating the DF time code o'clock when adding the NDF time code o'clock representing the number of frames corresponding to an arbitrary real time from the DFt1 time. A method of using equation 3 is used, when editing on an editing apparatus like in equations 1 and 2, for calculating the DF time code o'clock at the edit end point after an arbitrary real time following the determination of the edit start time.

In this equation 3, α1 is theoretically the total number of frames dropped when adding the frames, one by one, for the NDFt o'clock from the DFt1 o'clock.

When an attempt is made to calculate the DFt3 o'clock from the information of DFt1 o'clock and NDFt o'clock, a new drop frame may occur in the process of calculation and therefore this α1 is not easy to calculate, and the calculation is complicated.

Equation 4 is the relational equation for calculating the total of the two DF time code o'clock.

The DFt4 o'clock in this equation 4 indicates the drop mode time the DFt2 time after the DFt1 o'clock. Equation 4, like in equations 1, 2, 3, when editing on an editing apparatus, is used for calculating the DF time code o'clock at the edit end point an arbitrary real time after the determination of the edit start time.

In this equation 4, α3 is carried up to the minute digit from the second digit when the second digit and the frame digit of DFt1 o'clock is added to the second digit and the frame digit of the DFt2 o'clock and assumes two frames at minutes (one to nine minutes) on the minute not 10 minutes, and there is no generation of a carry up to the minute digit. When in carrying up to the order of ten minutes, as it is 10 minutes on the minute, α3 is 0 frame. However, α3 assumes four frames only when the second digit and the frame digit of the DFt1 o'clock and the DFt2 o'clock are both 59 seconds 29 frames.

Now, the "calculation method 1" of the drop mode will be explained.

In the case where the DF time code o'clock at the edit end point is calculated when editing only for an arbitrary edit real time after determining the edit start time on an editing apparatus or the like, assume that the DF time code o'clock× of the edit start point is 1 hour 29 minutes 30 seconds 20 frames and the real edit time is 1 hour 29 minutes 30 seconds and 20 frames (assumed to correspond to the NDF time code o'clock Y'). Then, the correction value of the DF time code o'clock×into the NDF time code o'clock X' is given as Number of drop frames per hour=108 frames
Number of drop frames per 20 minutes=36 (=2×18) frames
Number of drop frames per 9 minutes=18 (=9×2) frames
Thus, the correction value is given as
108+36+18=162 frames=5 seconds 12 frames The NDF time code o'clock X' to be converted is
1 hour 29 minutes 30 seconds 20 frames−5 seconds 12 frames=1 hour 29 minutes 25 seconds 08 frames
This NDF time code o'clock X' and NDF time code o'clock Y' are added as follows

| 1 hour 29 minutes 25 seconds 08 frames | Time code X' |
| + 1 hour 29 minutes 30 seconds 20 frames | Time code Y' |
| 2 hours 58 minutes 55 seconds 28 frames | Time code O' |

Now, the correction value for converting this NDF time code o'clock again to the DF time code o'clock is
Number of drop frames per two hours=216 (=2×108) frames
Number of drop frames per 50 minutes=90 (=5×18) frames
Number of drop frames per 8 minutes=16 (=8×2) frames
Thus, the correction value is given as
216+90+16=322 frames=10 seconds 22 frames The conversion to the DF time code o'clock to be converted is performed in the following manner by adding the correction value to the time code O'.
2 hours 58 minutes 55 seconds 28 frames+10 seconds 22 frames=2 hours 59 minutes 06 seconds 20 frames
In the process of adding the correction value for this conversion, the carry up from 2 hours 58 minutes 59 seconds 29 frames to 2 hours 59 minutes 00 second 02 frames has occurred, and two new drop frames are generated. Therefore, the edit end point finally calculated is
2 hours 59 minutes 06 seconds 20 frames+2 frames=2 hours 59 minutes 06 seconds 22 frames.

This calculation of the DF time code o'clock is originally considerably complicated in the editing apparatus or the like. In the editing apparatus or the like in initial state, therefore, as described above, the calculation method 1 for the drop mode has often been employed in which the DF time code o'clock is provisionally converted to the NDF time code o'clock, and after calculation, converted into the DF time code o'clock again.

Even in this drop mode calculation method 1, however, the calculation must be repeated and thus become complicated since the recalculation is required when a new drop frame occurs in the process of arithmetic operation of adding/subtracting the correction value for conversion from the NDF time code o'clock to the DF time code o'clock. (In the foregoing example, the carry up from 2 hours 58 minutes 59 seconds 29 frames to 2 hours 59 minutes 00 second 02 frames has occurred, and therefore two frames are added again.)

In order to improve the method of equation 4 described above, publication No. JP 55-032233, corresponding to application No. JP-A-53-103851 (Title of the Invention: Arithmetic Apparatus) has been invented, and further JP-A-7-203345 (Title of the Invention: SMPTE/EBU Time Code Arithmetic Apparatus) was invented which operates equivalently to and with a more simplified configuration than the invention of publication No. JP 55-032233, corresponding to application No. JP-A-53-103851.

This SMPTE/EBU time code arithmetic operation apparatuses both employ the drop mode "calculation method 2" as a method of calculating the DF time code o'clock.

FIG. 11 is a block diagram showing [embodiments] of the laid-open patent publication (hereinafter referred to as the prior art technical publication) of the SMPTE/EBU time code arithmetic apparatus according to JP-A-7-203345 described above (hereinafter referred to as the prior art). Table 1 is a truth table of a first correction instruction circuit 15 described in FIG. 11.

The operation of this prior art will be explained with reference to FIG. 11 and Table 1 as an extraction from the prior art technical publication. The DF time code o'clock X, Y to be added/subtracted are input from input terminals 11, 12, and an add/subtract signal ADD/SUB1 for designating add/subtract operation is input from the input terminal 13. From the arithmetic circuit 14, $$Z''' = X \pm Y$$

is calculated.

In this arithmetic circuit 14, assume a carry up C4 from 10 seconds to minute for add operation, a carry up C5 from minute to 10 minutes, a carry down B4 from minute to 10 seconds for subtraction is B4, and a carry down B5 from 10 minutes to minute. According to the truth table of the first correction instruction circuit of Table 1, the first correction is performed by the first correction instruction circuit 15, so that the P frame and the ADD/SUB2 are output to the arithmetic circuit 17 thereby to accomplish the first correction. In other words, $$Z'' = Z''' \pm P \text{ frames}$$

is calculated.

Then, the presence of C4' and the absence of C5' are detected in the second correction instruction circuit 21 from the carry up C4' from 10 seconds to minute and the carry up C5' from minute to 10 minutes by the calculation for correction in the arithmetic circuit 17, and in this case, the correction of +2 frames is effected in the arithmetic circuit 20. Specifically, $$Z' = Z'' + 2 \text{ frames}$$

is calculated.

Next, whether the output Z' of the arithmetic circuit 20 corresponds to a drop frame or not is detected by the drop frame detection circuit 18, and in the case of corresponding to a drop frame, two frames are subtracted in the arithmetic circuit 19 thereby to effect the third correction. In other words, $$Z = Z' - 2 \text{ frames}$$

is calculated, thereby leading to the time code Z as the final result.

In this prior art, when performing the add/subtract operation of the two SMPTE time codes of drop mode, a method is employed for detecting the generation of a new drop frame in the arithmetic process due to the generation of a carry up and a carry down between 10 seconds and 1 minute and between 1 minute and 10 minutes in the arithmetic circuit 14.

For example, the add operation is performed as follows when the time code X is 1 hour 20 minutes 32 seconds 25 frames and the time code Y is 1 hour 30 minutes 29 seconds 15 frames.

```
  1 hour 20 minutes 32 seconds 25 frames
+ 1 hour 30 minutes 29 seconds 15 frames
  ─────────────────────────────────────
  2 hours 51 minutes 02 seconds 10 frames
```

In the process, a carry up occurs between 10 seconds and 1 minute in the arithmetic circuit 14, two drop frames occur due to the skip from 2 hours 50 minutes 59 seconds 29 frames to 2 hours 51 minutes 00 second 2 frames. Therefore, the result of adding two frames to the sum 2 hours 51 minutes 02 seconds 10 frames constitutes the final calculation result 2 hours 51 minutes 02 seconds 12 frames.

Also, in the prior art, the hour digit and the minute digit already contain a drop frame from 00 hour 00 minute 00 second 00 frame. In the arithmetic process, therefore, a calculation similar to that for the hour digit and minute digit is possible, so that a new drop frame can be detected in the arithmetic process of the adde/subtract operation between the DF time code o'clock simply by detecting a carry up and a carry down between 10 seconds and 1 minute and between 1 minute and 10 minutes in the add/subtract operation between the second digits or the frame digits.

The prior art described above, however, is considered as a time code arithmetic apparatus for adding/subtracting the two time codes in drop mode according to the NTSC scheme and a SMPTE/EBU time code arithmetic apparatus failing to meet other TV transmission systems including the NDF time code o'clock of PAL scheme or NTSC scheme.

In the method of detecting the generation of a new drop frame in the arithmetic process of two DF time code o'clock, a first correction instruction circuit 15 is provided in case of generation of a drop frame due to the carry up and the carry down between 10 seconds and one minute and between 1 minute and 10 minutes in the add/subtract operation between second digits or frame digits in the first arithmetic process. In order to calculate Z'' from the drop frame P output from the first correction instruction circuit 15 and the time code Z''' constituting the result of arithmetic operation of the arithmetic circuit 14, the second arithmetic operation is carried out in the arithmetic circuit 17. A second correction instruction circuit 21 is provided in case of generation of a second drop frame in the second arithmetic process.

As described above, in the prior art, correction instruction circuits configured in two stages are included as a means for detecting the generation of a new drop frame, and therefore the size of the time code arithmetic apparatus is increased.

Also, since the arithmetic operation is required for the new drop frame generated after the arithmetic operation, four stages of arithmetic circuits including the arithmetic circuit 14, the arithmetic circuit 17, the arithmetic circuit 20 and the arithmetic circuit 19 are configured, which is another factor for increasing the size of the time code arithmetic apparatus.

DISCLOSURE OF INVENTION

The object of the present invention is to provide a time code arithmetic apparatus having a very simple configuration capable of accomplishing the arithmetic operation thus far incapable of being accomplished by the prior art of JP-A-7-203345 (Title of the Invention: SMPTE/EBU time code arithmetic apparatus), in which the mode of the two input time codes need not to be the drop mode, and the arithmetic operation of the time code is carried out by flexibly meeting the requirement of all the television transmission schemes (drop mode/non-drop mode of PAL.SE-CAM schemes and NTSC scheme).

In order to solve this problem, the present invention is realized based on six basic principles.

The first basic principle relate to the mode of two time codes.

In the prior art, a DF time code o'clock is added/subtracted to and from a reference DF time code o'clock. According to the present invention, in contrast, the NDF code o'clock is added/subtracted.

The original DF time code o'clock is the temporal information in keeping with the real time, in which a drop frame is skipped when counting from 00:00:00.00 o'clock to the real time of DF time code o'clock frame by frame.

If the time is counted frame by frame from 00:00:00.00 o'clock to the DF time code o'clock without skipping a drop frame, the count value represents a NDF time code o'clock.

Based on this principle, the NDF time code o'clock is added/subtracted to and from a reference DFT time code o'clock.

Nevertheless, the drop frame newly occurred in the process of arithmetic operation must be taken into account, and therefore, the NDF time code o'clock corresponding to the total number of drop frames newly generated in this arithmetic process is calculated based on the NDF time code o'clock resulting from the repeated calculation. Then, the DF time code o'clock after the final arithmetic operation is equal to the figure obtained by calculation according to the prior art.

As a result, the time code arithmetic apparatus according to claims 1 to 9 of this invention is configured to add/subtract the NDF time code time to and from the reference DF time code hour.

Also, in the time code arithmetic apparatus according to claims 1 to 9 of the invention, the arithmetic circuit providing the only means for calculating two time code o'clock is adapted to calculate the two input time codes in non-drop mode.

In the case where an input time code constituting a reference of the arithmetic operation is the drop mode, the drop frame newly generated in the process of arithmetic operation is detected in the difference frame number calculation circuit making up means following the arithmetic circuit and an instruction is given for recalculating the time code constituting the result of the arithmetic operation.

In the process, the NDF time code o'clock corresponding to the total number of drop frames detected by the difference frame number calculation means constituting an object of recalculation is added/subtracted to and from the time code making up the result of the arithmetic operation, whereby the time code finally calculated is expressed as a DF time code o'clock.

Now, the concept of calculating calculating two time code o'clock repeatedly will be explained.

The NDF time code o'clock and the DF time code o'clock, when counted frame by frame from 00:00:00.00 o'clock, develops a deviation with time and drop frames are skipped, so that the DF time code o'clock assumes a larger temporal value.

In view of this, this deviation is again add/subtracted to and from the NDF time code o'clock, so that when an arbitrary number of frames is counted from 00:00:00.00 o'clock, the time obtained by adding/subtracting the deviation time to and from the NDF time code o'clock comes to correspond to the DF time code o'clock.

The second basic principle relates to a method of detecting the drop frames newly generated in the process of the arithmetic operation.

By way of explanation, the time code o'clock resulting from the arithmetic operation of adding the DF time code o'clock to the NDF time code o'clock or subtracting the NDF time code o'clock from the DF time code o'clock, i.e., (DF time code o'clock±NDF time code o'clock) to or from the NDF time code o'clock is hereinafter referred to as the semi-DF time code o'clock.

The total number of drop frames (hereinafter referred to as the drop frame amount) is calculated which has been skipped until the lapse from 00:00:00.00 o'clock to each time code o'clock for both a reference pre-calculation DF time code o'clock Ha and a post-calculation semi-DF time code o'clock Oab.

The calculation of the drop frame amount uses the following equation,

Drop frame amount=(hour digit×108)+((minute digit−(minute digit/10))×2) frames  Equation 5

A method is employed for detecting the generation of new drops by detecting the difference of the total (when the difference value is not 0 frame).

This method is different from the complicated prior art detection method in which the drop frames newly generated in the arithmetic process are detected by detecting the carry up and the carry down between 10 seconds and 1 minute and between 1 minute and 10 minutes in the add/subtract operation between second digits and frame digits in the process of arithmetic operation.

The drop frame amount at a reference pre-calculation DF time code o'clock Ha (hereinafter referred to as the pre-calculation drop frame amount Da) is calculated. Similarly, the drop frame amount at a post-calculation semi-DF time code o'clock Oab (hereinafter referred to as the post-calculation drop frame amount) is calculated, and only when the two drop frame amounts fail to be coincident with each other, the generation of a new drop frame is detected.

In the prior art detection method, the drop frames generated newly in the process of arithmetic operation has been fixed to two frames (corresponding to the P frames output from the first correction instruction circuit 15 in FIG. 11, and described in the truth table of Table 1).

According to the first one of the six basic principles of arithmetic operation according to the present invention described above, however, the larger the NDF time code o'clock added/subtracted, the larger the number of drop frames newly generated in the process of arithmetic operation, which number does not assume a fixed value. Therefore, a new detection method has been required.

When adding/subtracting the NDF time code o'clock Hb to and from the reference DF time code o'clock Ha, any difference which may exist between the pre-calculation drop frame amount Da and the post-calculation drop frame amount D indicates that a drop frame(s) has been skipped in the process of adding/subtracting frame by frame the reference DF time code o'clock Ha from 0 frame to the time associated with the total number of frames corresponding to the NDF time code o'clock Hb to be calculated.

When adding/subtracting the NDF time code o'clock Hb to and from the pre-calculation DF time code o'clock Ha in simplified fashion, the post-calculation semi-DF time code o'clock Oab is given by the following relation,

*DF* time code o'clock *Ha* (=*NDF* time code o'clock *NdfHa*+pre-calculation drop frame amount *Da*)±*NDF* time code o'clock *Hb*

Semi-DF time code o'clock Oab (=NdfHa+Da±Hb) It follows that a new drop frame generated in the arithmetic process of adding/subtracting the NDF time code o'clock Hb is not taken into account.

By checking the manner in which the pre-calculation drop frame amount Da inherently existent in the pre-calculation reference DF time code o'clock Ha undergoes a change after arithmetic operation, therefore, the number of frames after the change by the inherently existent pre-calculation drop frame amount Da presents itself in a post-calculation drop frame amount D in view of the fact that the drop frame, if any is existent in the arithmetic process of adding/subtracting the NDF time code o'clock Hb, skipped.

As a result, the drop frames newly generated in the arithmetic process are detected by the change from the pre-calculation drop frame amount Da to the post-calculation drop frame amount D, i.e. the presence or absence of a difference therebetween, while at the same time detecting the number of difference frames.

Now, an explanation will be given below with reference to FIG. 1 for the add operation and FIG. 2 for the subtract operation.

In the case of the add operation, the reference DF time code o'clock is assumed to be 00:16:37.13 o'clock [1] (from equation 5, the pre-calculation drop frame amount [2] is 30 frames), and the NDF time code o'clock to be added is assumed to be 00:02:59.29 o'clock [3] (5399 frames in total), then the first add operation leads to 00:19:37.12 o'clock [4].

In this case, the post-calculation drop frame amount [5] is 36 frames from equation 5, so that the difference between the pre-calculation drop frame amount [2] and the post-calculation drop frame amount [5] before and after the add operation is given as six frame o'clock (00:00:00.06 o'clock [6]).

Since a new drop frame is generated in the carry up from the second digit to the minute digit in the first process of add operation, the repeated add operation is required.

As the second add operation, 00:00:00.06 o'clock [6] corresponding to the difference of the drop frame amount before and after the first add operation is added to the time code 00:19:37.12 o'clock [4] after the first add operation, and in the second add operation, the time code 00:19:37.18 o'clock [7] is led out.

In the second add operation, the post-calculation drop frame amount [8] is 36 frames from equation 5, and there is no difference between the pre-calculation drop frame amount [5] and the post-calculation drop frame amount [8] before and after the second add operation, so that there is no carry up from the second digit to the minute digit in the second process of add operation. In other words, it follows that no new drop frame is generated in the second process of add operation, thereby making it possible to obtain the time code 00:19:37.18 o'clock [9] finally.

The mechanism in which six new drop frames (00:00:00.06 o'clock [6]) are generated in the first add operation described above will be explained below.

In the process of time lapse of the reference DF time code o'clock 00:16:37.13 o'clock [1] frame by frame from 0 frame in the first add operation to the NDF time code o'clock 00:02:59.29 o'clock [3] (5399 frame hours in terms of real frame hours) to be added, the first drop frame is generated upon the lapse from 00:00:22.16 o'clock (676 frame hours in terms of real frame hours) to 00:00:22.17 o'clock (677 frame hours in terms of real frame hours).

After the lapse of 00:00:22.16 hours (676 frame hours in terms of real frame time) from the reference DF time code o'clock 00:16:37.13 o'clock [1], the reference time code o'clock becomes 00:16:59.29 o'clock, while after the lapse of 00:00:22.17 hours (677 frame hours in terms of real frame hours), on the other hand, the reference DF time code o'clock becomes 00:17:00.00. Actually, however, it is 00:17:00.02 o'clock since 00 and 01 frames are drop frames and therefore are skipped.

After that, after the lapse to 00:01:22.15 o'clock (2475 frame hours in terms of real frame time) from 00:01:22.14 o'clock (2474 frame hours in terms of real frame hours), the second drop frame occurs.

After the lapse of 00:01:22.14 hours (2474 frame hours in terms of real frame hours) from the reference DF time code o'clock 00:16:37.13 o'clock [1], the reference time code o'clock becomes 00:17:59.29 o'clock, while after the lapse of 00:01:22.15 hours (2475 frame hours in terms of real frame hours), on the other hand, the reference DF time code o'clock becomes 00:18:00.00. Actually, however, it is 00:18:00.02 o'clock since 00 and 01 frames are drop frames and therefore are skipped.

After that, after the lapse to 00:02:22.13 o'clock (4273 frame hours in terms of real frame hours) from 00:02:22.12 o'clock (4272 frame hours in terms of real frame hours), the third drop frame occurs.

After the lapse of 00:02:22.12 hours (4272 frame hours in terms of real frame hours) from the reference DF time code o'clock 00:16:37.13 o'clock [1], the reference time code o'clock becomes 00:18:59.29 o'clock, while after the lapse of 00:02:22.13 hours (4273 frame hours in terms of real frame hours), on the other hand, the reference DF time code o'clock becomes 00:19:00.00. Actually, however, it is 00:19:00.02 o'clock since 00 and 01 frames are drop frames and therefore are skipped.

In this way, in the time lapse from the reference DF time code of 00:16:37.13 o'clock to the calculation NDF time code of 00:02:59.29 o'clock (corresponding to 5399 frames) frame by frame, three frames (00:17:00:00, 00:18:00.00 and 00:19:00.00) are skipped, and therefore a total of three times of frame drops (two frames of 00, 01 frames for each time) occurs on the minutes (00:17:00.00, 00:18:00.00 and 00:19:00.00). Thus, 6 frames in total are skipped.

Also, by calculating the difference that may occur between the pre-calculation drop frame amount and the post-calculation drop frame amount, the number of frames skipped of the drop frames can be easily calculated in the arithmetic process of adding the NDF time code o'clock to the reference DF time code o'clock.

In the case of subtract operation, assume that the reference DF time code o'clock is 00:16:37.13 o'clock [1] (the pre-calculation drop frame amount [2] is 30 frames from equation 5) and that the NDF time code hours to be subtracted is 00:02:59:29 hours [3] (5399 frame hours in terms of total frame hours). Then, the first subtraction leads to 00:13:37.14 o'clock [4].

In the process, the post-calculation drop frame amount [5] is 24 frames from equation 5, so that the difference between the pre-calculation drop frame amount [2] and the post-calculation drop frame amount [5] before and after the subtract operation is 6 frame hours (00:00:00.06 hours [6]).

Since a new drop frame has occurred in the carry down from the minute digit to the second digit in the first subtract operation, the repeated subtract operation is required.

As the second subtract operation, 00:00:00.06 hours [6] corresponding to the difference of the drop frame amount before and after the first subtract operation is subtracted from the time code 00:13:37.14 o'clock [4] after the first subtract operation, thereby producing the time code 00:13:37.08 o'clock [7] in the second subtract operation.

After this second subtract operation, the post-calculation drop frame amount [8] is 24 frames from equation 5, and there is no difference between the pre-calculation drop frame amount [5] and the post-calculation drop frame amount [8] before and after the second subtract operation, and no carry down occurs from the minute digit to the second digit in the process of the second subtract operation. In other words, no new drop frame has occurred during the second subtract operation. Finally, therefore, the time code 00:13:37.08 o'clock [9] is determined.

Now, the mechanism in which six new drop frames (00:00:00.06 hours [6]) have been generated in the arithmetic process of the first subtract operation as described above will be explained.

While the reference DF time code o'clock 00:16:37.13 o'clock [1] in the first subtract operation is traced back one frame each up to the NDF time code o'clock 00:02:59.29 o'clock [3] (5399 frame hours in real frame hours) subtracted from 0 frame, the first drop frame is generated when 00:00:37.11 o'clock (1121 frame hours in real frame hours) is traced back to 00:00:37.12 o'clock (1122 frame hours in real frame hours).

When the reference DF time code o'clock 00:16:37.13 o'clock [1] is traced back by 00:00:37.11 o'clock (1121 frame hours in real frame hours), the reference DF time code o'clock becomes 00:16:00.02 o'clock, and when it is traced back to 00:00:37.12 o'clock (1122 frame hours in real frame hours), the reference DF time code o'clock is 00:16:00.01 o'clock. Sine 00, 01 frames are drop frames and therefore are skipped, the reference DF time code o'clock becomes 00:15:59.29 o'clock.

After that, when 00:01:37.09 o'clock (2919 frame hours in real frame hours) is traced back to 00:01:37.10 o'clock (2920 frame hours in real frame hours), the second drop frame occurs.

When the reference DF time code o'clock 00:16:37.13 o'clock [1] is traced back by 00:01:37.09 o'clock (2919 frame hours in real frame hours), the reference DF time code o'clock becomes 00:15:00.02 o'clock, and when it is traced back to 00:01:37.10 o'clock (2920 frame hours in real frame hours), the reference DF time code o'clock becomes 00:15:00.01 o'clock. Since 00, 01 frames are drop frames and therefore are skipped, the reference DF time code o'clock becomes 00:14:59.29 o'clock.

After that, when 00:02:37.07 o'clock (4717 frame hours in real frame hours) is traced back to 00:02:37.08 o'clock (4718 frame hours in real frame hours), the third drop frame occurs.

When the reference DF time code o'clock 00:16:37.13 o'clock [1] is traced back to 00:02:37.07 o'clock (4717 frame hours in real frame hours), the reference DF time code o'clock becomes 00:14:00.02 o'clock, and when it is traced back to 00:02:37.08 o'clock (4718 frame hours in real frame hours), the reference DF time code o'clock is 00:14:00.01 o'clock. Since 00, 01 frames are drop frames and therefore are skipped, the reference DF time code o'clock becomes 00:13:59.29 o'clock In this way, there occur total three times of frame drops (two frames of 00, 01 for each time on the minutes (00:16:00.01, 00:15:00.01 and 00:14:00.01) while the reference DF time code o'clock 00:16:37.13 o'clock [1] is traced back one frame each up to the NDF time code o'clock 00:02:59.29 o'clock [3] (5399 frame hours in real frame hours) subtracted from 0 frame. Therefore, a total of 6 frames are skipped.

Also, due to the fact that the difference has developed between the pre-calculation drop frame amount and the post-calculation drop frame amount, it is possible by calculating the difference to easily determine how many drop frames are skipped in the arithmetic operation of subtracting the NDF time code hours from the reference DF time code o'clock.

Now, an explanation will be given of a method of calculating the number of difference frames between the pre-calculation drop frame amount and the post-calculation drop frame amount.

The add operation and the subtract operation each have two calculation methods.

In the add operation 1, assume that when the NDF time code o'clock Hb to be added is added to the reference DF time code o'clock Ha, the semi-DF time code o'clock Oab providing the result of add operation is larger than or equal to DF time code o'clock Ha before add operation in the value of the time information and that the post-calculation drop frame amount D is larger than or equal to the pre-calculation drop frame amount Da. For example, in such a case as

| | |
|---|---|
| 23:59:59.28 o'clock | DF time code o'clock Ha (Da = 2592 frames) |
| + 00:00:00.01 o'clock | NDF time code o'clock Hb |
| 23:59:59.29 o'clock | semi-DF time code o'clock Oab (D = 2592 frames) | or in such a case as

| | |
|---|---|
| 23:51:59.29 o'clock | DF time code o'clock Ha (Da = 2576 frames) |
| + 00:00:00.01 o'clock | NDF time code o'clock Hb |
| 23:52:00.02 o'clock | semi-DF time code o'clock Oab (D = 2578 frames). |

Then, the calculation is carried out from the following equation.

Number of difference frames=post-calculation drop frame amount D−pre-calculation drop frame amount Da     Equation 6

In the add operation 2, assume that when the NDF time code o'clock Hb to be added is added to the reference DF time code o'clock Ha, the semi-DF time code o'clock Oab providing the result of add operation is smaller than the DF time code o'clock Ha before add operation in the value of the time information and that the post-calculation drop frame amount D is smaller than or equal to the pre-calculation drop frame amount Da. For example, in such a case as

| | |
|---|---|
| 23:59:59.29 o'clock | DF time code o'clock Ha (Da 2592 frames) |
| + 00:00:00.01 o'clock | NDF time code o'clock Hb |
| 00:00:00.00 o'clock | semi-DF time code o'clock Oab (D = 0 frame) | or in such a case as

| | |
|---|---|
| 23:59:59.29 o'clock | DF time code o'clock Ha (Da = 2592 frames) |

| | |
|---|---|
| + 23:59:59.29 o'clock | NDF time code o'clock Hb |
| 23:59:59.28 o'clock | semi-DF time code o'clock Oab (D = 2592 frames). |

Then, the calculation is carried out from the following equation.

Number of difference frames=2592−pre-calculation drop frame amount $Da$+post-calculation drop frame amount $D$.  Equation 7

In equation 7, 2592 frames indicate the total number of frames dropped per 24 hours (108 frames per hour×24 hours).

In equation 7, the sum of the drop frame amount existing when one frame each is added from the reference DF time code o'clock Ha to 24:00:00.00 (=00:00:00.00) o'clock and the drop frame amount (post-calculation drop frame amount D) existing when adding one frame each time from 00:00:00.00 o'clock to the post-calculation semi-DF time code o'clock Oab is calculated, thereby calculating the difference in the drop frame amount before and after the arithmetic operation.

In the subtract operation 1, assume that when the NDF time code o'clock Hb to be subtracted is subtracted from the reference DF time code o'clock Ha, that the semi-DF time code o'clock Oab providing the result of the subtract operation is smaller than or equal to the DF time code o'clock Ha before the subtract operation in the value of the time information and that the post-calculation drop frame amount D is smaller than or equal to the pre-calculation drop frame amount Da. For example, assume that

| | |
|---|---|
| 23:59:00.03 o'clock | DF time code o'clock Ha (Da = 2592 frames) |
| − 00:00:00.01 o'clock | NDF time code o'clock Hb |
| 23:59:00.02 o'clock | semi-DF time code o'clock Oab (D = 2592 frames) | or assume that

| | |
|---|---|
| 23:59:00.02 o'clock | DF time code o'clock Ha (Da = 2592 frames) |
| − 00:00:00.01 o'clock | NDF time code o'clock Hb |
| 23:58:59.29 o'clock | semi-DF time code o'clock Oab (D = 2590 frames). |

Then, the calculation is carried out from the following equation.

Number of difference frames=pre-calculation drop frame amount $Da$−post-calculation drop frame amount $D$.  Equation 8

In the subtract operation 2, assume that when the NDF time code o'clock Hb to be subtracted is subtracted from the reference DF time code o'clock Ha, the semi-DF time code o'clock Oab providing the result of the subtract operation is larger than the DF time code o'clock Ha before the subtract operation in the value of the time information and that the post-calculation drop frame amount D is larger than or equal to the pre-calculation drop frame amount Da. For example, assume that

| | |
|---|---|
| 00:00:00.00 o'clock | DF time code o'clock Ha (Da = 0 frame) |
| − 00:00:00.01 o'clock | NDF time code o'clock Hb |
| 23:59:59.29 o'clock | semi-DF time code o'clock Oab (D = 2592 frames) | or assume that

| | |
|---|---|
| 23:59:59:28 o'clock | DF time code o'clock Ha (Da = 2576 frames) |
| − 23:59:59:29 o'clock | NDF time code o'clock Hb |
| 23:59:59.29 o'clock | semi-DF time code o'clock Oab (D = 2576 frames). |

Then, the calculation is carried out from the following equation.

Number of difference frames=2592−post-calculation drop frame amount $D$+pre-calculation drop frame amount $Da$.  Equation 9

In equation 9, 2592 frames indicates the total number of frames dropped per 24 hours (108 frames per hour×24 hours).

In equation 9, the sum of the drop frame amount (=pre-calculation drop frame amount Da) existing when the reference DF time code o'clock Ha is traced back to 00:00:00.00 (=24:00:00.00) o'clock frame by frame and the drop frame amount (=2592−post-calculation drop frame amount D) existing when traced back one frame each time from 00:00:00.00 (=24:00:00.00) o'clock to the post-calculation DF time code o'clock Oab is calculated, thereby calculating the difference in the drop frame amount before and after the arithmetic operation.

In the non-drop mode of PAL.SECAM or NTSC scheme, no drop frame exists, and therefore the difference of the drop frame amount before and after arithmetic operation is not detected.

The third basic principle relates to the recalculation due to the drop frames newly generated.

The arithmetic means (arithmetic circuit) for time code calculation is configured, which unlike the prior art four stages (the arithmetic circuit 14, the arithmetic circuit 17, the arithmetic circuit 20, and the arithmetic circuit 19 in FIG. 11) and only one arithmetic is required in the present invention.

In at least one arithmetic means (arithmetic circuit), the repetitive time code calculation is carried out, and the drop frames newly generated in the arithmetic process are detected by the difference frame number calculation means in later stages.

Then, the selector means A is supplied with the semi-DF time code o'clock Oab after calculation in the arithmetic means and the selector means B with the NDF time code o'clock Nb corresponding to the difference of the drop frame amount before and after the arithmetic operation.

The selector means A is caused by the difference frame number calculation means to select and output the reference semi-DF time code o'clock Oab repetitively calculated, and the selector means B is caused to select and output the NDF time code o'clock Nb to be calculated repetitively.

In the arithmetic means, the two input time codes are recalculated as time codes in non-drop mode by the add/subtract signal Sub without taking any drop frame into account.

In this way, until the difference in the drop frame amount before and after the arithmetic operation is eliminated, the difference frame number calculation means outputs the select information signal ReCalc of the input time code to the selector circuit A a nd the selector circuit B, so that the two time codes individually output from the selector circuit A and the selector circuit B are arithmetically processed repetitively in the arithmetic means.

By doing so, a mechanism is constructed to recalculate the time corresponding to the difference in the drop frame amount before and after the arithmetic operation detected by the method of detecting the newly generated drop frames in the arithmetic process according to the second basic principle described above.

The fourth basic principle is for meeting the requirement of all the TV transmission systems (PAL.SECAM schemes and NTSC scheme in drop mode or non-drop mode) flexibly.

In the time code calculation process, information for calculating the number of frames per second as 30 frames/25 frames in the carry up/carry down of the frame digit is input to the arithmetic means.

Now, an example arithmetic operation of the arithmetic means is shown below.

Let the time code o'clock Ha providing a reference for the arithmetic operation be 00:01:02.13 o'clock, and the time code o'clock Hb to be calculated be 00:00:00.14 o'clock.

Then, in the add operation according to the NTSC scheme,

| | |
|---|---|
| 00:01:02.13 | Time code o'clock Ha |
| + 00:00:00.14 | Time code o'clock Hb |
| 00:01:02.27 | |

Since there are 30 frames per second, the carry up from the frame digit to the second digit does not occur.

In the subtract operation according to the NTSC scheme,

| | |
|---|---|
| 00:01:02.13 | Time code o'clock Ha |
| − 00:00:00.14 | Time code o'clock Hb |
| 00:01:01.29 | |

Since there are 30 frames per second, the carry down from the second digit to the frame digit occurs, so that the frame digit assumes 29 frames.

In the add operation according to the PAL scheme, on the other hand,

| | |
|---|---|
| 00:01:02.13 | Time code o'clock Ha |
| + 00:00:00.14 | Time code o'clock Hb |
| 00:01:03.02 | |

Since there are 25 frames per second, the carry up from the frame digit to the second digit occurs, so. that the frame digit assumes 02 frames.

In the subtract operation according to the PAL scheme,

| | |
|---|---|
| 00:01:02.13 | Time code o'clock Ha |
| − 00:00:00.14 | Time code o'clock Hb |
| 00:01:01.24 | |

Since there are 25 frames per second, the carry down from the second digit to the frame digit occurs, so that the frame digit assumes 24 frames.

The next feature is that the difference frame number calculation means is constructed in such a manner as to meet the requirement of drop frames only during the arithmetic operation of the DF time code o'clock in the NTSC scheme.

First, the operation of the difference frame number calculation means will be explained.

The difference frame number calculation means performs the following two operations.

The first operation is such that when calculating the DF time code o'clock according to the NTSC scheme, the difference between the pre-calculation drop frame amount Da and the post-calculation drop frame amount D is determined, and thereby the drop frames newly generated in the arithmetic process are detected.

The second operation is such that upon detection of the drop frames newly generated in the arithmetic process, in order to recalculate the semi-DF time code o'clock from the NDF time code o'clock corresponding to the total number of the particular drop frames during the semi-DF time code hours after arithmetic operation, a signal ReCalc is output to the selector circuit A and the selector circuit B to output the recalculated time code o'clock, while in the case where no drop frame newly generated in the arithmetic process is detected, a signal ReCalc not to recalculate is output to the selector circuit A and the selector circuit B.

In spite of these operations, in the case where the DF time code o'clock of the NTSC scheme is not calculated, i.e. in the case where the NDF time code o'clock is calculated for the PAL.SECOM scheme or the NTSC scheme, the drop frame newly generated in the arithmetic process is not detected in the absence of the drop frame.

As a result, a signal ReCalc not to always recalculate nor to perform the second operation described above is output, so that the arithmetic means normally calculates the time code o'clock in one arithmetic operation, which otherwise might be calculated finally calculated.

The fifth basic principle is for converting the DF time code o'clock of NTSC scheme to the NDF time code o'clock.

The fifth basic principle takes into consideration the fact that the time counted frame by frame without skipping the drop frames from 00:00:00.00 o'clock to the DF time code o'clock corresponds to the NDF time code o'clock, in which case the DF time code o'clock of course indicates the time larger in temporal value than the NDF time code o'clock by an amount corresponding to the skipped drop frames. Thus, by simply subtracting the time corresponding to the drop frame amount of the DF time code o'clock from the DF time code o'clock, the NDF time code o'clock can be calculated.

Let NdfT be the NDF time code o'clock and DfT be the DF time code o'clock before conversion. Then, the drop frame amount DftD of the DF time code o'clock DfT is calculated from equation 5.

Let the time corresponding to the drop frame amount DftD be the NDF time code DfTime, and then $$Df\text{Time}=00{:}(DftD/1800){:}((DftD/30)\%60){:}(DftD\%30)\text{ o'clock} \qquad \text{Equation 10}$$

(% indicates the remainder in the divide operation) can be used for calculation. Thus, the NDF time code o'clock NdfT to be determined can be calculated from $$NdfT = DfT - Df\text{Time} \qquad \text{Equation 11}$$

The sixth basic principle is for converting the NDF time code o'clock of the NTSC scheme into the DF time code o'clock.

The NDF time code o'clock counted from 00:00:00.00 o'clock, as compared with the DF time code having a drop frame counted from the same 00:00:00.00 o'clock, develops a deviation with the lapse of time.

This deviation corresponds to the total number of frames skipped as drop frames when counted from 00:00:00.00 o'clock to the DF time code o'clock.

This time corresponding to the deviation is added to the NDF time code o'clock for conversion to the DF time code o'clock. The number of frames of time to which NDF time code o'clock corresponds as counted in real time can be calculated by arithmetic operation.

$$\text{Total number of frames} = (\text{hour digit} \times 108000) + (\text{minute digit} \times 1800) + (\text{second digit} \times 30) + (\text{frame digit}) \qquad \text{Equation 12}$$

Assume, for example, that the NDF time code o'clock is 01:00:00.00. The total number of frames counted from 00:00:00.00 o'clock is 1080000 from equation 12. However, the total number of frames counted from the DF time code o'clock 00:00:00.00 to 01:00:00.00 is given as (108000−108(number of drop frames per hour)) frames=107892 frames In other words, the DF time code o'clock is the same real time as the NDF time code o'clock of 01:00:03.18 which is the time code o'clock counted for the remaining 108 frames.

From this, the DF time code o'clock can be calculated by adding the NDF time code o'clock to the drop frame amount based on the assumption that the particular NDF time code o'clock is the DF time code o'clock.

However, the calculation may be impossible by simple addition of the drop frame amount to the NDF time code o'clock. It is in the case where a new drop frame occurs when the drop frame amount is added, in which case the second add operation is required. An example will be explained below with reference to FIG. 3.

Assume that the reference NDF time code o'clock is 00:16:59.13 o'clock [1]. From equation 5, the pre-calculation drop frame amount [2] is 30 frames, which when converted into the time, is 00:00:01.00 o'clock [3].

| |
|---|
| 00:16:59.13 o'clock [1] |
| + 00:00:01.00 o'clock [3] |
| 00:17:00.13 o'clock [4] |

In this case, the post-calculation drop frame amount [5] is 32 frames from equation 5, and therefore the difference between the pre-calculation drop frame amount [2] and the post-calculation drop frame amount [5] before and after add operation is two frames corresponding to 00:00:00.02 hours [6]. As a result, the carry up occurs from the second digit to the minute digit in the process of the add operation. Thus, the add operation is performed again.

| |
|---|
| 00:17:00.13 o'clock [4] |
| + 00:00:00.02 o'clock [6] |
| 00:17:00.15 o'clock [7] |

In this case, the post-calculation drop frame amount [8] is 32 frames from equation 5, and therefore there is no difference between the pre-calculation drop frame amount [5] and the post-calculation drop frame amount [8] before and after the add operation, and there is no carry up from the second digit to the minute digit in the second add operation. In other words, due to the absence of drop frames, the final DF time code o'clock 00:17:00.15 o'clock [9] is determined.

In the first add operation described above, an explanation will be given of the fact that the difference of 00:00:00.02 hours [6] has occurred between the pre-calculation drop frame amount [2] and the post-calculation drop frame amount [5].

During the lapse of the time of 00:00:01.00 hours [2] corresponding to the drop frame amount to be added from 00:16:59.13 o'clock [1] constituting the standard NDF time code o'clock in the first add operation, 00:16:59.29 o'clock is realized after the lapse of 00:00:00.16 hours (16 frame hours), while the time is 00:17:00.02 o'clock after the lapse of 00:00:00.17 hours (17 frame hours). Since two drop frames of 00, 01 are skipped, there occurred a difference between the pre-calculation drop frame amount [2] and the post-calculation drop frame amount [5].

In this way, by adding the NDF time code o'clock [3] corresponding to the drop frame amount [2] on the assumption of the DF time code o'clock, to the reference NDF time code o'clock, the NDF time code o'clock can be converted into the DF time code o'clock.

Conversely, for converting 00:17:00.15 o'clock [9] constituting the currently-calculated DF time code o'clock into the NDF code o'clock, the NDF time code o'clock [10] 00:00:01.02 corresponding to the drop frame amount [8] of 32 frames is simply subtracted, and the NDF time code o'clock is calculated as 00:16:59.13 o'clock [11].

The NDF time code o'clock 00:16:59.13 o'clock [11] calculated by conversion from the DF time code o'clock to the NDF time code o'clock as described above is equal to the reference NDF time code o'clock 00:16:59.13 o'clock [1] for converting from the NDF time code o'clock to the DF time code o'clock, and therefore the legitimacy of the method of converting the NDF time code o'clock to the DF time code o'clock can be substantiated.

BRIEF DESCRIPTION OF DRAWINGS

FIG. 3 is a diagram for explaining the flow of a time code when converting the NDF time code o'clock of the non-drop mode to the DF time code o'clock according to the basic principles for converting the NDF time code o'clock of NTSC scheme to the DF time code o'clock constituting one of the means for solving the problem of the prior art according to this invention.

BEST MODE FOR CARRYING OUT THE INVENTION

Figure 1:
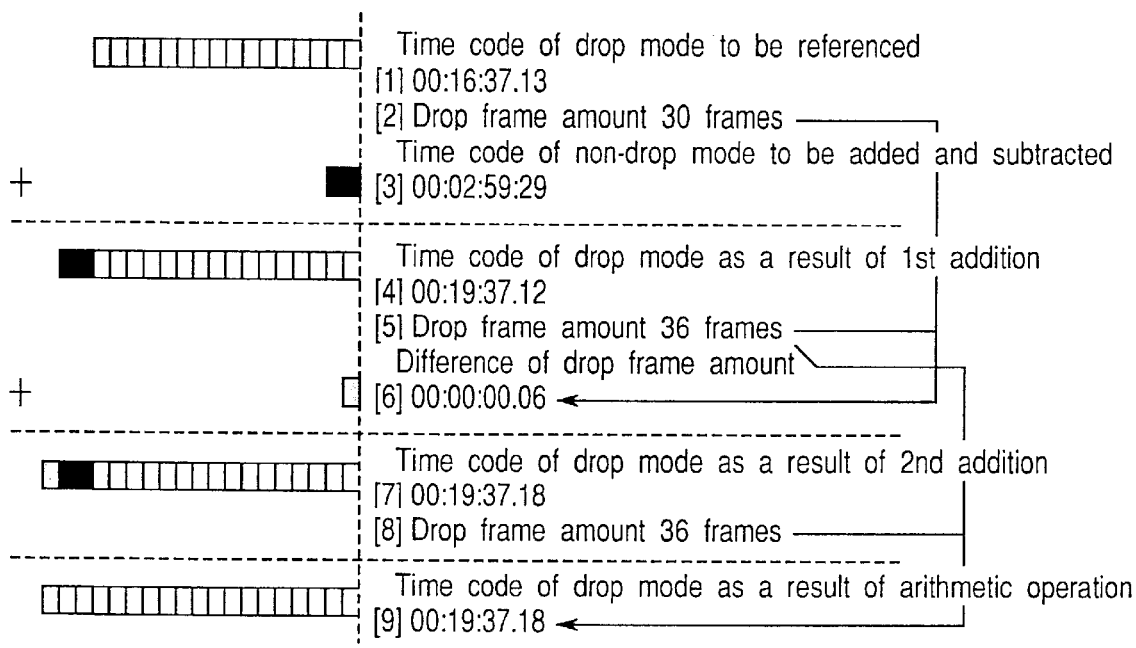
FIG. 1 is a diagram for explaining the flow of a time code at the time of the add operation according the basic principles of a method of detecting a new drop frame in the arithmetic process making up one of the means for solving the problem of the prior art according to the present invention.
Figure 2:
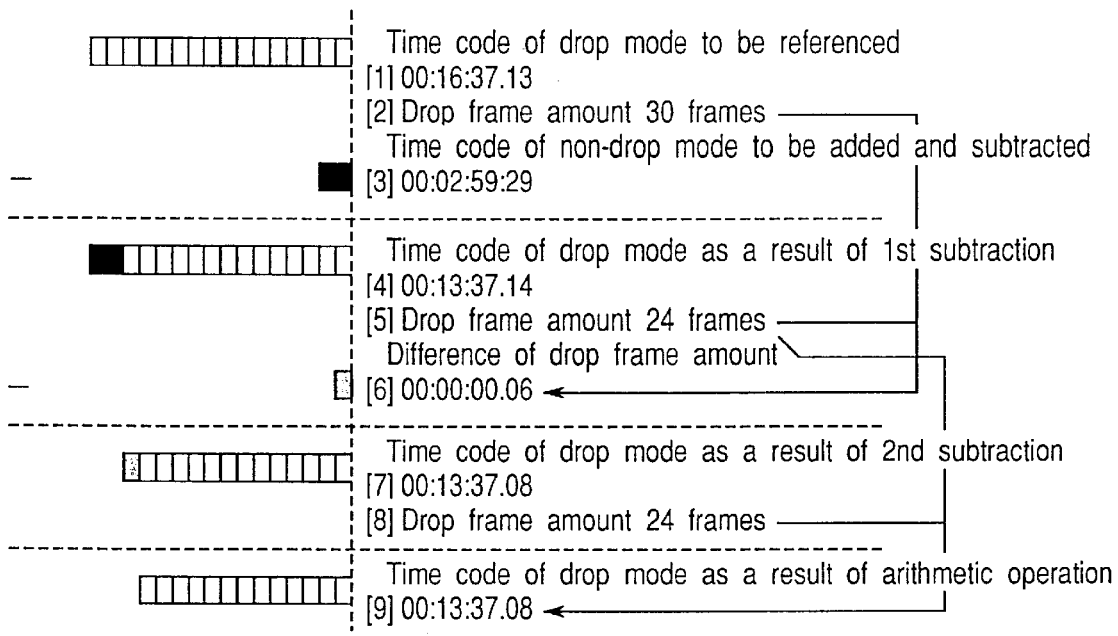
FIG. 2 is a diagram for explaining the flow of a time code at the time of the subtract operation according to the basic principles of a method of detecting a new drop frame in the arithmetic process making up one of the means for solving the problem of the prior art according to the present invention.

A time code arithmetic apparatus according to claim 1 of this invention comprises:

a selector circuit A (105) supplied with a time code DfTa providing a reference for arithmetic operation at one of the input terminals thereof and the result Oab of the arithmetic operation described later at the other input terminal for selecting one of the inputs and outputting it as a time code Ha;

a selector circuit B (106) supplied with a time code NdfTb providing an object of arithmetic operation at one of the input terminals thereof and a time code o'clock Nb described later at the other input terminal for selecting one of the inputs and outputting it as a time code Hb;

an arithmetic circuit (107) for adding or subtracting the time codes Ha and Hb selected in the two selector circuits simply as a time code in non-drop mode based on the add/subtract information, and outputting the result Oab of the arithmetic operation and information Large indicating which is larger, the absolute value of the time code before and after the arithmetic operation;

a drop frame amount calculation circuit A (108) for calculating frame by frame the total number of frames skipped (dropped) in the process of time lapse from 00:00:00.00 o'clock from the arithmetic result Oab and outputting it as drop frame amount D;

a drop frame amount calculation circuit B (109) for calculating frame by frame the total number of frames skipped (dropped) in the process of time lapse from 00:00:00.00 o'clock from the time code Ha and outputting it as drop frame amount Da;

a difference frame number calculation circuit (110) for determining the difference of the total number of frames skipped based on the drop frame amount D, Da and the information Large, and in the case where the difference is not 0, outputting the time code o'clock Nb of the non-drop mode corresponding to the difference while at the same time outputting the recalculation signal ReCalc; and a drop frame correction circuit (111) for outputting the arithmetic result Oab as a time code DfTo finally in the case where the arithmetic operation is an add operation or the arithmetic operation is a subtract operation with the arithmetic result Oab failing to correspond to a drop frame, and correcting the arithmetic result Oab by −2 frames and outputting it as a time code DfTo in the case where the arithmetic operation is a subtract operation with the arithmetic result Oab corresponding to a drop frame, in response to the determination of the difference 0 in the difference frame number calculation circuit (110);

wherein in the case where the difference is not 0, the selector circuit A (105) and the selector circuit B (106) select the arithmetic result Oab and the time code o'clock Nb, respectively, based on the recalculation signal ReCalc and carrying out the recalculation in the arithmetic circuit (107).

In this configuration (claim 1), the NDF time code o'clock to be calculated is added/subtracted to or from a reference DF time code o'clock thereby to finally calculate the DF time code o'clock. The add/subtract operation in the process of the arithmetic operation is all the arithmetic operation between the NDF time code o'clocks, in which the difference of the drop frame amount before and after the arithmetic operation is determined, and the NDF time code o'clock corresponding to the difference is added/subtracted to and from the semi-DF time code o'clock providing the arithmetic result in the process of the arithmetic operation, so that the drop frames generated newly during the arithmetic operation can be output with the DF time code o'clock to be finally calculated, thereby providing a time code arithmetic apparatus with a very simple configuration.

A time code arithmetic apparatus according to claim 2 of this invention comprises:

a selector circuit A (205) supplied with a time code DfTa providing a reference for arithmetic operation at one of the input terminals thereof and the result Oab of the arithmetic operation described later at the other input terminal for selecting one of the inputs and outputting it as a time code Ha;

a selector circuit B (206) supplied with a time code NdfTb providing an object of arithmetic operation at one of the input terminals thereof and a time code o'clock Nb described later at the other input terminal for selecting one of the inputs and outputting it as a time code Hb;

an arithmetic circuit (207) for adding or subtracting the time codes Ha and Hb selected in the two selector circuits simply as a time code in non-drop mode based on the add/subtract information, and outputting the result Oab of the arithmetic operation and information Large indicating which is larger, the absolute value of the time code before and after the arithmetic operation;

a drop frame amount calculation circuit A (208) for calculating the total number of frames skipped (dropped) in the arithmetic result Oab one frame each in the process of time lapse from 00:00:00.00 o'clock and outputting it as drop frame amount D;

a drop frame amount calculation circuit B (209) for calculating the total number of frames in the time code Ha skipped (dropped) one frame each in the process of time lapse from 00:00:00.00 o'clock and outputting it as drop frame amount Da;

a drop frame detection circuit (211) for outputting the information DfOn indicating whether the arithmetic result Oab corresponds to a drop frame or not; and a difference frame number calculation circuit (210) for determining the difference of the total number of frames skipped based on the drop frame amount D, Da and the information Large, and (i) in the case where the difference is not 0, performing the calculation process 1 for outputting the time code o'clock Nb of the non-drop mode corresponding to the difference while at the same time outputting a recalculation signal ReCalc;

(ii) in the case where the difference is 0 and a drop frame is involved based on the information DfOn, performing the recalculation process 2 for outputting a two frame o'clock as the time code o'clock Nb while at the same outputting the recalculation signal ReCalc; and (iii) in the case where the preceding difference frame number calculation process corresponds to the recalculation process 2, performing the recalculation process 3 for outputting a 0 frame o'clock as the time code o'clock Nb not to perform the recalculation while at the same time outputting the information not to perform the recalculation as the recalculation signal ReCalc:

wherein the selector circuit A (205) and the selector circuit B (206) select the arithmetic result Oab and the time code o'clock Nb, respectively, and carrying out the recalculation in the arithmetic circuit (207) based on the recalculation signal ReCalc.

In this configuration (claim 2), the same function as the time code arithmetic apparatus described in claim 1 can be realized with a more simple configuration.

A time code arithmetic apparatus according to claims 3 and/or 4 of the invention, in claims 1 and/or 2, comprises a conversion circuit (312) for converting a time code DfTb of drop mode to be calculated into a time code NdfTb of non-drop mode, wherein the output of the conversion circuit is supplied as an object of arithmetic operation of the selector circuit B (106) and a selector circuit B (206) thereby to add/subtract the time code DfTb of drop mode to and from the time code DfTa of drop mode.

In the configuration of claims 3 and 4, two DF time code o'clocks can be calculated with each other and as compared with the prior art, the apparatus can be realized with a very simple configuration.

The invention according to claim 5, in claim 2, comprises:

a conversion circuit (413) for converting a time code DfTa of drop mode providing an input arithmetic reference into a time code NdfTa of non-drop mode, supplying the time code NdfTa to a selector circuit A (405) equivalent to the selector circuit A (205), and outputting information Co indicating that the time code providing an arithmetic reference is in non-drop mode; and a conversion circuit (412) for converting an input time code DfTb of drop mode providing an object of an arithmetic operation into a time code NdfTb of non-drop mode, and supplying the time code NdfTb to a selector circuit B (406) equivalent to the selector circuit B (206);

wherein the difference frame number calculation means (410) of the time code arithmetic apparatus executes the recalculation process 4 for outputting 00:00:00.00 o'clock as the time code o'clock Nb not to perform the recalculation in response to the information Co input thereto and also outputting the recalculation-prohibiting information as the recalculation signal ReCalc.

In the configuration of claim 5, the real time of the sum and the difference between the two input DF time code o'clock can be calculated as a NDF time code o'clock corresponding to the real frame number o'clock when counted frame by frame from 00:00:00.00 o'clock at the time of add operation, and the real time of the difference between two DF time code o'clocks can be calculated as a NDF time code o'clock corresponding to a real frame number o'clock at the time of subtract operation, thereby providing a time code arithmetic apparatus having a very simple configuration.

A time code arithmetic apparatus according to claim 6 of the invention, in claim 5, comprises:

a conversion circuit A (513) supplied with a time code DfNdfTa of drop mode or non-drop mode providing an input arithmetic reference, information DfNdfTaF indicating whether the time code DfNdfTa is the drop mode or the non-drop mode and information DfNdfToF indicating whether the time code To output as the final result of arithmetic operation is in drop mode or in non-drop mode, and only in the case where the time code DfNdfTa is in drop mode and the time code To is in non-drop mode, converting the time code in drop mode to a time code in non-drop mode, whereas otherwise the time code is output as it is in the form of time code Ta while at the same time outputting information Co indicating whether the time code Ta is in drop mode or in non-drop mode; and a conversion circuit B (512) supplied with an input time code DfNdfTb of drop mode or non-drop mode and information DfNdfTbF indicating whether the time code DfNdfTb is the drop mode or the non-drop mode, and converting the time code DfNdfTb, if in drop mode, into a non-drop mode, whereas the time code DfNdfTb, if in non-drop mode, is not converted but output as it is, the conversion circuits A (513) and B (512) replacing the conversion circuits A (413) and B (412), respectively.

In the configuration of claim 6, the mode of the output time code is designated in the calculation of the two time codes regardless of the drop or non-drop mode of the reference time code and the time code to be added/subtracted, so that the time code of the arithmetic result can be output as a drop mode or a non-drop mode, thereby making it possible to provide a time code arithmetic apparatus of a very simple configuration.

By the way, in the case where the calculated time code, if in drop mode with the reference time code in non-drop mode, is output as a non-drop mode, and the conversion is required again from the NDF time code o'clock to the DF time code o'clock in the time code arithmetic apparatus according to claim 8 or 9 of the invention.

According to the invention as described in claim 7, in claim 6, information NtscPal indicating which is used for calculation of the two time codes, NTSC scheme or PAL.SECOM scheme, is input to the conversion circuit A (513) and the conversion circuit B (512) and the arithmetic circuit (407) and the difference frame number calculation circuit (410) in the time code arithmetic apparatus (53), the time code input to the conversion circuit A (513) and the conversion circuit B (512) is output as it is in the case where the information NtscPal is the information indicating PAL.SECAM scheme, the arithmetic circuit (407) performs the arithmetic operation regarding the number of frames per second as 25 in the case where the information NtscPal indicates the PAL.SECAM scheme and 30 in the case where the information NtscPal indicates the NTSC scheme, and in the case where the information Ntscpal indicates the PAL.SECAM scheme, the difference frame number calculation circuit (410) outputs 00:00:00.00 o'clock as the time code o'clock Nb in such a manner as not to forcibly perform the recalculation in response to the input of the information Co and at the same time performs the recalculation process 4 for outputting the information prohibiting the recalculation as the recalculation signal ReCalc thereby to calculate the time code of NTSC and PAL.SECOM scheme.

In the configuration of claim 7, there is provided a time code arithmetic apparatus having a very simple configuration for calculating the time codes of PAL.SECOM scheme (25 frames) and NTSC scheme (30 frames) having different constants for carry up and carry down of the frame digit in the television system, while at the same time realizing the arithmetic operation of the DF time code o'clock and the NDF time code o'clock with a single arithmetic apparatus.

The time code arithmetic apparatus according to the invention as described in claims 8 and/or 9, in claims 1 and/or 2, comprises a drop time code calculation circuit (718) in which the time code NdfTa of non-drop mode is regarded as a time code of drop mode, and the total number of frames skipped in the process of time lapse from 00:00:00.00 o'clock to the time code NdfTa o'clock, frame by frame, is converted into the non-drop mode time code NdfTb and output, while at the same time outputting add information as the add/subtract signal Sub, wherein the time code NdfTa is used as an arithmetic reference and the time code NdfTb is used as an object of arithmetic operation.

In the configuration of claims 8 and 9, a time code arithmetic apparatus having a very simple configuration is provided in which the NDF time code o'clock is converted into the DF time code o'clock.

Now, embodiments of the invention will be explained with reference to FIGS. 4 to 10 and Tables 2 to 18.
(Embodiment 1)

Figure 4:
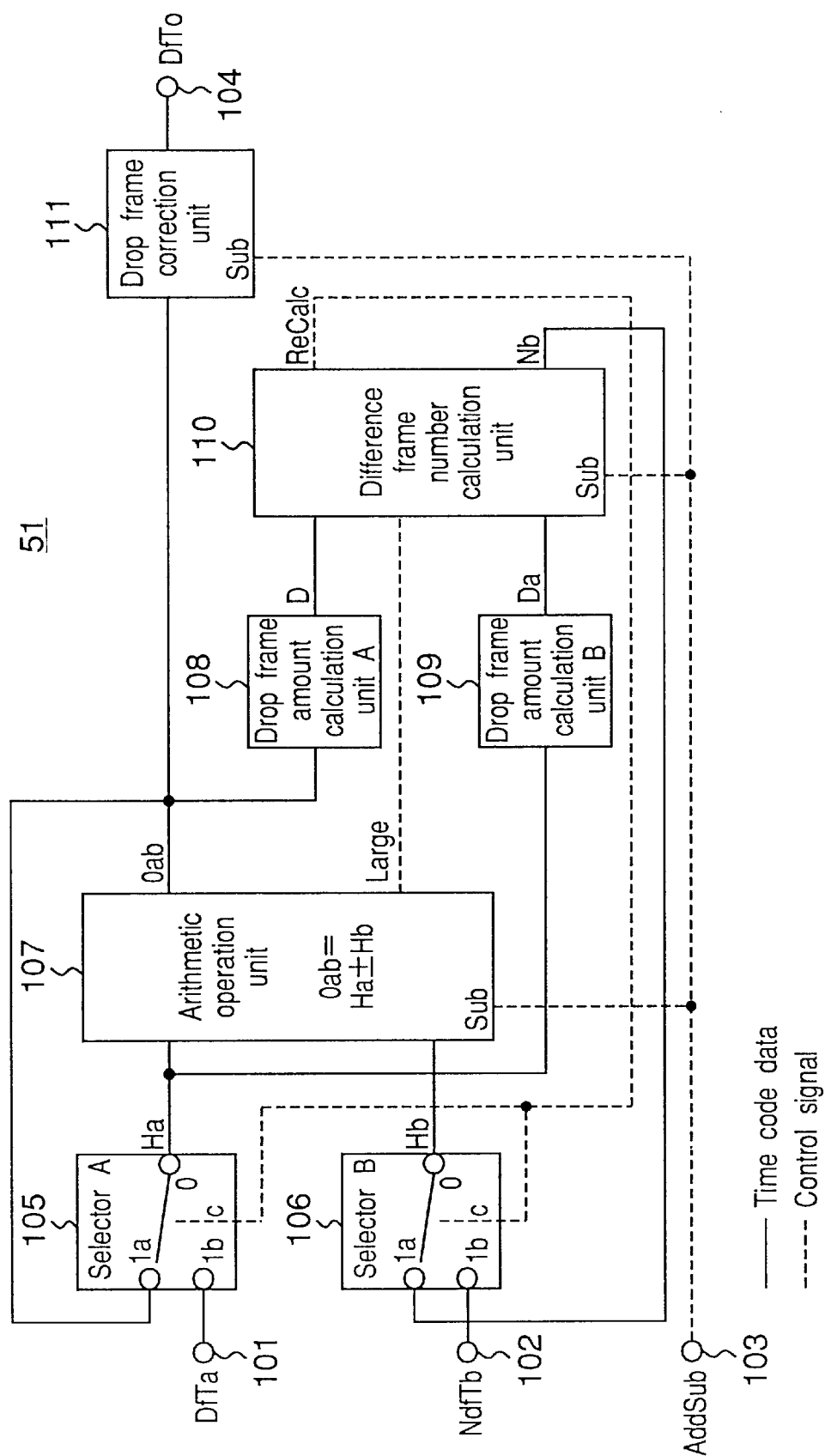
FIG. 4 is a general block diagram showing a time code arithmetic apparatus according to a first embodiment of the invention.

FIG. 4 is a general block diagram showing an embodiment according to claim 1 of the invention.

The DF time code DfTa providing an arithmetic reference is input to an input terminal 101, and the NDF time code o'clock NdfTb to be added/subtracted is input to an input terminal 102.

In the initial state (at the time of operation start), a difference frame number calculation circuit 110 outputs a recalculation control signal ReCalc (=0) constituting a control signal for outputting a time code input to the input terminal Ib, to the selector circuit A105 and the selector circuit B106, while at the same time outputting 00:00:00.00 o'clock as the NDF time code o'clock Nb corresponding to the difference in the drop frames before and after the arithmetic operation.

By the way, the operation of the difference frame number calculation circuit 110 is performed according to the operation table 6 based on the operation explained as the second one of the six basic principles described above in [Means for Solving the Problem] for the method of detecting drop frames newly generated in the arithmetic process. Thus, from the input information including the post-calculation drop frame amount D, the pre-calculation drop frame amount Da, the time code magnitude information Large before and after arithmetic operation and the add/subtract information Sub, and using equations 6 to 9, the output information including the recalculation control signal ReCalc and the NDF time code o'clock Nb corresponding to the drop frame difference before and after arithmetic operation are output.

By the way, the operation of the selector circuit A105 and the selector circuit B106 is described in the operation list of Table 2.

Next, in the time code arithmetic apparatus in initial state, according to the operation of the difference frame number calculation circuit 110, the selector circuit A105 outputs the DF time code o'clock DfTa input to the input terminal Ib, to the arithmetic circuit 107 as the DF time code o'clock Ha, and the selector circuit B106 outputs the NDF time code o'clock NDfTb input to the input terminal Ib, to the arithmetic circuit 107 as the NDF time code o'clock Hb.

Then, in the arithmetic circuit 107, the input DF time code o'clock Ha is regarded as the NDF time code o'clock to add/subtract the NDF time code o'clock Hb in accordance with the add/subtract signal Sub, and the semi-NDF time code o'clock Oab is outputs providing the result of arithmetic operation.

Also, the DF time code o'clock Ha is compared with the semi-DF time code o'clock Oab to output the magnitude information Large.

The magnitude information Large of 0 is output in the case where the pre-calculation DF time code o'clock Ha is temporally larger than the post-calculation semi-DF time code o'clock Oab, 1 in the case where the pre-calculation DF time code o'clock Ha is temporally smaller than the post-calculation semi-DF time code o'clock Oab, and 2 in the case where the pre-calculation DF time code o'clock Ha is temporally equal to the post-calculation semi-DF time code o'clock Oab thereby to complete the first arithmetic operation. By the way, the operation of the arithmetic circuit 107 is described in the operation table explained in detail in Table 3.

In the drop frame amount calculation circuit A108, the post-calculation drop frame amount D corresponding to the total number of the drop frames skipped while the time elapses from 00:00:00.00 o'clock to the semi-DF time code o'clock Oab resulting from the first arithmetic result output from the arithmetic circuit 107, is calculated from the operation table of Table 5 based on equation 5 and output to the difference frame number calculation circuit 110.

In the drop frame amount calculation circuit B109, the pre-calculation drop frame amount Da corresponding to the total number of the drop frames skipped while the time elapses from 00:00:00.00 o'clock to the pre-calculation DF time code o'clock Ha input to the arithmetic circuit 107, is calculated from the operation table of Table 5 based on equation 5 and output to the difference frame number calculation circuit 110.

Figure 6:
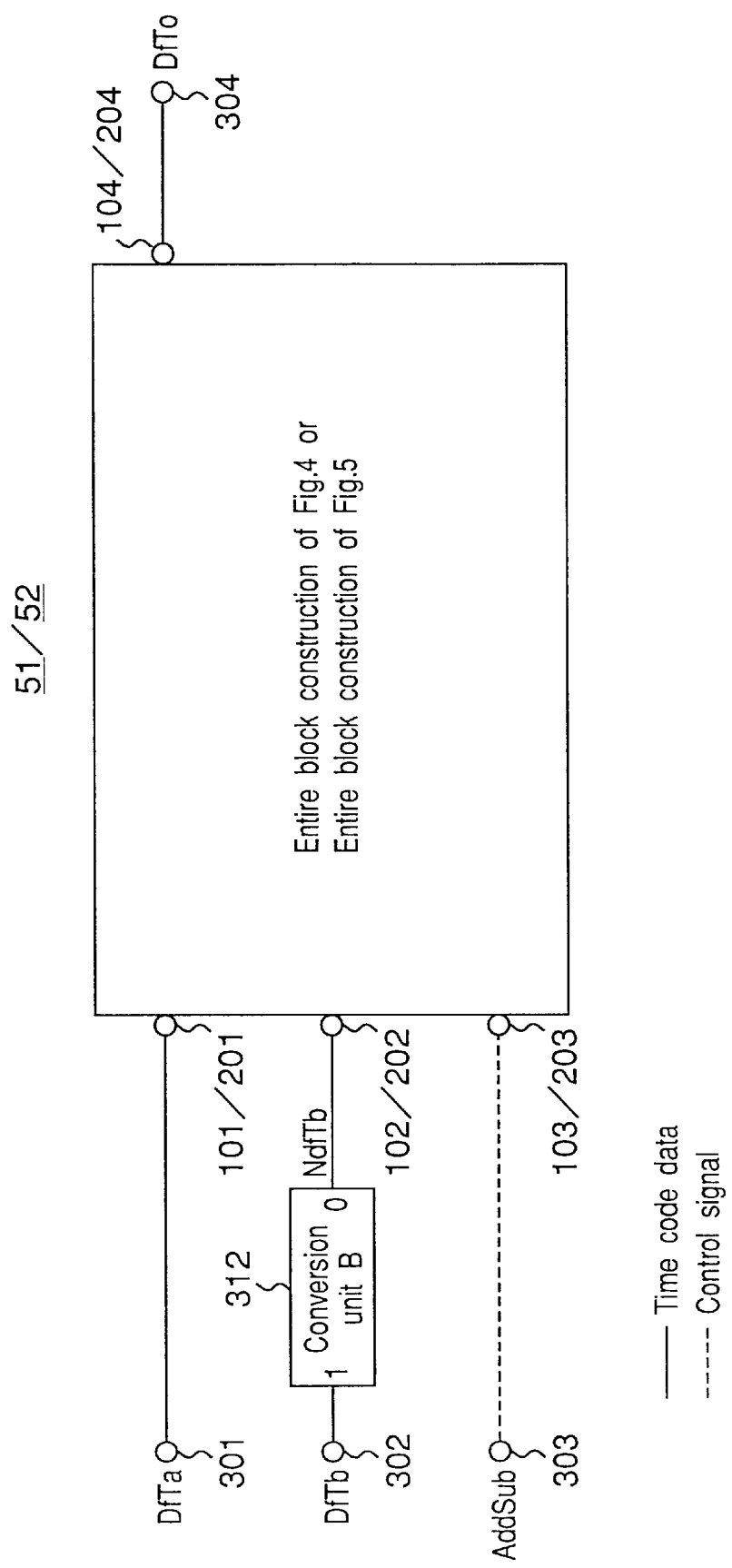
FIG. 6 is a general block diagram showing a time code arithmetic apparatus according to a third embodiment of the invention.

The difference frame number calculation circuit 110 detects whether the drop frames are newly generated in the process of the first arithmetic operation of the arithmetic circuit 107, with reference to the operation table of FIG. 6 based on the difference between the post-calculation drop frame amount D and the pre-calculation drop frame amount Da.

In the first arithmetic operation by the arithmetic circuit 107, in the case where there is a difference in the drop frame amount before and after the arithmetic operation (a new drop frame is generated in the arithmetic process), the NDF time code o'clock Nb corresponding to the difference in the drop frame amount before and after the arithmetic operation is output by being calculated from the operation table of Table 6. At the same time, with the aim of recalculating the semi-DF time code o'clock Oab providing the result of calculation in the arithmetic circuit 107 and the NDF time code o'clock Nb corresponding to the difference in drop frames before and after the arithmetic operation in the arithmetic circuit 107, a recalculation control signal ReCalc (=1) providing a control signal causing the selector circuit A105 to output the semi-DF time code o'clock Oab from the arithmetic circuit 107 from the output terminal O or causing the selector circuit B106 to output the NDF time code o'clock Nb corresponding to the difference of the drop frame before and after the arithmetic operation in the arithmetic circuit 107 from the output terminal 0.

The selector circuit A105 outputs the semi-DF time code o'clock Oab input to the input terminal Ia, to the arithmetic circuit 107 as a semi-DF time code o'clock Ha in response to the recalculation control signal ReCalc (=1).

The selector circuit B106 outputs the NDF time code o'clock Nb input to the input terminal Ia, to the arithmetic circuit 107 as a NDF time code o'clock Hb in response to the recalculation control signal ReCalc (=1)

Next, in the arithmetic circuit 107, the input semi-DF time code o'clock Ha is regarded as the NDF time code o'clock and the NDF time code o'clock Hb is added/subtracted by the add/subtract signal Sub, and the semi-NDF time code o'clock Oab providing the result of the arithmetic operation is output.

Also, the semi-DF time code o'clock Ha is compared with the semi-DF time code o'clock Oab, and like in the first arithmetic operation, the magnitude information Large is output thereby to end the second arithmetic operation.

In the drop frame amount calculation circuit A108, like in the first arithmetic operation, the post-calculation drop frame amount D in the second arithmetic operation is calculated, and output to the difference frame number calculation circuit 110.

In the drop frame amount calculation circuit B109, like in the first arithmetic operation, the pre-calculation drop frame amount Da in the second arithmetic operation is calculated, and output to the difference frame number calculation circuit 110.

In the difference frame number calculation circuit 110, like in the first arithmetic operation, the drop frames newly generated in the second arithmetic process of the arithmetic circuit 107 is detected.

In this way, in the case where there is a difference in the drop frame amount before and after the arithmetic operation (in the case where a drop frame has been newly generated in the arithmetic process) in the second or subsequent arithmetic operation of the arithmetic circuit 107, like in the first arithmetic operation, and in the case where there is a difference in the drop frame amount before and after the arithmetic operation, the difference frame number calculation circuit 110 outputs the recalculation control signal ReCalc (=1) and the NDF time code o'clock Nb to be recalculated, and is adapted to repeat the arithmetic operation.

In the process of the repeated arithmetic operation, in the case where there is no difference as described above, the difference frame number calculation circuit 110 outputs the recalculation control signal ReCalc (=0) for prohibiting the recalculation and the NDF time code o'clock Nb to be recalculated (=00:00:00.00 o'clock) thereby to prohibit the repeated arithmetic operation.

In the drop frame correction circuit 111, in the case where the semi-DF time code o'clock output from the arithmetic circuit 107 in the absence of the difference corresponds to the drop frame in the subtract operation, the semi-DF time code o'clock Oab is corrected by −2 frames, and output as a complete DF time code o'clock DfTo finally calculated.

The following case is an example.

$$\begin{array}{r}01:01:00.01\\-\ 00:00:00.02\\\hline 01:00:59.29\end{array}$$

In the case where the add operation or the subtract operation fails to be associated with a drop frame, the semi-DF time code o'clock Oab, which is a complete DF time code to be calculated finally, is output directly as the DF time code o'clocks DfTo.

By the way, the operation of the drop frame correction circuit 111 is described in the operation list explained in detail above with reference to Table 10.

In the process, an explanation will be given below about the mechanism in which the semi-DF time code o'clock Oab input to the drop frame correction circuit 111 is corrected by −2 frames only when it corresponds to the drop frame in the subtract operation.

That the add operation corresponds to a drop frame (00, 01 frame) is indicative of the fact that the drop frame amount develops a difference before and after the arithmetic operation in the arithmetic circuit 107.

Assume, for example, that the pre-calculation (semi) DF time code o'clock Ha is 00:01:59.29 o'clock, and the post-calculation semi-DF time code o'clock Oab is 00:02:00.01 o'clock. The pre-calculation drop frame amount Da is 2 frames from equation 5, and the post-calculation drop frame amount D is 4 frames according to equation 5. Thus, the difference frame number calculation circuit 110 detects the difference and carries out the recalculation. The difference frame number calculation circuit 110, therefore, is adapted to determine whether the drop frame is involved or not only when the difference mentioned above is not existent in the subtract operation.

Also, in the case where the embodiment of claim 1 of the invention is configured with hardware, unless the output timing such as of the DF time code o'clock DfTo output from the drop frame correction circuit 111 is managed appropriately, the DF time code DfTo to be finally output may be output after the semi-DF time code o'clock is output several times in the arithmetic process.

In order to avoid this inconvenience, the control operation is required such that an output time code o'clock Ha is output based on the select control signal C when the time code input is changed in the selector circuit A105 or the selector circuit B106, the arithmetic circuit 107 performs the calculation and outputs the semi-DF time code o'clock Oab when the input time code changes the difference frame number calculation circuit 110 outputs the information indicating the absence of the difference to the drop frame correction circuit 111, or in the drop frame correction circuit 111, when the information indicating the absence of the difference is output from the difference frame number calculation circuit 110, it is determined whether semi-DF time code o'clock Oab output from the arithmetic circuit 107 corresponds to the drop frame in the subtract operation, and the DF time code o'clock DfTo is finally output.

In an embodiment according to claim 1 of the invention, however, only the arithmetic principle is explained but the description does not cover the detailed timing control.

For further understanding an embodiment according to claim 1 of the invention, the add operations 1 and 2 and the subtract operations 1 to 3 will be explained using specific numerical values.

(Add Operation 1)

An explanation will be given of the add operation in the case where the arithmetic process of add operation is not accompanied by the carry up from 23:59:59.29 o'clock to 00:00:00.00 o'clock.

Assuming that the reference DF time code o'clock DfTa is 01:25:37.25 o'clock, and the NDF time code o'clock NdfTb to be added is also 01:25:37.25 o'clock, in the initial state, the selector circuit A105 outputs the DF time code o'clock DfTa input to the input terminal Ib, to the arithmetic circuit 107 as a DF time code o'clock Ha from the output terminal 0, and the selector circuit B106 outputs the DF time code o'clock NdfTb input to the input terminal Ib, to the arithmetic circuit 107 as a NDF time code o'clock Hb from the output terminal 0.

The arithmetic circuit 107 performs the following arithmetic operation.

| 01:25:37.25 | DF time code o'clock Ha |
| + 01:25:37.25 | NDF time code o'clock Hb |
| 02:51:15.20 | semi-DF time code o'clock Oab |

In the arithmetic circuit 107, the first arithmetic operation is completed.

In the arithmetic circuit 107, the pre-calculation DF time code o'clock Ha (01:25;37.25 o'clock) is compared with the post-calculation semi-DF time code o'clock Oab (02:51:15.20 o'clock), and in view of the fact that the post-calculation DF time code o'clock assumes a larger temporal value, the signal Large (Table 3) is set to 1, and the difference frame number calculation circuit 110 is informed that the semi-DF time code o'clock is increased.

In the drop frame amount calculation circuit A108, the post-calculation drop frame amount D is determined as 308 frames from equation 5 (Table 5) and output to the difference frame number calculation circuit 110, and in the drop frame amount calculation circuit B109, the pre-calculation drop frame amount Da is determined as 154 frames from equation 5 (Table 5) and output to the difference frame number calculation circuit 110.

In the difference drop frame number calculation circuit 110, the NDF time code o'clock Nb corresponding to 154 frames constituting the difference frame number DftD calculated using equation 6 from the difference between the pre-calculation drop frame amount Da (154 frames) and the post-calculation drop frame amount D (308 frames), is output to the selector circuit B106 as 00:00:05.04 o'clock using equation 10.

In the process, since the difference frame number is not 0, the generation of a new drop frame in the arithmetic process is detected, and the recalculation signal ReCalc is set to 1 and output to the selector circuit A105 and the selector circuit B106.

In the selector circuit A105 and the selector circuit B106, the output select control signal C is 1, and therefore in order to perform the second arithmetic operation, in the selector circuit A105, the semi-DF time code o'clock Oab (02:51:15.10 o'clock) providing the result of the first arithmetic operation input to the input terminal Ia is output to the arithmetic circuit 107 as a semi-DF time code o'clock Ha, and in the selector circuit B106, the NDF time code o'clock Nb (00:00:05.04 o'clock) corresponding to the number of difference drop frames before and after the first arithmetic operation input to the input terminal Ia is output to the arithmetic circuit 107 as the NDF time code o'clock Hb.

The following second arithmetic operation is performed with the semi-DF time code o'clock Ha and the NDF time code o'clock Hb input to the arithmetic circuit 107.

| 02:51:15.20 | semi-DF time code o'clock Ha |
| + 00:00:05.04 | NDF time code o'clock Hb |
| 02:51:20.24 | semi-DF time code o'clock Oab |

In the arithmetic circuit 107, the second arithmetic operation is completed.

In the process, the arithmetic circuit 107 compares the pre-calculation semi-DF time code o'clock Ha (02:51:15.20 o'clock) with the post-calculation semi-DF time code o'clock Oab (02:51:20.24 o'clock), and in view of the fact that the post-calculation semi-DF time code o'clock Oab is temporally larger, the signal Large is set to 1, and the fact that the post-calculation semi-DF time code o'clock Oab is larger is notified to the difference frame number calculation circuit 110.

As in the first add operation, in the drop frame amount calculation circuit A108, the post-calculation drop frame amount D is calculated using equation 5, and output as 308 frames to the difference frame number calculation circuit 110.

In the drop frame amount calculation circuit B109, the pre-calculation drop frame amount Da is calculated using equation 5, and output as 308 frames to the difference frame number calculation circuit 110.

In the difference frame number calculation circuit 110, the difference in the drop frame amount before and after the arithmetic operation is calculated from the add/subtract signal Sub (=0), the post-calculation drop frame amount D (=308 frames), the pre-calculation drop frame amount Da (=308 frames) and the magnitude information Large (=1) of the time code before and after arithmetic operation.

At the same time, since the difference of the drop frame amount before and after arithmetic operation is 0 from the operation table of Table 6, the generation of a new drop frame is not detected in the arithmetic process of the arithmetic circuit 107.

For this reason, in the difference frame number calculation circuit 110, the recalculation control signal ReCalc is set to 0 to prohibit recalculation, and the NDF time code o'clock Nb to be added in the recalculation is set to and output as 00:00:00.00 o'clock.

Under this condition (the recalculation control signal ReCalc is set to 0 to prohibit recalculation in the difference frame number calculation circuit 110), the drop frame correction circuit 111 should determine whether the semi-DF time code Oab output from the arithmetic circuit 107 corresponds to the drop frame or not. In the case of the add operation, however, it does not correspond to the drop frame and therefore the semi-DF time code o'clock Oab is output as the final output of the DF time code o'clock DfTo (02:51:20.24 o'clock).

(Add Operation 2)

An explanation will be given of the add operation 2 involving the add operation process accompanied by the carry up from 23:59:59.29 o'clock to 00:00:00.00 o'clock.

Assume that the DF time code o'clock Dfta providing an arithmetic reference is 01:25:37.25 o'clock as in the add operation 1 described above and the NDF time code o'clock NdfTb to be added is 23:59:59.29 o'clock, in the initial state, the selector circuit A105 outputs the DF time code o'clock DfTa input to the input terminal Ib, to the arithmetic circuit 107 as the DF time code o'clock Ha from the output terminal 0, the selector circuit B106 outputs the DF time code o'clock NdfTb input to the input terminal Ib, to the arithmetic circuit 107 as the NDF time code o'clock Hb from the output terminal 0, and the arithmetic circuit 107 performs the following arithmetic operation.

|  | 01:25:37.25 | ... | DF time code o'clock Ha |
| --- | --- | --- | --- |
| + | 23:59:59.29 | ... | NDF time code o'clock Hb |
|  | 01:25:37.24 | ... | semi-DF time code o'clock Oab |

The arithmetic circuit 107 completes the first arithmetic operation.

In the arithmetic circuit 107, the pre-calculation DF time code o'clock Ha (01:25:37.25 o'clock) is compared with the post-calculation semi-DF time code o'clock Oab (01:25:37.24 o'clock in the selector circuit 105, and in view of the fact that the post-calculation semi-DF code o'clock assumes a smaller temporal value, the signal Large (Table 3) is set to 0, and the fact that the post-calculation semi-DF time code o'clock is smaller is notified to the difference frame number calculation circuit 110.

In the drop frame amount calculation circuit A108, the post-calculation drop frame amount D is regarded as 154 frames from equation 5 (Table 5) and output to the difference frame number calculation circuit 110, and in the drop frame amount calculation circuit B109, the pre-calculation drop frame amount Da is regarded as 154 frames from equation 5 (Table 5) and output to the difference frame number calculation circuit 110.

The difference frame number calculation circuit 110 determines that the difference between the pre-calculation drop frame amount Da (154 frames) and the post-calculation drop frame amount D 154 (frames) is 0 frame which is the number of difference frames calculated using equation 6, and makes the first determination that no drop frame has been newly generated in the arithmetic process.

In view of the fact that the time code magnitude information Large before and after arithmetic operation is set to 0, however, it is detected that the carry up from 23:59:59.29 o'clock to 00:00:00.00 o'clock is generated in the first add operation.

No difference of the drop frame amount has developed from the number of frames of the pre-calculation drop frame amount Da and the post-calculation drop frame amount D. Originally, however, there exist drop frames generated during the lapse of time from pre-calculation DF time code o'clock Ha to 24 o'clock (=00:00:00.00 o'clock), and so it follows that there are drop frames generated during the lapse from 24 o'clock (=00:00:00.00 o'clock) until the post-calculation semi-DF time code Oab.

This indicates that the number of frames obtained by subtracting the pre-calculation drop frame amount Da (154 frames) from the drop frame amount (2592 frames) for 24 hours is added to the post-calculation drop frame amount D (154 frames), and the resulting sum of frames constitutes the original difference of the drop frame amount to be calculated before and after the arithmetic operation.

In the difference frame calculation circuit 110, the difference DftD of the drop frame amount before and after the arithmetic operation in the first arithmetic operation of the arithmetic circuit 107 is calculated using equation 7, and the NDF time code o'clock Nb corresponding to the number DftD of difference frames (2592 frames) is output to the selector circuit B106 as 00:01:26.12 o'clock using equation 10.

Also, since a new drop frame has occurred in the arithmetic process, the recalculation is required, and the recalculation signal ReCalc for controlling the recalculation is set to 1 and output to the selector circuit A105 and the selector circuit B106.

In the selector circuit A105 and the selector circuit B106, the output select control signal C is 1, and therefore, in order to perform the second arithmetic operation the semi-DF time code o'clock Oab (01:25:37.24 o'clock) providing the result of the first arithmetic operation input to the input terminal Ia is output to the arithmetic circuit 107 as a semi-DF time code o'clock Ha, and in the selector circuit B106, the NDF time code o'clock Nb (00:01:26.12 o'clock) corresponding to the number of difference drop frames before and after the first arithmetic operation input to the input terminal Ia is output as a NDF time code o'clock Hb to the arithmetic circuit 107.

The following second arithmetic operation is performed with the semi-DF time code o'clock Ha and the NDF time code o'clock Hb input to the arithmetic circuit 107.

|  | 01:25:37.24 | semi-DF time code o'clock Ha |
| --- | --- | --- |
| + | 00:01:26.12 | NDF time code o'clock Hb |
|  | 01:27:04.06 | semi-DF time code o'clock Oab |

In the arithmetic circuit 107, the second arithmetic operation is completed.

In the process, in the arithmetic circuit 107, the pre-calculation semi-DF time code o'clock Ha (01:25:37.24 o'clock) is compared with the post-calculation semi-DF time code o'clock Oab (01:27:04.06 o'clock), and in view of the fact that the post-calculation semi-DF time code o'clock Oab assumes a temporally larger value, the signal Large is set to 1, and the fact that the post-calculation semi-DF time code o'clock Oab is larger is notified to the difference frame number calculation circuit 110.

As in the second add operation, in the drop frame amount calculation circuit A108, the post-calculation drop frame amount D is calculated using equation 5, and output as 158 frames to the difference frame number calculation circuit 110.

In the drop frame amount calculation circuit B109, the pre-calculation drop frame amount Da is calculated using equation 5, and output as 154 frames to the difference frame number detection circuit 110.

In the difference frame number calculation circuit 110, the number of difference frames DftD calculated using equation 6 from the difference between the pre-calculation drop frame amount Da (154 frames) and the post-calculation drop frame amount D (158 frames) is output to the selector circuit B106 as 00:00:00.04 o'clock using equation 10.

In the process, since the difference frame number is not 0, the generation of a new drop frame is detected in the second arithmetic process, and the recalculation signal ReCalc is set to 1 and output to the selector circuit A105 and the selector circuit B106 for recalculation.

In the selector circuit A105 and the selector circuit B106, the output select control signal C is 1 and therefore in order to perform the third arithmetic operation, the semi-DF time code o'clock Oab (01:27:04.06 o'clock) providing the result of the second arithmetic operation input to the input terminal Ia is output to the arithmetic circuit 107 as the semi-DF time code o'clock Ha, and, In the selector circuit A105 and the selector circuit B106, the output select control signal C is 1 and therefore in order to perform the third arithmetic operation, the semi-DF time code o'clock Oab (01:27:04.06 o'clock) in the selector circuit A105 providing the result of the second arithmetic operation input to the input terminal Ia is output to the arithmetic circuit 107 as the semi-DF time code o'clock Ha, and in the selector circuit B106, the NDF time code o'clock Nb (00:00:00.04 o'clock) corresponding to the number of difference drop frames before and after the second arithmetic operation input to the input terminal Ia is output to the arithmetic circuit 107 as the NDF time code o'clock Hb.

The following third arithmetic operation is performed using the semi-DF time code o'clock Ha and the NDF time code o'clock Hb input to the arithmetic circuit 107.

| | |
|---|---|
| 01:27:04.06 | semi-DF time code o'clock Ha |
| + 00:00:00.04 | NDF time code o'clock Hb |
| 01:27:04.10 | semi-DF time code o'clock Oab |

The third arithmetic operation is completed in the arithmetic circuit 107.

In the process, in the arithmetic circuit 107, the pre-calculation semi-DF time code o'clock Ha (01:27:04.06 o'clock) is compared with the post-calculation semi-DF time code o'clock Oab (01:27:04.10 o'clock), and in view of the fact that the post-calculation semi-DF time code o'clock Oab assumes a temporally larger value, the signal Large is set to 1, and the fact that the post-calculation semi-DF time code o'clock Oab is larger is notified to the difference frame number calculation circuit 110.

As in the second add operation, in the drop frame amount calculation circuit A108, the post-calculation drop frame amount D is calculated using equation 5, and as 158 frames, output to the difference frame number calculation circuit 110.

In the drop frame amount calculation circuit B109, the pre-calculation drop frame amount Da is calculated using equation 5, and as 158 frames, output to the difference frame number calculation circuit 110.

In the difference frame number calculation circuit 110, the difference of the drop frame amount before and after the arithmetic operation is calculated from the add/subtract signal Sub (=0), the post-calculation drop frame amount D (=158 frames), the pre-calculation drop frame amount Da (=158 frames) and the time code magnitude information Large (=1) before and after arithmetic operation.

At the same time, the difference of the drop frame amount before and after arithmetic operation is 0 from the operation table of Table 6, the generation of a new drop frame is not detected in the arithmetic process of the arithmetic circuit 107.

As a result, the difference frame number calculation circuit 110 sets the recalculation control signal ReCalc to 0 to prohibit recalculation, and sets the NDF time code o'clock Nb to be added for recalculation to 00:00:00.00 o'clock and outputs it.

Under this condition (when the recalculation control signal ReCalc is set to 0 to prohibit the recalculation in the difference frame number calculation circuit 110), the drop frame correction circuit 111 should determine whether the semi-DF time code Oab output from the arithmetic circuit 107 corresponds to the drop frame or not. In the case of add operation, however, the semi-DF time code Oab fails to correspond to the drop frame, and therefore the semi-DF time code o'clock Oab is output as the DF time code DfTo (01:27:04.10 o'clock) to be finally output.

(Subtract Operation 1)

An explanation will be given of the subtract operation 1 involving the subtract operation process not accompanied by the carry down from 00:00:00.00 o'clock to 23:59:59.29 o'clock.

Assume that the DF time code o'clock Dfta providing an arithmetic reference is 01:25:37.25 o'clock, and the NDF time code o'clock NdfTb to be subtracted is 00:25:37.25 o'clock.

In the initial state, the selector circuit A105 outputs the DF time code o'clock DfTa input to the input terminal Ib, to the arithmetic circuit 107 as the DF time code o'clock Ha from the output terminal 0, and the selector circuit B106 outputs the DF time code o'clock NdfTb input to the input terminal Ib, to the arithmetic circuit 107 as the NDF time code o'clock Hb from the output terminal 0.

The arithmetic circuit 107 performs the following arithmetic operation.

| | |
|---|---|
| 01:25:37.25 | DF time code o'clock Ha |
| − 00:25:37.25 | NDF time code o'clock Hb |
| 01:00:00.00 | semi-DF time code o'clock Oab |

The first arithmetic operation is completed.

In the arithmetic circuit 107, the pre-calculation DF time code o'clock Ha (01:25:37.25 o'clock) is compared with the post-calculation semi-DF time code o'clock Oab (01:00:00.00 o'clock), and in view of the fact that the pre-calculation semi-DF time code o'clock Ha assumes a larger temporal value, the signal Large is set to 0, and the fact that the post-calculation DF time code o'clock is smaller is notified to the difference frame number calculation circuit 110.

In the drop frame amount calculation circuit A108, the post-calculation drop frame amount D is regarded as 108 frames from equation 5 (Table 5) and output to the difference frame number calculation circuit 110, and in the drop frame amount calculation circuit B109, the pre-calculation drop frame amount Da is regarded as 154 frames from equation 5 (Table 5) and output to the difference frame number calculation circuit 110.

The difference frame number calculation circuit 110 determines that the NDF time code o'clock Nb corresponding to 46 frames constituting the number DftD of the difference frames calculated using equation 8 from the difference between the pre-calculation drop frame amount Da (154 frames) and the post-calculation drop frame amount D (108 frames) is assumed to be 00:00:01.16 o'clock using equation 10 and output to the selector circuit B106.

In the process, the number of difference frames is not 0, and therefore the generation of a new drop frame is detected in the arithmetic process, and the recalculation signal ReCalc is set to 1 and output to the selector circuit A105 and the selector circuit B106 for recalculation.

In the selector circuit A105 and the selector circuit B106, the output select control signal C is 1, and therefore, in order to perform the second arithmetic operation the semi-DF time code o'clock Oab (01:00:00.00 o'clock) in the selector circuit A105 providing the result of the first arithmetic operation input to the input terminal Ia is output to the arithmetic circuit 107 as a semi-DF time code o'clock Ha, and in the selector circuit B106, the NDF time code o'clock Nb (00:00:01.16 o'clock) corresponding to the number of difference drop frames before and after the first arithmetic operation input to the input terminal Ia is output as a NDF code o'clock to the arithmetic circuit 107.

The following second arithmetic operation is performed with the semi-DF time code o'clock Ha and the NDF time code o'clock Hb input to the arithmetic circuit 107.

|                |                              |
|----------------|------------------------------|
| 01:00:00.00    | semi-DF time code o'clock Ha |
| − 00:00:01.16  | NDF time code o'clock Hb     |
| 00:59:58.14    | semi-DF time code o'clock Oab |

In the arithmetic circuit 107, the second arithmetic operation is completed.

In the process, in the arithmetic circuit 107, the pre-calculation semi-DF time code o'clock Ha (01:00:00.00 o'clock) is compared with the post-calculation semi-DF time code o'clock Oab (00:59:58.14 o'clock), and in view of the fact that the post-calculation semi-DF time code o'clock Oab assumes a temporally smaller value, the signal Large is set to 0, and the fact that the post-calculation semi-DF time code o'clock Oab is smaller is notified to the difference frame number calculation circuit 110.

As in the first subtract operation, in the drop frame amount calculation circuit A108, the post-calculation drop frame amount D is calculated using equation 5, and output as 108 frames to the difference frame number calculation circuit 110.

In the drop frame amount calculation circuit B109, the pre-calculation drop frame amount Da is calculated using equation 5, and output as 108 frames to the difference frame number detection circuit 110.

In the difference frame number calculation circuit 110, the difference of the drop frame amount before and after the arithmetic operation is calculated from the add/subtract signal Sub (=1), the post-calculation drop frame amount D (108 frames), the pre-calculation drop frame amount Da (108 frames) and the time code magnitude information Large (=0) before and after the arithmetic operation.

In the process, since the difference of the drop frame amount before and after the arithmetic operation is 0 from the operation table of Table 6, the generation of a new drop frame is not detected in the arithmetic process of the arithmetic circuit 107.

Thus, the difference frame number calculation circuit 110 sets the recalculation control signal ReCalc to 0 to prohibit the recalculation, while at the same time outputting by setting the NDF time code o'clock Nb to be added for recalculation, to 00:00:00.00 o'clock.

Under this condition (when the recalculation control signal ReCalc is set to 0 to prohibit recalculation in the difference frame number calculation circuit 110), the drop frame correction circuit 111 determines whether or not the semi-DF time code o'clock Oab output from the arithmetic circuit 107 corresponds to the drop frame.

In the process, the semi-DF time code o'clock Oab (00:59:58.14 o'clock) output from the arithmetic circuit 107 does not correspond to the drop frame, and therefore the semi-DF time code o'clock Oab is output as the last output DF time code o'clock DfTo (00:59:58.14 o'clock).

(Subtract Operation 2)

An explanation will be given of the subtract operation 2 involving the subtract operation process accompanied by the carry down from 00:00:00.00 o'clock to 23:59:59.29 o'clock.

Assume that the DF time code o'clock Dfta providing an arithmetic reference is 01:25:37.25 o'clock like in the subtract operation 1 described above, and the NDF time code o'clock NdfTb to be subtracted is 23:59:59.29 o'clock.

In the initial state, the selector circuit A105 outputs the DF time code o'clock DfTa input to the input terminal Ib, to the arithmetic circuit 107 as the DF time code o'clock Ha from the output terminal 0, and the selector circuit B106 outputs the DF time code o'clock NdfTb input to the input terminal Ib, to the arithmetic circuit 107 as the NDF time code o'clock Hb from the output terminal 0.

The arithmetic circuit 107 performs the following arithmetic operation.

|               |                              |
|---------------|------------------------------|
| 01:25:37.25   | DF time code o'clock Ha      |
| − 23:59:59.29 | NDF time code o'clock Hb     |
| 01:25:37.26   | semi-DF time code o'clock Oab |

The first arithmetic operation is completed.

In the arithmetic circuit 107, the pre-calculation DF time code o'clock Ha (01:25:37.25 o'clock) is compared with the post-calculation semi-DF time code o'clock Oab (01:25:37.26 o'clock), and in view of the fact that the pre-calculation semi-DF time code o'clock Ha assumes a smaller temporal value, the signal Large is set to 1, and the fact that the post-calculation semi-DF time code o'clock is larger is notified to the difference frame number calculation circuit 110.

In the drop frame amount calculation circuit A108, the post-calculation drop frame amount D is regarded as 154 frames from equation 5 (Table 5) and output to the difference frame number calculation circuit 110, and in the drop frame amount calculation circuit B109, the pre-calculation drop frame amount Da is regarded as 154 frames from equation 5 (Table 5) and output to the difference frame number calculation circuit 110.

The difference frame number calculation circuit 110 determines that the number of the difference frames calculated using equation 8 from the difference between the pre-calculation drop frame amount Da (154 frames) and the post-calculation drop frame amount D (154 frames) is 0 frame, and thus makes the first determination that no new drop frame is generated in the arithmetic process.

In view of the fact that the time code magnitude information signal Large before and after the arithmetic operation is set to 1, however, the generation of a carry down from 00:00:00.00 o'clock to 23:59:59.29 is detected in the first add operation.

The number of frames of the pre-calculation drop frame amount Da and the post-calculation drop frame amount D has developed no difference in frame drop amount. Originally, however, there exists a drop frame generated at the time traced back from the pre-calculation DF time code o'clock Ha to midnight (=24:00:00.00 o'clock), so that there exists a drop frame generated during the time traced back from the midnight (=24:00:00.00 o'clock) to the post-calculation semi-DF time code o'clock Oab.

From this, the number of frames obtained by adding the drop frame amount (2592 frames) for 24 o'clocks less the post-calculation drop frame amount D (154 frames), to the pre-calculation drop frame amount (154 frames) constitutes the original difference of the drop frame amount before and after the arithmetic operation to be calculated.

In the difference frame number calculation circuit 110, the difference DftD of the drop frame amount before and after the arithmetic operation in the first arithmetic operation in the arithmetic circuit 107 is calculated using equation 9, and the NDF time code o'clock Nb corresponding to the difference frame number DftD (2592 frames) is output to the selector circuit B106 as 00:01:26.12 o'clock.

Also, the recalculation is required because of the generation of a new drop frame during the arithmetic process, and the recalculation signal ReCalc for controlling the recalculation is set to 1 and output to the selector circuit A105 and the selector circuit B106.

In the selector circuit A105 and the selector circuit B106, the output select control signal C is 1, and therefore, in order to perform the second arithmetic operation in the selector circuit A105, the semi-DF time code o'clock Oab (01:25:37.26 o'clock) providing the result of the first arithmetic operation input to the input terminal Ia is output to the arithmetic circuit 107 as a semi-DF time code o'clock Ha, and in the selector circuit B106, the NDF time code o'clock Nb (00:01:26.12 o'clock) corresponding to the number of difference drop frames before and after the first arithmetic operation input to the input terminal Ia is output as a NDF time code o'clock Hb to the arithmetic circuit 107.

The following second arithmetic operation is performed with the semi-DF time code o'clock Ha and the NDF time code o'clock Hb input to the arithmetic circuit 107.

| | |
|---|---|
| 01:25:37.26 | semi-DF time code o'clock Ha |
| − 00:01:26.12 | NDF time code o'clock Hb |
| 01:24:11.14 | semi-DF time code o'clock Oab |

In the arithmetic circuit 107, the second arithmetic operation is completed.

In the process, in the arithmetic circuit 107, the pre-calculation semi-DF time code o'clock Ha (01:25:37.26 o'clock) is compared with the post-calculation semi-DF time code o'clock Oab (01:24:11.14 o'clock), and in view of the fact that the post-calculation semi-DF time code o'clock Oab assumes a temporally smaller value, the signal Large is set to 0, and the fact that the post-calculation semi-DF time code o'clock Oab is smaller is notified to the difference frame number calculation circuit 110.

In the drop frame amount calculation circuit A108, the post-calculation drop frame amount D from equation 5 (Table 5) is output as 152 frames to the difference frame number calculation circuit 110.

In the drop frame amount calculation circuit B109, the pre-calculation drop frame amount Da from equation 5 (Table 5) is output as 154 frames to the difference frame number calculation circuit 110.

In the difference frame number calculation circuit 110, the NDF time code o'clock Nb corresponding to the two frames of the difference frame number DftD calculated using equation 8 from the difference between the pre-calculation drop frame amount Da (154 frames) and the post-calculation drop frame amount D (152 frames) is output to the selector circuit B106 as 00:00:00.02 o'clock using equation 10.

In the process, since the number of difference frames is not 0, and therefore the generation of a new drop frame in the arithmetic process is detected, and the recalculation signal ReCalc is set to 1 and output to the selector circuit A105 and the selector circuit B106 for recalculation.

In the selector circuit A105 and the selector circuit B106, the output select control signal C is 1, and therefore, in order to perform the third arithmetic operation the semi-DF time code o'clock Oab (01:24:11.14 o'clock) in the selector circuit A105 providing the result of the second arithmetic operation input to the input terminal Ia is output to the arithmetic circuit 107 as a semi-DF time code o'clock Ha, and in the selector circuit B106, the NDF time code o'clock Nb (00:00:00.02 o'clock) corresponding to the number of difference drop frames before and after the second arithmetic operation input to the input terminal Ia is output as a NDF time code o'clock Hb to the arithmetic circuit 107.

The following third arithmetic operation is performed with the semi-DF time code o'clock Ha and the NDF time code o'clock Hb input to the arithmetic circuit 107.

| | |
|---|---|
| 01:24:11.14 | semi-DF time code o'clock Ha |
| − 00:00:00.02 | NDF time code o'clock Hb |
| 01:24:11.12 | semi-DF time code o'clock Oab |

In the arithmetic circuit 107, the third arithmetic operation is completed.

In the process, in the arithmetic circuit 107, the pre-calculation semi-DF time code o'clock Ha (01:24:11.14 o'clock) is compared with the post-calculation semi-DF time code o'clock Oab (01:24:11.12 o'clock), and in view of the fact that the post-calculation semi-DF time code o'clock Oab assumes a temporally smaller value, the signal Large is set to 0, and the fact that the post-calculation semi-DF time code o'clock Oab is smaller is notified to the difference frame number calculation circuit As in the second subtract operation, in the drop frame amount calculation circuit A108, the post-calculation drop frame amount D is calculated using equation 5, and as 152 frames output to the difference frame number calculation circuit 110.

In the drop frame amount calculation circuit B109, the pre-calculation drop frame amount Da is calculated using equation 5, and as 152 frames output to the difference frame number calculation circuit 110.

In the difference frame number calculation circuit 110, the difference of the drop frame amount before and after the arithmetic operation is calculated from the add/subtract signal Sub (=1), the post-calculation drop frame amount D (=152 frames), the pre-calculation drop frame amount Da (=152 frames) and the time code magnitude information Large (=0) before and after the arithmetic operation.

In the process, the difference of the drop frame amount before and after the arithmetic operation is 0 from the operation table of Table 6, and therefore the generation of a new drop frame in the arithmetic process of the arithmetic circuit 107 is not detected.

Thus, the difference frame number calculation circuit 110 sets the recalculation control signal ReCalc to 0 to prohibit the recalculation, while at the same time outputting by setting the NDF time code o'clock Nb to be added for recalculation, to 00:00:00.00 o'clock.

Under this condition (when the recalculation control signal ReCalc is set to 0 to prohibit recalculation in the difference frame number calculation circuit 110), the drop frame correction circuit 111 determines whether or not the semi-DF time code o'clock Oab output from the arithmetic circuit 107 corresponds to the drop frame.

In the process, the semi-DF time code o'clock Oab (01:24:11.12 o'clock) output from the arithmetic circuit 107 does not correspond to the drop frame, and therefore the semi-DF time code o'clock Oab is output as the last output DF time code o'clock DfTo (01:24:11.12 o'clock).

(Subtract Operation 3)

An explanation will be given of the subtract operation 3 with the result of the subtract operation corresponding to the drop frame.

Assume that the DF time code o'clock Dfta providing an arithmetic reference is the same 01:25:37.25 o'clock as in the subtract operation 2 described above, and the NDF time code o'clock NdfTb to be subtracted is 00:24:36.10 o'clock.

In the initial state, the selector circuit A105 outputs the DF time code o'clock DfTa input to the input terminal Ib, to the arithmetic circuit 107 as the DF time code o'clock Ha from the output terminal 0, and the selector circuit B106 outputs the DF time code o'clock NdfTb input to the input terminal Ib, to the arithmetic circuit 107 as the NDF time code o'clock Hb from the output terminal 0.

The arithmetic circuit 107 performs the following arithmetic operation.

| 01:25:37.25 | DF time code o'clock Ha |
| − 00:24:36.10 | NDF time code o'clock Hb |
| 01:01:01.15 | semi-DF time code o'clock Oab |

The first arithmetic operation is completed.

In the arithmetic circuit 107, the pre-calculation DF time code o'clock Ha (01:25:37.25 o'clock) is compared with the post-calculation semi-DF time code o'clock Oab (01:01:01.15 o'clock), and in view of the fact that the pre-calculation semi-DF time code o'clock Ha assumes a larger temporal value, the signal Large is set to 0, and the fact that the post-calculation DF time code o'clock is smaller is notified to the difference frame number calculation circuit 110.

In the drop frame amount calculation circuit A108, the post-calculation drop frame amount D is regarded as 110 frames from equation 5 (Table 5) and output to the difference frame number calculation circuit 110, and in the drop frame amount calculation circuit 109, the pre-calculation drop frame amount Da is regarded as 154 frames from equation 5 (Table 5), and output to the difference frame number calculation circuit 110.

In the difference frame number calculation circuit 110, the NDF time code o'clock Nb corresponding to the 44 frames of the difference frame number DftD calculated using equation 8 from the difference between the pre-calculation drop frame amount Da (154 frames) and the post-calculation drop frame amount (110 frames) is output to the selector circuit B106 as 00:00:01.14 o'clocks.

In the process, since the number of difference frames is not 0, the generation of a new drop frame in the arithmetic process is detected, and the recalculation signal ReCalc is set to 1 and output to the selector circuit A105 and the selector circuit B106 for recalculation.

In the selector circuit A105 and the selector circuit B106, the output select control signal C is 1, and therefore, in order to perform the second arithmetic operation in the selector circuit A105, the semi-DF time code o'clock Oab (01:01:01.15 o'clock) providing the result of the first arithmetic operation input to the input terminal Ia is output to the arithmetic circuit 107 as a semi-DF time code o'clock Ha, and in the selector circuit B106, the NDF time code o'clock Nb (00:00:01.14 o'clock) corresponding to the number of difference drop frames before and after the first arithmetic operation input to the input terminal Ia is output as a NDF time code o'clock Hb to the arithmetic circuit 107.

The following second arithmetic operation is performed with the semi-DF time code o'clock Ha and the NDF time code o'clock Hb input to the arithmetic circuit 107.

| 01:01:01.15 | semi-DF time code o'clock Ha |
| − 00:00:01.14 | NDF time code o'clock Hb |
| 01:01:00.01 | semi-DF time code o'clock Oab |

In the arithmetic circuit 107, the second arithmetic operation is completed.

In the process, in the arithmetic circuit 107, the pre-calculation semi-DF time code o'clock Ha (01:01:01.15 o'clock) is compared with the post-calculation semi-DF time code o'clock Oab (01:01:00.01 o'clock), and in view of the fact that the post-calculation semi-DF time code o'clock Oab assumes a temporally smaller value, the signal Large is set to 0, and the fact that the post-calculation semi-DF time code o'clock Oab is smaller is notified to the difference frame number calculation circuit 110.

As in the first subtract operation, in the drop frame amount calculation circuit A108, the post-calculation drop frame amount D is calculated using equation 5, and as 110 frames output to the difference frame number calculation circuit 110.

In the drop frame amount calculation circuit B109, the pre-calculation drop frame amount Da is calculated using equation 5, and as 110 frames output to the difference frame number calculation circuit 110.

In the difference frame number calculation circuit 110, the difference of the drop frame amount before and after the arithmetic operation is calculated from the add/subtract signal Sub (=1), the post-calculation drop frame amount D (=110 frames), the pre-calculation drop frame amount Da (=110 frames) and the time code magnitude information Large (=0) before and after the arithmetic operation.

In the process, the difference of the drop frame amount before and after the arithmetic operation is 0 from the operation table of Table 6, and therefore the generation of a new drop frame in the arithmetic process of the arithmetic circuit 107 is not detected.

Thus, the difference frame number calculation circuit 110 sets the recalculation control signal ReCalc to 0 to prohibit the recalculation, while at the same time outputting by setting the NDF time code o'clock Nb to be added for recalculation to 00:00:00.00 o'clock.

Under this condition (when the recalculation control signal ReCalc is set to 0 to prohibit recalculation in the difference frame number calculation circuit 110), the drop frame correction circuit 111 determines whether or not the semi-DF time code o'clock Oab output from the arithmetic circuit 107 corresponds to the drop frame.

In the process, the semi-DF time code o'clock Oab (01:01:00.01 o'clock) output from the arithmetic circuit 107 corresponds to a drop frame, and therefore, the following arithmetic operation is performed for correction of −2 frames in the drop frame correction circuit 111.

| | |
|---|---|
| 01:01:00.01 | semi-DF time code o'clock Oab |
| − 00:00:00.02 | −2 frame correction value |
| 01:00:59.29 | |

The DF time code o'clock (01:00:59.29) thus corrected by −2 frames is output as the final output DF time code o'clock DfTo (01:00:59:29 o'clock).

(Embodiment 2)

Figure 5:
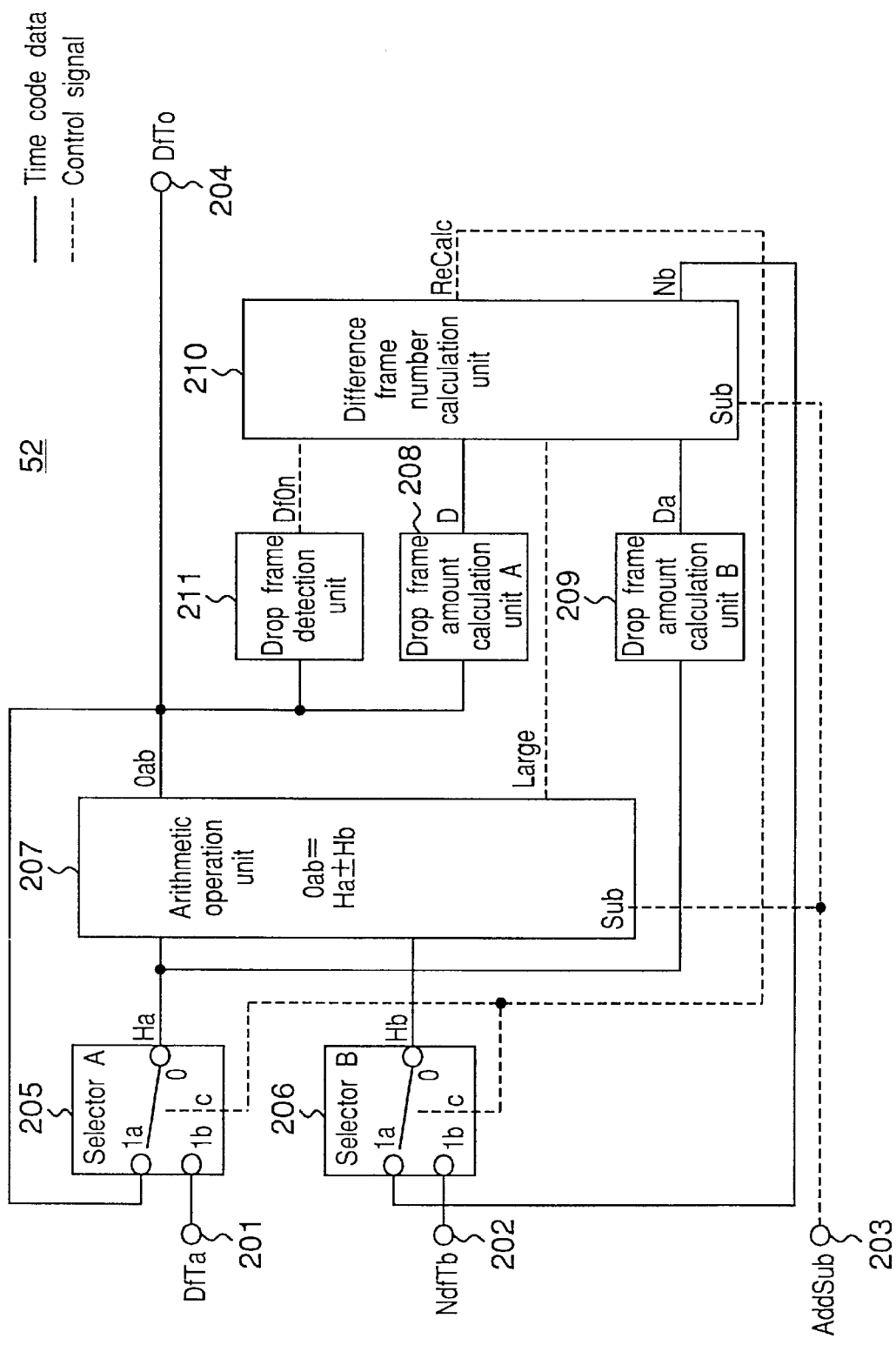
FIG. 5 is a general block diagram showing a time code arithmetic apparatus according to a second embodiment of the invention.

FIG. 5 is a general block diagram showing an embodiment according to claim 2 of the invention.

The DF time code DfTa providing an arithmetic reference is input to an input terminal 201, and the NDF time code o'clock NdfTb for add/subtract operation is input to an input terminal 202.

In the initial state (at the time of operation start), a difference frame number calculation circuit 210 outputs a recalculation control signal ReCalc (=0) constituting a control signal for outputting a time code input to the input terminal Ib, to the selector circuit A205 and the selector circuit B206, while at the same time outputting 00:00:00.00 o'clock as the NDF time code o'clock Nb corresponding to the difference in the drop frames before and after the arithmetic operation.

By the way, the operation of the difference frame number calculation circuit 210 is performed according to the operation table of Table 7 based on the operation explained as the second one of the six basic principles described above in [Means for Solving the Problem] referring to a method of detecting drop frames generated newly in the second arithmetic process. Thus, from the input information including the post-calculation drop frame amount D, the pre-calculation drop frame amount Da, the time code magnitude information Large before and after arithmetic operation and the add/subtract information Sub, and using equations 6 to 9, the output information including the recalculation control signal ReCalc and the NDF time code o'clock Nb corresponding to the difference in the drop frames before and after arithmetic operation are output.

By the way, the operation of the selector circuit A205 and the selector circuit B206 is described in the operation list of Table 2.

Next, in the time code arithmetic apparatus in initial state, according to the operation of the difference frame number calculation circuit 210, the selector circuit A205 outputs the DF time code o'clock DfTa input to the input terminal Ib, to the arithmetic circuit 207 as the NDF time code o'clock Ha, and the selector circuit B206 outputs the NDF time code o'clock NDfTb input to the input terminal Ib, to the arithmetic circuit 207 as the DF time code o'clock Hb.

Then, the arithmetic circuit 207, in which the input DF time code o'clock Ha is regarded as the NDF time code o'clock, adds/subtracts the NDF time code o'clock Hb in accordance with the add/subtract signal Sub, and outputs the semi-NDF time code o'clock Oab providing the result of arithmetic operation.

Also, the DF time code o'clock Ha is compared with the semi-DF time code o'clock Oab to output the magnitude information Large.

The magnitude information Large is output as 0 in the case where the pre-calculation DF time code o'clock Ha is temporally larger than the post-calculation semi-DF time code o'clock Oab, as 1 in the case where the pre-calculation DF time code o'clock Ha is temporally smaller than the post-calculation semi-DF time code o'clock Oab, and as 2 in the case where the pre-calculation DF time code o'clock Ha is temporally equal to the post-calculation semi-DF time code o'clock Oab thereby to complete the first arithmetic operation.

By the way, the operation of the arithmetic circuit 207 is described in the operation table explained in detail in Table 3.

In the drop frame amount calculation circuit A208, the post-calculation drop frame amount D corresponding to the total number of the drop frames skipped while the time elapses from 00:00:00.00 o'clock to the semi-DF time code o'clock Oab providing the result of the first arithmetic operation output from the arithmetic circuit 207 is calculated from the operation table of Table 5 based on equation 5 and output to the difference frame number calculation circuit 210.

In the drop frame amount calculation circuit B209, the pre-calculation drop frame amount Da corresponding to the total number of the drop frames skipped while the time elapses from 00:00:00.00 o'clock to the DF time code o'clock Ha input to the arithmetic circuit 207 is calculated from the operation table of Table 5 based on equation 5 and output to the difference frame number calculation circuit 210.

In the difference frame number calculation circuit 210, based on Table 7 as described above, the drop frames newly generated in the process of arithmetic operation of the arithmetic circuit 207 are detected by the difference between the post-calculation drop frame amount D and the pre-calculation drop frame amount Da.

In the first arithmetic operation by the arithmetic circuit 207, in the case where there is a difference in the drop frame amount before and after the arithmetic operation (a new drop frame is generated in the arithmetic process), the NDF time code o'clock Nb corresponding to the difference in the drop frame amount before and after the arithmetic operation is calculated from the operation table of Table 7 and output.

At the same time, with the aim of recalculating the semi-DF time code o'clock Oab providing the result of calculation in the arithmetic circuit 207 and the NDF time code o'clock Nb corresponding to the difference in drop frames before and after the arithmetic operation in the arithmetic circuit 207, a recalculation control signal ReCalc (=1) providing a control signal is output by which the selector circuit A205 is caused to output the semi-DF time code o'clock Oab output from the arithmetic circuit 207 to be output from the arithmetic circuit 207, and the selector circuit B206 is caused to output the NDF time code o'clock Nb corresponding to the difference of the drop frame before and after the arithmetic operation in the arithmetic circuit 207 from the output terminal 0.

The selector circuit A205 outputs the semi-DF time code o'clock Oab input to the input terminal Ia, to the arithmetic circuit 207 as a semi-DF time code o'clock Ha in response to the recalculation control signal ReCalc (=1).

The selector circuit B206 outputs the NDF time code o'clock Nb input to the input terminal Ia, to the arithmetic circuit 207 as a NDF time code o'clock Hb in response to the recalculation control signal ReCalc (=1)

Next, in the arithmetic circuit 207, the input semi-DF time code o'clock Ha is regarded as the NDF time code o'clock and the NDF time code o'clock Hb is added/subtracted by the add/subtract signal Sub, and the semi-NDF time code o'clock Oab providing the result of the arithmetic operation is output.

Also, the semi-DF time code o'clock Ha is compared with the semi-DF time code o'clock Oab, and like in the first arithmetic operation, the magnitude information Large is output thereby to end the second arithmetic operation.

In the drop frame amount calculation circuit A208, like in the first arithmetic operation, the post-calculation drop frame amount D in the second arithmetic operation is calculated, and output to the difference frame number calculation circuit 210.

In the drop frame amount calculation circuit B209, like in the first arithmetic operation, the pre-calculation drop frame amount Da in the second arithmetic operation is calculated, and output to the difference frame number calculation circuit 210.

In the difference frame number calculation circuit 210, like in the first arithmetic operation, the drop frames newly generated in the calculation process of the arithmetic circuit 207 in the second arithmetic operation is detected.

In this way, in the case where there is a difference in the drop frame amount before and after the arithmetic operation (in the case where a drop frame has been newly generated in the arithmetic process) in the second or subsequent arithmetic operation of the arithmetic circuit 207, like in the first arithmetic operation, and in the case where there is a difference in the drop frame amount before and after the arithmetic operation, the difference frame number calculation circuit 210 outputs the recalculation control signal ReCalc (=1) and the NDF time code o'clock Nb to be recalculated, and is adapted to repeat the arithmetic operation.

In this process of the repeated arithmetic operation, in the case where there is no difference as described above in the difference frame number calculation circuit 210, the semi-DF time code o'clock Oab output from the arithmetic circuit 207 indicates the semi-DF time code o'clock at which all the arithmetic operation ends on the NDF time code o'clock NdfTb to be calculated and the drop frame amount newly generated in the arithmetic process based on the DF time code o'clock DfTa providing an arithmetic reference.

Now, the operation of the drop frame detection circuit 211 will be explained.

The drop frame detection circuit 211 determines whether the semi-DF time code o'clock Oab output from the arithmetic circuit 207 corresponds to a drop frame or not, and in the case where it corresponds to a drop frame, sets the drop frame corresponding signal DfOn to 1, or in the case where it does not correspond to the drop frame, sets the drop frame corresponding signal DfOn to 0, which signal is thus always output to. the difference frame number calculation circuit 210.

By the way, the operation of the drop frame detection circuit 211 is described in the operation list of Table 11.

In the difference frame number calculation circuit 210, only after the difference described above is eliminated, the correction process is executed by the drop frame corresponding signal DfOn output from the drop frame detection circuit 211.

In the case where the add/subtract signal Sub is the add information (=0), the semi-DF time code o'clock Oab output from the arithmetic circuit 207 does not correspond to the drop frame, and therefore the drop frame corresponding signal DfOn only involved is not set to the corresponding information (=1). As a result, in the difference frame number calculation circuit 210, the recalculation control signal ReCalc (=0) for prohibiting the recalculation and the NDF time code o'clock Nb (=00:00:00.00 o'clock) to be recalculated are output to prohibit the repeated calculation, and the semi-DF time code o'clock Oab output from the arithmetic circuit 207 at this time coincides with the DF time code finally calculated, and therefore is output as the DF time code o'clock DfTo as it is.

In the case where the add/subtract signal Sub is the subtract information (=1), and in the case where the semi-DF time code o'clock Oab output from the arithmetic circuit 207 does not correspond to the drop frame, it coincides with the complete DF time code o'clock finally calculated, and therefore is output as a DF time code o'clock DfTo as it is.

In the case where the semi-DF time code o'clock Oab output from the arithmetic circuit 207 corresponds to the drop frame, it follows that the last semi-DF time code o'clock Oab repetitively calculated by the arithmetic circuit 207 corresponds to the drop frame on each minute other than 10 minutes without detecting the difference of the drop frame amount before and after the last arithmetic operation. The following is an example.

| | |
|---|---|
| 00:01:58.28 | pre-calculation semi-DF time code o'clock Ha |
| − 00:00:58.27 | NDF time code o'clock Hb to be calculated |
| 00:01:00.01 | post-calculation semi-DF time code o'clock Oab |

The drop frame amounts before and after the arithmetic operation are both two frames, and there is no difference in the drop frame amount between before and after the arithmetic operation. Thus, no new drop frame is generated during the arithmetic process.

In such a case, in order to skip the drop frame, the correction by −2 frames is required.

In the difference frame number calculation circuit 210, the NDF time code o'clock Nb corresponding to 2 frames is output to the selector circuit B206 as 00:00:00.02 o'clock, and at the same time, in order to recalculate the semi-DF time code o'clock Oab providing the result of the arithmetic operation in the arithmetic circuit 207 and the NDF time code o'clock Nb corresponding to the correction time of −2 frames, the recalculation control signal ReCalc (=1) providing a control signal is output for causing the selector circuit A205 to output the semi-DF time code o'clock Oab output from the output terminal 0, and causing the selector circuit B206 to output the NDF time code o'clock Nb corresponding to the correction time of −2 frames from the output terminal 0.

The selector circuit A205, in response to the recalculation control signal ReCalc (=1), outputs the semi-DF time code o'clock Oab input to the input terminal Ia, to the arithmetic circuit 207 as a semi-DF time code o'clock Ha.

The selector circuit B206, in response to the recalculation control signal ReCalc (=1), outputs the NDF time code o'clock Nb input to the input terminal Ia, to the arithmetic circuit 207 as a NDF time code o'clock Hb.

Then, in the arithmetic circuit 207, the input semi-DF time code o'clock Ha is handled as a NDF time code o'clock, the NDF time code o'clock Hb is subtracted in response to the add/subtract signal Sub (=1), and the semi-NDF time code o'clock Oab providing the result of the arithmetic operation is output.

Also, the DF time code o'clock Ha is compared with the semi-DF time code o'clock Oab and the magnitude information Large is output.

Since the pre-calculation DF time code o'clock Ha assumes a temporally larger value than the post-calculation semi-DF time code o'clock Oab, the magnitude information Large turns "0" thereby ending the arithmetic operation.

The drop frame amount calculation circuit A208, like in the first and second arithmetic operation, calculates the post-calculation drop frame amount D and outputs it to the difference frame number calculation circuit 210.

The drop frame amount calculation circuit B209, like in the first and second arithmetic operation, calculates the pre-calculation drop frame amount Da and outputs it to the difference frame number calculation circuit 210.

The difference frame number calculation circuit 210, in the preceding arithmetic process of the arithmetic circuit 207, no drop frame has occurred before and after the arithmetic operation and the semi-DF time code o'clock Oab providing the result of arithmetic operation corresponds to the drop frame for correction of −2 frames. In the current arithmetic operation, therefore, the drop frame generated newly in the arithmetic process of the arithmetic circuit 207 due to the difference between the post-calculation drop frame amount D and the pre-calculation drop frame amount Da is not required to be detected (in which case the difference of the drop frame amount before and after the arithmetic operation is of course 2 frames). In order to prohibit the subsequent recalculation, therefore, the difference frame number calculation circuit 210 sets the recalculation control signal ReCalc to 0, while at the same time setting the NDF time code o'clock Nb to be recalculated to 00:00:00.00 o'clock and outputs it.

The semi-DF time code o'clock Oab output from the arithmetic circuit 207 at this time coincides with the complete DF time code o'clock finally calculated, and is output as the DF time code o'clock DfTo as it is.

Also, in the case where the embodiment according to claim 2 of the invention is configured with hardware, the semi-DF time code o'clock Oab output from the arithmetic circuit 207 is directly output as the DF time code o'clock DfTo from the output terminal 204, and therefore the output timing of the DF time code o'clock DfTo is required to be controlled.

For this reason, a configuration may be conceived in which the timing management is carried out by providing a buffer circuit, for example, for managing the output timing between the semi-DF time code o'clock Oab and the DF time code o'clock DFTo (output terminal 204).

Also, it is necessary that the output time code o'clock Ha or the output time code o'clock Hb is output based on the select control signal when the time code input to the selector circuit A205 and the selector circuit B206 undergoes a change, or the arithmetic circuit 207 is controlled to carry out the arithmetic operation when the input time code undergoes a change thereby to calculate and output the semi-DF time code o'clock Oab.

In the embodiment of claim 2 of the invention, however, only the arithmetic principle is explained but not a detailed timing control.

Now, in order to facilitate the understanding of the embodiment according to claim 2 of the invention, the add operations 3 to 4 and the subtract operations 4 to 6 will be explained using specific figures.

(Add Operation 3)

An explanation will be given of the add operation 3 which is not accompanied by the carry up from 23:59:59.29 o'clock to 00:00:00.00 o'clock in the add arithmetic process.

Assume that the DF time code o'clock DfTa constituting a reference for arithmetic operation is, like in the add operation 1, 01:25:37.25 o'clock, and the NDF time code o'clock NdfTb to be added is, like in the add operation 1, 01:25:37.25 o'clock. The operation is exactly the same up to the second arithmetic operation in the arithmetic circuit 107 described in the add operation 1, and therefore only the operation of the second and subsequent process will be explained.

The arithmetic circuit 207 outputs the semi-DF time code o'clock Oab (02:51:20.24 o'clock) representing the result of second arithmetic operation in the arithmetic circuit 207.

In the arithmetic circuit 207, the pre-calculation semi-DF time code o'clock Ha (02:51:15.20 o'clock) is compared with the post-calculation semi-DF time code o'clock Oab (02:51:20.24 o'clock). Since the post-calculation semi-DF time code o'clock Oab is temporally larger, the signal Large is set to 1, and the fact that the post-calculation semi-DF time code o'clock Oab is larger is notified to the difference frame number calculation circuit 210.

As in the first add operation, in the drop frame amount calculation circuit A208, the post-calculation drop frame amount D is calculated using equation 5, and as 308 frames output to the difference frame number calculation circuit 210.

In the drop frame amount calculation circuit B209, the pre-calculation drop frame amount Da is calculated using equation 5, and as 308 frames output to the difference frame number calculation circuit 210.

In the difference frame number calculation circuit 210, the difference of the drop frame amount before and after the arithmetic operation is calculated from the add/subtract signal Sub (=0), the post-calculation drop frame amount D (=308 frames), the pre-calculation drop frame amount Da (=308 frames) and the magnitude information Large (=1) of the time code before and after the arithmetic operation.

In the process, the difference of the drop frame amount before and after the arithmetic operation is 0 from the operation table of Table 7, and therefore the generation of a new drop frame in the arithmetic process of the arithmetic circuit 207 is not detected.

Only under this condition (in the absence of generation of a new drop frame before and after the arithmetic operation in the arithmetic circuit 207), the difference frame number calculation circuit 210 performs the process in response to the drop frame corresponding signal DfOn output from the drop frame detection circuit 211.

In the add operation, however, the post-calculation semi-DF time code o'clock Oab does not correspond to the drop frame, nor the drop frame corresponding signal DfOn is set to 1. Thus, the NDF time code o'clock Nb to be recalculated is set to 00:00:00.00 o'clock, and the recalculation signal ReCalc is set to 0 to prohibit the recalculation.

Then, this semi-DF time code o'clock Oab is output as the DF time code o'clock DfTo (02:51:20.24 o'clock) to be finally output.

(Add Operation 4)

An explanation will be given of the add operation 4 which is accompanied by the carry up from 23:59:59.29 o'clock to 00:00:00.00 o'clock in the add arithmetic process.

Assume that the DF time code o'clock Dfta constituting a reference for arithmetic operation is, like in the add operation 2, 01:25:37.25 o'clock, and the NDF time code o'clock NdfTb to be added is, like in the add operation 2, 23:59:59.29 o'clock. In the add operation 4, the process is exactly the same up to the third arithmetic operation in the arithmetic circuit 107 described in the add operation 2, and therefore only the operation of the third and subsequent process will be explained.

In the arithmetic circuit 207, the pre-calculation semi-DF time code o'clock Ha (01:27:04.06 o'clock) is compared with the post-calculation semi-DF time code o'clock Oab (01:27:04.10 o'clock) in the third arithmetic operation. Since the post-calculation semi-DF time code o'clock Oab is temporally larger, the signal Large is set to 1, and the fact that the post-calculation semi-DF time code o'clock Oab is larger is notified to the difference frame number calculation circuit 210.

As in the second add operation, in the drop frame amount calculation circuit A208, the post-calculation drop frame D is calculated using equation 5, and as 158 frames, output to the difference frame number calculation circuit 210.

In the drop frame amount calculation circuit B209, the pre-calculation drop frame amount Da is calculated using equation 5, and as 108 frames output to the difference frame number calculation circuit 210.

In the difference frame number calculation circuit 210, the difference of the drop frame amount before and after the arithmetic operation is calculated from the add/subtract signal Sub (=0), the post-calculation drop frame amount D (=158 frames), the pre-calculation drop frame amount Da (=158 frames) and the magnitude information Large (=1) of the time code before and after the arithmetic operation.

In the process, the difference of the drop frame amount before and after the arithmetic operation is 0 from the operation table of Table 7, and therefore the generation of a new drop frame in the arithmetic process of the arithmetic circuit 207 is not detected.

Only under this condition (in the absence of generation of a new drop frame before and after the arithmetic operation in the arithmetic circuit 207), the difference frame number calculation circuit 210 performs the process in response to the drop frame corresponding signal DfOn output from the drop frame detection circuit 211.

In the add operation, however, the post-calculation semi-DF time code o'clock Oab does not correspond to the drop frame, nor the drop frame corresponding signal DfOn is set to 1. Thus, the NDF time code o'clock Nb to be recalculated is set to 00:00:00.00 o'clock, and the recalculation signal ReCalc is set to 0 to prohibit the recalculation.

Then, this semi-DF time code o'clock Oab is output as the DF time code o'clock DfTo (01:27:04.10 o'clock) to be finally output.

(Subtract Operation 4)

An explanation will be given of the subtract operation 4 which is not accompanied by the carry down from 00:00:00.00 o'clock to 23:59:59.29 o'clock in the subtract arithmetic process.

Assume that the DF time code o'clock Dfta constituting a reference for arithmetic operation is, like in the subtract operation 1 described above, 01:25:37.25 o'clock, and the NDF time code o'clock NdfTb to be subtracted, like in the subtract operation 1, 00:25:37.25 o'clock. In the subtract operation 4, the process is exactly the same up to the second arithmetic operation in the arithmetic circuit 107 described in the subtract operation 1, and therefore only the second and subsequent arithmetic operation will be explained.

In the arithmetic circuit 207, the pre-calculation semi-DF time code o'clock Ha (01:00:00.00 o'clock) is compared with the post-calculation semi-DF time code o'clock Oab (00:59:58.14 o'clock) in the second arithmetic operation. Since the post-calculation semi-DF time code o'clock Oab is temporally smaller, the signal Large is set to 0, and the fact that the post-calculation semi-DF time code o'clock Oab is smaller is notified to the difference frame number calculation circuit 210.

As in the first subtract operation, in the drop frame amount calculation circuit 208, the post-calculation drop frame amount D is calculated using equation 5, and as 108 frames, output to the difference frame number calculation circuit 210.

In the drop frame amount calculation circuit B209, the pre-calculation drop frame amount Da is calculated using equation 5, and as 108 frames output to the difference frame number calculation circuit 210.

In the difference frame number calculation circuit 210, the difference of the drop frame amount before and after the arithmetic operation is calculated from the add/subtract signal Sub (=1), the post-calculation drop frame amount D (=108 frames), the pre-calculation drop frame amount Da (=108 frames) and the time code magnitude information Large (=0) before and after the arithmetic operation.

In the process, the difference of the drop frame amount before and after the arithmetic operation is 0 from the operation table of Table 7, and therefore the generation of a new drop frame in the arithmetic process of the arithmetic circuit 207 is not detected.

Only under this condition (when a new drop frame is not generated before and after the arithmetic operation in the arithmetic circuit 207), the difference frame number calculation circuit 210 processes in response to the drop frame corresponding signal DfOn output from the drop frame calculation circuit 211.

The semi-DF time code o'clock Oab (00:59:58.14 o'clock) after the arithmetic operation in the arithmetic circuit fails to correspond to the drop frame, and therefore the drop frame corresponding signal DfOn output from the detection circuit 211 is set to 0, so that the correction of −2 frames is not required. Thus, the NDF time code o'clock Nb to be recalculated is set to 00:00:00.00 and the recalculation signal ReCalc to 0 thereby to prohibit recalculation.

Then, the semi-DF time code o'clock Oab is output as the finally output DF time code o'clock DfTo (00:59:58.14 o'clock.

(Subtract Operation 5)

An explanation will be given of the subtract operation 5 accompanied by the carry down from 00:00:00.00 o'clock to 23:59:59.29 o'clock in the subtract arithmetic process.

Assume that the DF time code o'clock Dfta constituting a reference for arithmetic operation is, like in the subtract operation 2 described above, 01:25:37.25 o'clock, and the NDF time code o'clock NdfTb to be subtracted, like in the subtract operation 2, 23:59:59.29 o'clock. In the subtract operation 5, the process is exactly the same up to the third arithmetic operation in the arithmetic circuit 107 described in the subtract operation 2, and therefore only the third and subsequent arithmetic operation will be explained.

In the arithmetic circuit 207, the pre-calculation semi-DF time code o'clock Ha (01:24:11.14 o'clock) is compared with the post-calculation semi-DF time code o'clock Oab (01:24:11.12 o'clock) in the third arithmetic operation. Since the post-calculation semi-DF time code o'clock Oab is temporally smaller, the signal Large is set to 0, and the fact that the post-calculation semi-DF time code o'clock Oab is smaller is notified to the difference frame number calculation circuit 210.

As in the second subtract operation, in the drop frame amount calculation circuit A208, the pre-calculation drop frame amount D is calculated using equation 5, and as 152 frames, output to the difference frame number calculation circuit 210.

In the drop frame amount calculation circuit B209, the pre-calculation drop frame amount Da is calculated using equation 5, and as 152 frames, output to the difference frame number calculation circuit 210.

In the difference frame number calculation circuit 210, the difference of the drop frame amount before and after the arithmetic operation is calculated from the add/subtract signal Sub (=1), the post-calculation drop frame amount D (=152 frames), the pre-calculation drop frame amount Da (=152 frames) and the magnitude information Large (=0) of the time code before and after the arithmetic operation.

In the process, the difference of the drop frame amount before and after the arithmetic operation is 0 from the operation table of Table 7, and therefore the generation of a new drop frame in the arithmetic process of the arithmetic circuit 207 is not detected.

Only under this condition (in the absence of generation of a new drop frame before and after the arithmetic operation in the arithmetic circuit 207), the difference frame number calculation circuit 210 performs the process in response to the drop frame corresponding signal DfOn output from the drop frame detection circuit 211.

Since the post-calculation semi-DF time code o'clock Oab (01:24:11.12 o'clock) in the arithmetic circuit 207 fails to correspond to the drop frame, however, the drop frame corresponding signal DfOn output from the detection circuit 211 is set to 0. Thus, the correction of −2 frames is not required, and the NDF time code o'clock Nb to be recalculated is set to 00:00:00.00 o'clock, while the recalculation signal ReCalc is set to 0 to prohibit the recalculation.

Then, this semi-DF time code o'clock Oab is output as the DF time code o'clock DfTo (01:24:11.12 o'clock) to be finally output.

(Subtract Operation 6)

An explanation will be given of the subtract operation 6 in which the result of the subtract operation corresponds to a drop frame.

Assume that the DF time code o'clock DfTa constituting a reference for arithmetic operation is, like in the subtract operation 3 described above, 01:25:37.25 o'clock, and the NDF time code o'clock NdfTb to be subtracted, like in the subtract operation 3, 00:24:36.10 o'clock. In the subtract operation 6, the process is exactly the same up to the second arithmetic operation in the arithmetic circuit 107 described in the subtract operation 3, and therefore only the second and subsequent arithmetic operation will be explained.

In the arithmetic circuit 207, the pre-calculation semi-DF time code o'clock Ha (01:01:01.15 o'clock) is compared with the post-calculation semi-DF time code o'clock Oab (01:01:00.01 o'clock) in the second arithmetic operation. Since the post-calculation semi-DF time code o'clock Oab is temporally smaller, the signal Large is set to 0, and the fact that the post-calculation semi-DF time code o'clock Oab is smaller is notified to the difference frame number calculation circuit 210.

As in the first subtract operation, in the drop frame amount calculation circuit A208, the pre-calculation drop frame amount D is calculated using equation 5, and as 110 frames, output to the difference frame number calculation circuit 210.

In the drop frame amount calculation circuit B209, the pre-calculation drop frame amount Da is calculated using equation 5, and as 110 frames, output to the difference frame number calculation circuit 210.

In the difference frame number calculation circuit 210, the difference of the drop frame amount before and after the arithmetic operation is calculated from the add/subtract signal Sub (=1), the post-calculation drop frame amount D (=110 frames), the pre-calculation drop frame amount Da (=110 frames) and the magnitude information Large (=0) of the time code before and after the arithmetic operation.

In the process, the difference of the drop frame amount before and after the arithmetic operation is 0 from the operation Table 7, and therefore the generation of a new drop frame in the arithmetic process of the arithmetic circuit 207 is not detected.

Only under this condition (in the absence of generation of a new drop frame before and after the arithmetic operation in the arithmetic circuit 207), the difference frame number calculation circuit 210 performs the process in response to the drop frame corresponding signal DfOn output from the drop frame detection circuit 211.

Since the post-calculation semi-DF time code o'clock Oab (01:01:00.01 o'clock) in the arithmetic circuit 207 corresponds to the drop frame, the drop frame corresponding signal DfOn output from the detection circuit 211 is set to 1. Thus, the correction of −2 frames is required.

As a result, the NDF time code o'clock Nb to be recalculated is set to 00:00:00.02 o'clock, while the recalculation signal ReCalc is set to 1 and output to the selector circuit A205 and the selector circuit B206 for recalculation.

In the selector circuit A205 and the selector circuit B206, the output select control signal C is 1, and therefore in order to perform the third arithmetic operation, in the selector circuit A205, the semi-DF time code o'clock Oab (01:01:00.01 o'clock) providing the result of the second arithmetic operation input to the input terminal Ia is output to the arithmetic circuit 207 as the semi-DF time code o'clock Ha, and in the selector circuit B206, the NDF time code o'clock Nb (00:00:00.02 o'clock) corresponding to the correction value for correction of −2 frames input to the input terminal Ia is output to the arithmetic circuit 207 as the NDF time code o'clock Hb.

The following third arithmetic operation is performed with the semi-DF time code o'clock Ha and the NDF time code o'clock Hb input to the arithmetic circuit 207.

| | |
|---|---|
| 01:01:00.01 | DF time code o'clock Ha |
| − 00:00:00.02 | NDF time code o'clock Hb |
| 01:00:59.29 | DF time code o'clock Oab |

In the arithmetic circuit 207, the pre-calculation semi-DF time code o'clock Ha (01:01:00.01 o'clock) is compared with the post-calculation semi-DF time code o'clock Oab (01:00:59.29 o'clock), and in view of the fact that the post-calculation semi-DF time code o'clock Oab is temporally smaller, the signal Large is set to 0, and the fact that the post-calculation semi-DF time code o'clock Oab is smaller is notified to the difference frame number calculation circuit 210.

As in the second subtract operation, in the drop frame amount calculation circuit A208, the pre-calculation drop frame amount D is calculated using equation 5, and as 108 frames, output to the difference frame number calculation circuit 210.

In the drop frame amount calculation circuit B209, the pre-calculation drop frame amount Da is calculated using equation 5, and as 110 frames, output to the difference frame number calculation circuit 210.

In the difference frame number calculation circuit 210, the difference of the drop frame amount before and after the arithmetic operation is calculated from the add/subtract signal Sub (=1), the post-calculation drop frame amount D (=108 frames), the pre-calculation drop frame amount Da (=110 frames) and the magnitude information Large (=0) of the time code before and after the arithmetic operation.

In the process, the difference of the drop frame amount before and after arithmetic operation is of course 2 frames from the operation table of Table 7. The current arithmetic operation in the arithmetic circuit 207, however, is for correction of −2 frames and requires no recalculation. Thus, the NDF time code o'clock Nb to be recalculated is set to 00:00:00.00 o'clock, and the recalculation signal ReCalc is set to 0 to prohibit recalculation.

Then, the semi-DF time code o'clock Oab involved is output as the DF time code o'clock DfTo (01:00:59.29 o'clock) output finally.

(Embodiment 3)

FIG. 6 is a general block diagram showing an embodiment according to claims 3 and 4 of the present invention.

A reference DF time code o'clock DfTa is input to an input terminal 301, and a DF time code o'clock Dftb to be added/subtracted is input to an input terminal 302.

Now, the operation of a conversion circuit B312 will be explained.

The conversion circuit B312 is for converting the DF time code o'clock into the NDF time code o'clock, and calculates, using equation 5, the total number of the drop frames (assumed to be DftD per drop frame amount) skipped during the lapse of the input DF time code o'clock from 00:00:00.00 o'clock to the DF time code o'clock, frame by frame.

The NDF time code o'clock Nb corresponding to the calculated drop frame amount DftD is calculated using. equation 10.

Then, the NDF time code o'clock Nb corresponding to the drop frame amount DftD is subtracted (corresponding to equation 11) from the DF time code o'clock Dftb o'clock, thus making it possible to calculate as the NDF time code o'clock NdfTb.

The conversion circuit B312 outputs the DF time code o'clock DfTb input to the output terminal I, to the output terminal 0 as the NDF time code o'clock NdfTb in accordance with the operation table of Table 12 based on the operation according to equations 5, 10, 11.

The reference DF time code o'clock of the time code arithmetic apparatus 51 (FIG. 4) described in claim 1 of the invention and directly connected to the input terminal 301 is input to an input terminal 101, NDF time code o'clock NdfTb output from the conversion circuit B312 is input to an input terminal 102 to which the NDF time code o'clock added/subtracted in the time code arithmetic apparatus 51 is input, the add/subtract signal AddSub is input to an input terminal 103 of the add/subtract signal of the time code arithmetic apparatus 51 connected directly to the input terminal 303, and the DF time code o'clock calculated in the time code arithmetic apparatus 51 is output as the DF time code o'clock DfTo from the output terminal 304 finally.

In this way, the DF time code o'clock DfTa from the input terminal 301, the NDF time code o'clock NdfTb output from the conversion circuit B312 and the add/subtract signal AddSub from the input terminal 303 are input to the time code arithmetic apparatus 51 described in claim 1 of the invention (configuration of claim 3). These signals can of course alternatively be input to the time code arithmetic apparatus 52 (FIG. 5) described in claim 2 of the invention (configuration of claim 4).

(Add Operation 5)

The add operation 5 will be explained with reference to an example.

Assuming that the DF time code o'clock Dfta providing a reference for arithmetic operation is the same 01:25:37.25 o'clock as in the add operation 3 described above and the DF time code o'clock DfTb to be added is 01:25;42.29 o'clock, the conversion circuit B312, in accordance with the operation table of Table 12 based on equations 5, 10, 11, converts the input DF time code o'clock DfTb (01:25:42.29 o'clock) to the NDF time code o'clock NdfTb (01:25:37.25 o'clock), and applies the converted result to the time code arithmetic apparatus 51 or 52 indicating an embodiment according to claim 1 or 2 of the invention described in (Embodiment 1) or (Embodiment 2) above.

Since the same reference DF time code DfTa as in the add operation 3 described above and the NDF time code NdfTb to be added are used, the DF time code o'clock DfTo is finally output as 02:51:20.24 o'clock.

(Subtract Operation 7)

The subtract operation 7 will be explained with reference to an example.

Assuming that the DF time code o'clock Dfta providing a reference for arithmetic operation is the same 01:25:37.25 o'clock as in the subtract operation 4 described above and the DF time code o'clock DfTb to be subtracted is 00:25:39.11 o'clock, the conversion circuit B312, in accordance with the operation table of Table 12 based on equations 5, 10, 11, converts the input DF time code o'clock DfTb (00:25:39.11 o'clock) to the NDF time code o'clock NdfTb (00:25:37.25 o'clock), and applies the converted result to the time code arithmetic apparatus 51 or 52 indicating an embodiment according to claim 1 or 2 described in (Embodiment 1) or (Embodiment 2) above.

Since the reference DF time code DfTa and the NDF time code NdfTb to be subtracted identical to the corresponding means in the subtract operation 4 described above are used, the DF time code o'clock DfTo is finally output as 00:59:58.14 o'clock.

(Embodiment 4)

Figure 7:
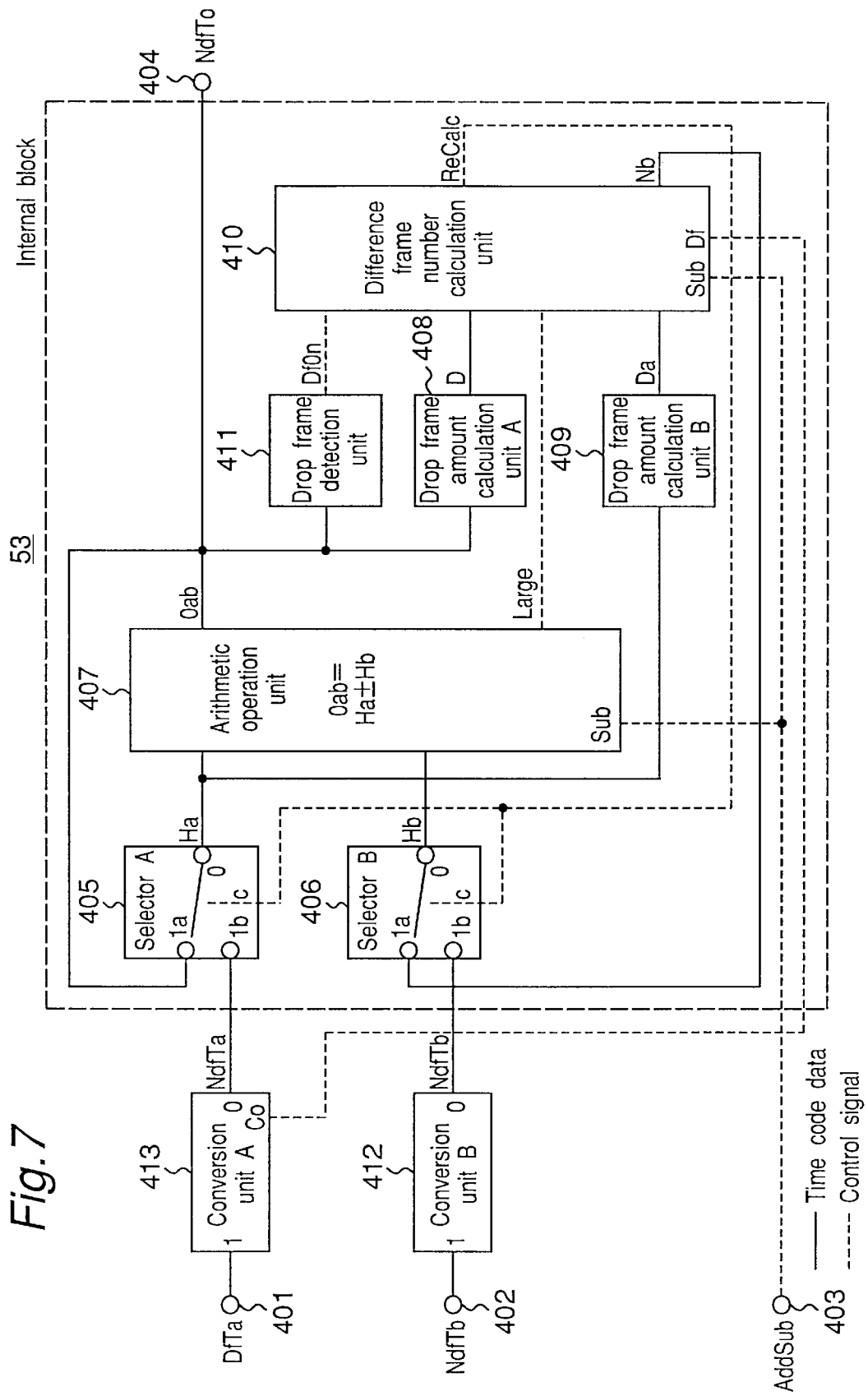
FIG. 7 is a general block diagram showing a time code arithmetic apparatus according to a fourth embodiment of the invention.

FIG. 7 is a general block diagram showing an embodiment according to claim 5 of the invention.

The DF time code o'clock DfTa providing a reference is input to an input terminal 401, and the DF time code o'clock DfTb to be added/subtracted is input to an input terminal 402.

A conversion circuit A413 outputs the NDF time code o'clock calculated from the DF time code o'clock DfTa input to the input terminal I, in accordance with the operation table of Table 15 corresponding to equations 5, 10, 11, to the output terminal 0 as the NDF time code o'clock NdfTa on the one hand, and outputs the non-drop information (0) indicating the arithmetic operation of the NDF time code o'clock as a signal Co to the difference frame number calculation circuit 410 on the other hand.

The conversion circuit B412 performs the operation equivalent to the conversion circuit B312 described above in (Embodiment 3).

The conversion circuit A413 is for converting the DF time code o'clock to the NDF time code o'clock by the same conversion method as the conversion circuit B412, and has a further function in addition to the construction of the conversion circuit B412 such that the signal Co is outputted for indicating whether or not the converted time code is of the non-drop mode, where the signal Co always outputs 0 indicating the non-drop mode.

The conversion circuit B412 outputs the NDF time code o'clock calculated from the DF time code o'clock DfTb input to the input terminal I according to the operation table of Table 12 based on equations 5, 10, 11, to the output terminal 0 as the NDF time code o'clock NdfTb.

The difference frame number calculation circuit 410 has a further function in addition to the construction of the difference frame number calculation circuit 210 such that a difference frame number can be calculated both in the drop mode and in the non-drop mode. Thus, the difference frame number calculation circuit 410 is provided with a further input terminal for the arithmetic mode signal Df indicative of the arithmetic mode where the signal Co outputted from the conversion circuit A413 is inputted to the input terminal (Df).

The difference frame number calculation circuit 410, like the difference frame number calculation circuit 210 described above, has such a mechanism that the recalculation control signal ReCalc for recalculation in the arithmetic circuit 407 is output to the selector circuit A405 and the selector circuit B406 for recalculation. In the case where the arithmetic mode signal Df is information (=0) indicating the non-drop mode, however, the recalculation control signal ReCalc is set to 0 to prohibit recalculation. As a result, the selector circuit A405 and the selector circuit B406 have the input terminal Ib from which the time code is always input and output to the arithmetic circuit 407 from the output terminal 0 as the time code Ha and the time code Hb, respectively.

The arithmetic circuit 407 operates arithmetically the same manner as the arithmetic circuit 107 described in (Embodiment 1), and outputs the NDF time code o'clock Oab.

Finally, this NDF time code o'clock Oab is output from the output terminal 404 as a NDF time code o'clock NdfTo.

In the time code arithmetic apparatus shown in FIG. 7, the DF time code o'clock is not calculated, and therefore there is no new drop frame generated in the process of arithmetic operation, so that the arithmetic circuit 407 does not perform the second and subsequent arithmetic operation in response to the recalculation signal ReCalc output from the difference frame number calculation circuit 410. Thus, two DF time code o'clocks are completed in one arithmetic operation.

Also, although the drop frame amount calculation circuit A408, the drop frame amount calculation circuit B409 and the drop frame detection circuit 411 operate, the signal DfOn, the drop frame amount D and the drop frame amount Da input to the difference frame number calculation circuit 410 are ignored, and therefore the arithmetic operation in the time code arithmetic apparatus is not adversely affected.

The block defined by dotted line in FIG. 7 designates a difference frame number calculation circuit 410 partially modified from the difference frame number calculation circuit 210 based on the time code arithmetic apparatus 52 according to the embodiment of claim 2 of the invention shown in FIG. 5. The other elements 405 to 409 and 411 are equivalent to the elements 205 to 209 and 211 of the time code arithmetic apparatus 52, respectively. The block defined by the dotted line constitutes the time code arithmetic apparatus 53 according to the embodiment of claim 5 of the invention.

As described above, according to this embodiment, when calculating the difference between the DF time code o'clock DfTa and the DF time code o'clock DfTb, both are converted into the NDF time code o'clock, and then the NDF time code o'clock corresponding to the number of the difference frames is calculated in real time.

This is by reason of the fact that as compared with the method in which the DF time code o'clock is calculated directly (the drop mode calculation method 2) and finally converted into the NDF time code o'clock, the arithmetic operation between the DF time code o'clocks requires no recalculation due to the generation of a new drop frame in the process of arithmetic operation, and the arithmetic circuit 407 can efficiently calculate the NDF time code o'clock finally in one arithmetic operation.

(Embodiment 5)

Figure 8:
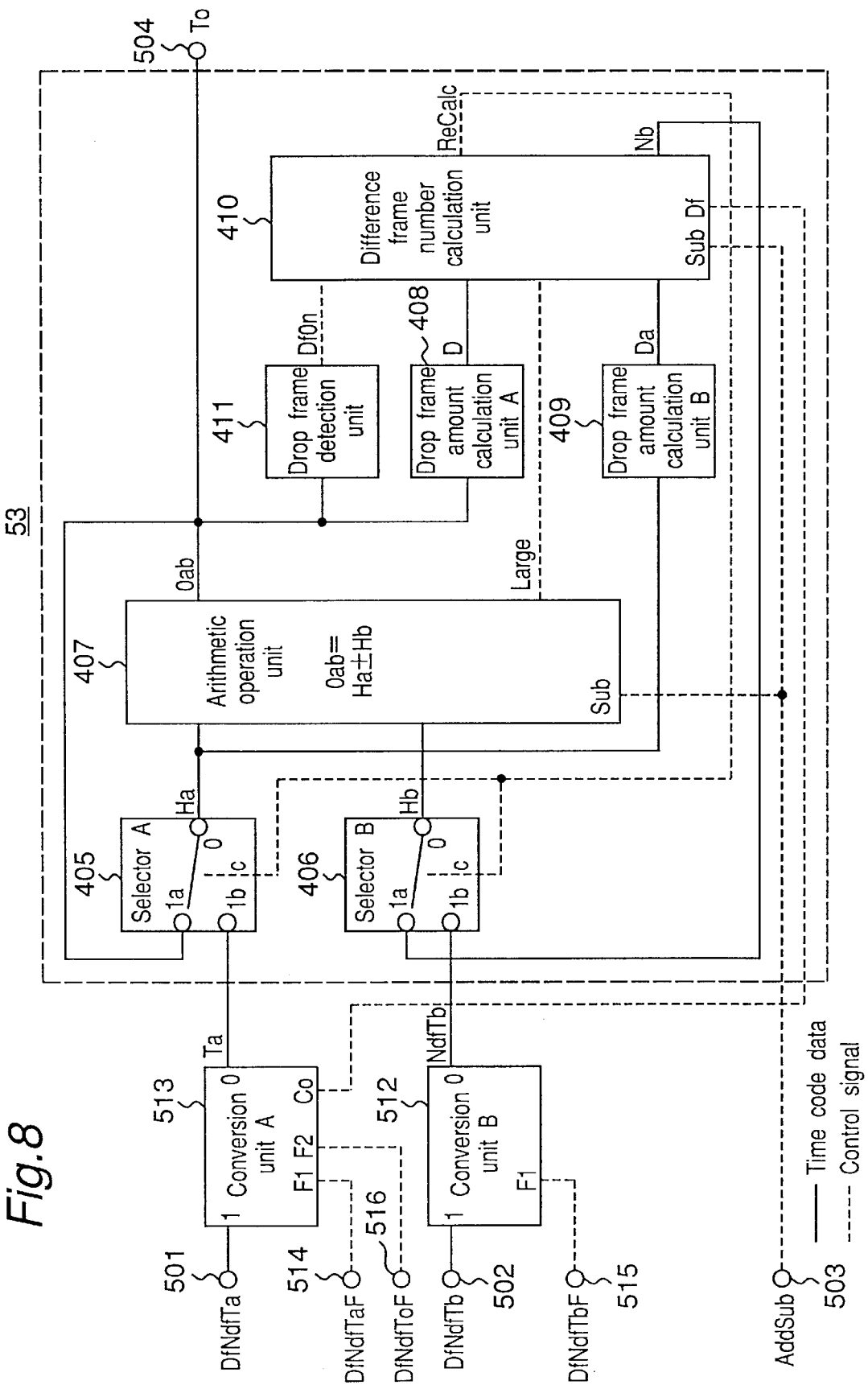
FIG. 8 is a general block diagram showing a time code arithmetic apparatus according to a fifth embodiment of the invention.

FIG. 8 is a general block diagram showing the embodiment according to claim 6 of the invention.

The reference DF time code o'clock or the NDF time code o'clock DfNdfTa is input to the input terminal 501, while the signal DfNdfTaF indicating whether the time code o'clock DfNdfTa is in drop mode or non-drop mode is input to the input terminal 514.

The DF time code o'clock or the NDF time code o'clock DfNdfTb to be added/subtracted is input to the input terminal 502, while the signal DfNdfTbF indicating whether the time code o'clock DfNdfTb is in drop mode or non-drop mode is input to the input terminal 515.

A signal DfNdfToF for determining whether the time code o'clock finally calculated in the time code arithmetic apparatus 53 described above employed in this embodiment is set in drop mode or non-drop mode is input to the input terminal 516.

In the conversion circuit A513, only in the case where the input time code o'clock DfNdfTa is in drop mode (F1 mode signal DfNdfTaF is 1) and the time o'clock To finally calculated is designated as non-drop mode (the F2 mode signal DfNdfToF is 0), the DF time code o'clock DfNdfTa is output by being converted into the NDF time code o'clock Ta by the same conversion method as the conversion circuit A413.

In other cases, the input time code o'clock DfNdfTa is output directly as the time code o'clock Ta.

Also, the arithmetic mode signal Co sets the arithmetic mode to 1 indicating the drop mode only in the case where the input time code o'clock DfNdfTa is in drop mode (F1 mode signal DfNdfTaF is 1) and the time code o'clock To calculated finally is designated as drop mode (F2 mode signal DfNdfToF is 1), and output by being set to 0 indicating the non-drop mode in other cases.

Also, the operation of the conversion circuit A513 is described in the operation list of Table 16.

Now, the operation of the conversion circuit B512 will be explained.

In the case where the input time code o'clock DfNdfTb is in drop mode (F1 mode signal DfNdfTbF is 1), the conversion circuit B512 outputs by converting into the NDF time code o'clock NdfTb in the same conversion method as the conversion circuit B412.

In the case where the input time code o'clock DfNdfTb is in non-drop mode (F1 mode signal DfNdfTbF is 0), the input NDF time code o'clock is directly output in the form of NDF time code o'clock DfNdfTb.

Also, the operation of the conversion circuit B512 is described in the operation list of Table 13.

In the conversion circuit A513, in response to the input signal F1 connected to the input terminal 514 and the input signal F2 connected to the input terminal 516, the control signal Co indicating whether the two time codes are calculated as a DF time code o'clock or as a NDF time code o'clock in the time code arithmetic apparatus 53 employed in this embodiment is output according to the operation table of Table 16, and the time code of the input 1 connected to the output terminal 501 is output as a time code Ta from the output terminal 0 in accordance with the operation list of Table 16.

In the conversion circuit B512, in the case where the time code o'clock DfNdfTb of the input terminal I connected to the input terminal 502 is the DF time code o'clock, the time code o'clock NdfTb is converted to the time code of the non-drop mode according to the operation table shown in Table 13 and is outputted as the time code o'clock NdfTb from the output terminal O in response to the input signal F1 connected to the input terminal 515, while in the case of the NDF time code o'clock, the time code at the input terminal I is output directly to the output terminal O as the time code o'clock NdfTb.

The time code arithmetic apparatus 53 supplied with the time code o'clock Ta output from the conversion circuit A513, the signal Co, the NDF time code o'clock NdfTb output from the conversion circuit B512 and the add/subtract signal AddSub input to the input terminal 503, in the case where the input signal Df of the difference frame number calculation circuit 410 is in drop mode (1), performs the operation described with reference to the time code arithmetic apparatus shown in the embodiment according to claim 2 of the invention, while in the case where the input signal Df of the difference frame number calculation circuit 410 is in non-drop mode (0), the operation described with reference to the time code arithmetic apparatus (FIG. 7) shown in the embodiment of claim 5 of the invention is performed.

In the case where the time code o'clock DfNdfTa input to the conversion circuit 513 is in non-drop mode (when the F1 mode signal DfNdfTaF is 0) and the time code o'clock To finally calculated is in drop mode (when the F2 mode signal DfNdfToF is 1), the output time code o'clock To is in non-drop mode and not output in the mode designated by the F2 mode signal DfNdfToF.

For this to attain, the input time code o'clock DfNdfTa is required to be converted from non-drop mode to drop mode and then calculated as the reference DF time code o'clock of the time code arithmetic apparatus 53, which requires another stage of the time code arithmetic apparatus 53 for arithmetic processing.

For this reason, the NDF time code o'clock To is output for the time being, and input to the time code arithmetic apparatus according to the embodiment of claim 7 of the invention described later thereby to obtain the DF time code o'clock.

(Embodiment 6)

Figure 9:
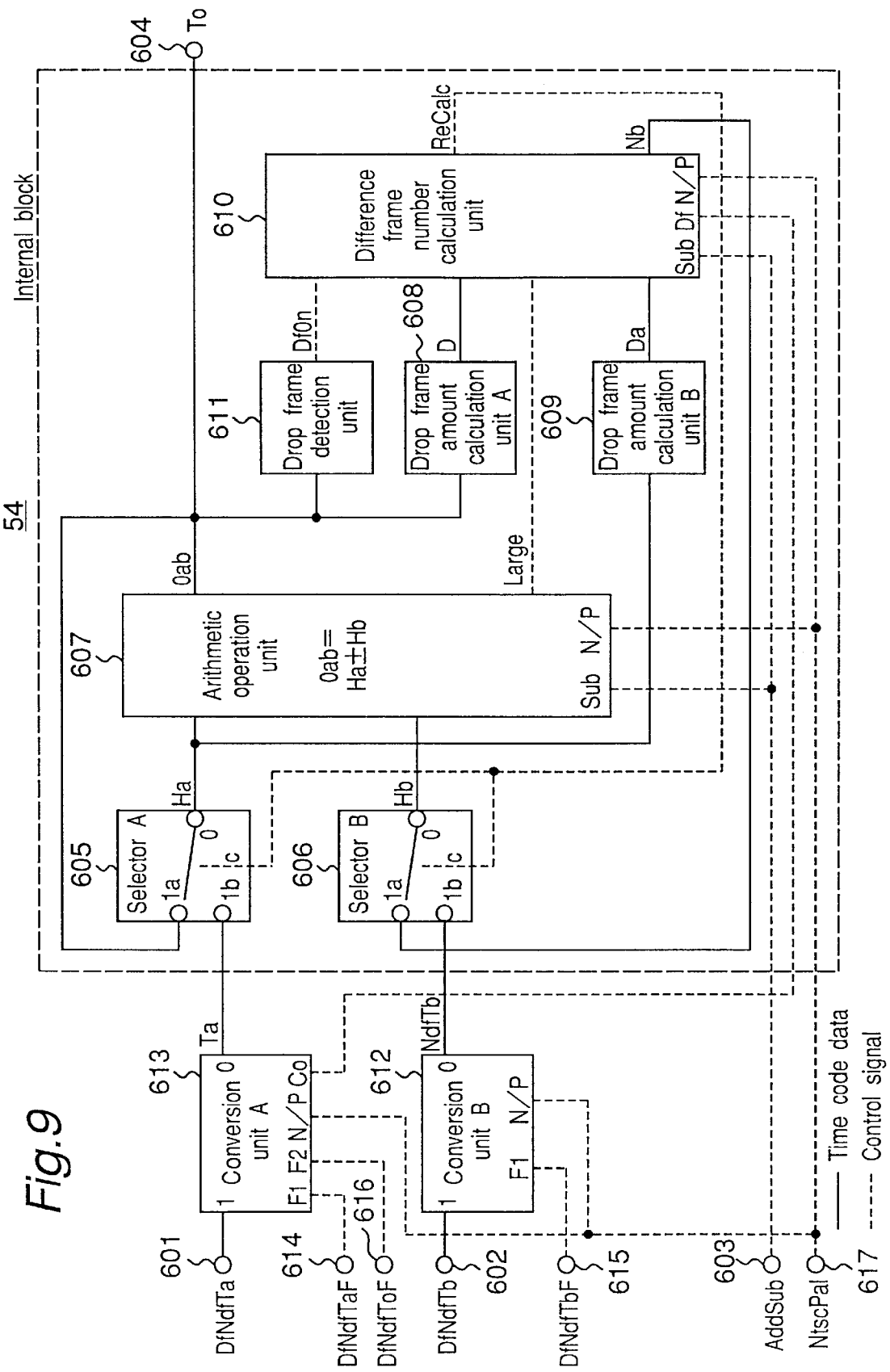
FIG. 9 is a general block diagram showing a time code arithmetic apparatus according to a sixth embodiment of the invention.

FIG. 9 is a general block diagram showing an embodiment according to claim 7 of the invention.

The time code o'clock DfNdfTa constituting a reference DF time code o'clock or a NDF time code o'clock is input to the input terminal 601 on the one hand, and the signal DfNdfTaF indicating whether the time code o'clock DfNdfTa is in drop mode or non-drop mode is input to the input terminal 614 on the other.

The time code o'clock DfNdfTb constituting a DF time code o'clock to be added/subtracted or a NDF time code o'clock is input to the input terminal 602 on the one hand, and the signal DfNdfTbF indicating whether the time code o'clock DfNdfTb is in drop mode or non-drop mode is input to the input terminal 615 on the other hand.

A signal DfNdfToF designating whether the time code finally calculated by the time code arithmetic apparatus according to this embodiment is in drop mode or non-drop mode is input to the input terminal 616.

A signal NtscPal for designating whether the number of frames per second which is varied from one TV system to another is 30 or 25 is input to an input terminal 617.

Now, the operation of the conversion circuit A613 will be explained.

The conversion circuit A613 performs a similar operation to the conversion circuit 513 described above in the case where the input signal N/P indicates 0, i.e. the NTSC system.

In the case where the input signal N/P indicates the PAL.SECAM system, i.e. 1,
the time code o'clock Ta is output as the output time code o'clock Ta in the form of time code o'clock DfNdfTa directly.

The signal Co indicating the output arithmetic mode is output by being set to 0 indicating the non-drop mode.

Also, the operation of the conversion circuit A613 is described in the operation list of Table 17.

Now, the operation of the conversion circuit B612 will be explained.

The conversion circuit B612 performs the same operation as the conversion circuit 512 in the case where the input signal N/P is 0 indicating the NTSC system.

In the case where the input signal N/P is 1 indicating the PAL.SECAM system, the time code NdfTb is output as a NDF time code o'clock NdfTb directly from the input time code dfNdfTb.

Also, the operation of the conversion circuit B612 is described in the operation list of Table 14.

In the conversion circuit A613, in response to the input signal F1 connected to the input terminal 614, the input signal F2 connected to the input terminal 616 and the input signal N/P connected to the input terminal 617, the internal blocks of the embodiment make up a time code arithmetic apparatus 54 (with other component elements not modified) modified from the arithmetic circuit 407 based on the time code arithmetic apparatus 53 according to the embodiment of claim 6 of the invention comprising an arithmetic circuit 607 modified from the arithmetic circuit 407 and a difference frame number calculation circuit 610 modified from the difference frame number calculation circuit 410.

Now, the operation of the arithmetic circuit 607 will be explained.

The arithmetic circuit 607 is for simply calculating the input time code o'clock Ta and the time code o'clock Tb as a NDF time code o'clock. In the process, in the case where the arithmetic operation according to the NTSC scheme is designated by the signal N/P, the carry up or carry down of the frame digit is calculated as 30 frames that is the number of frames per second.

In the case where the PAL.SECAM scheme is designated for the arithmetic operation by the signal N/P, on the other hand, the operation is performed assuming that the carry up and the carry down of the frame digit represents the number of frames per second, i.e. 25 frames. Also, the operation of the arithemetic circuit 607 is described in the operation list of Table 4.

Now the operation of the difference frame number calculation circuit 610 will be explained.

The difference frame number calculation 610, in the case of NTSC scheme by the signal N/P, performs the same operation as the difference frame number calculation circuit 410.

In the case of PAL.SECAM scheme by the signal N/P, the difference frame number calculation 610 performs the same operation when the signal DF of the above-mentioned difference frame number calculation circuit 410 is set to be 0 which indicates non-drop mode.

Further, the operation of the difference frame number calculation circuit 610 is described in the list of operation in Table 9.

As the operation of this embodiment, in the case where the arithmetic operation according to the NTSC scheme is designated by the signal NtscPal (=0), the operation is performed as described with reference to the time code arithmetic apparatus (FIG. 8) shown in the embodiment according to claim 6 of the invention.

In the case where the arithmetic operation according to the PAL.SECAM scheme is designated by the signal NtscPal (=1), the arithmetic operation is performed assuming 25 frames per second in the arithmetic circuit 607, while the other elements operate as described with reference to the time code arithmetic apparatus (FIG. 8) according to the embodiment of claim 6 of the invention.

(Embodiment 7)

Figure 10:
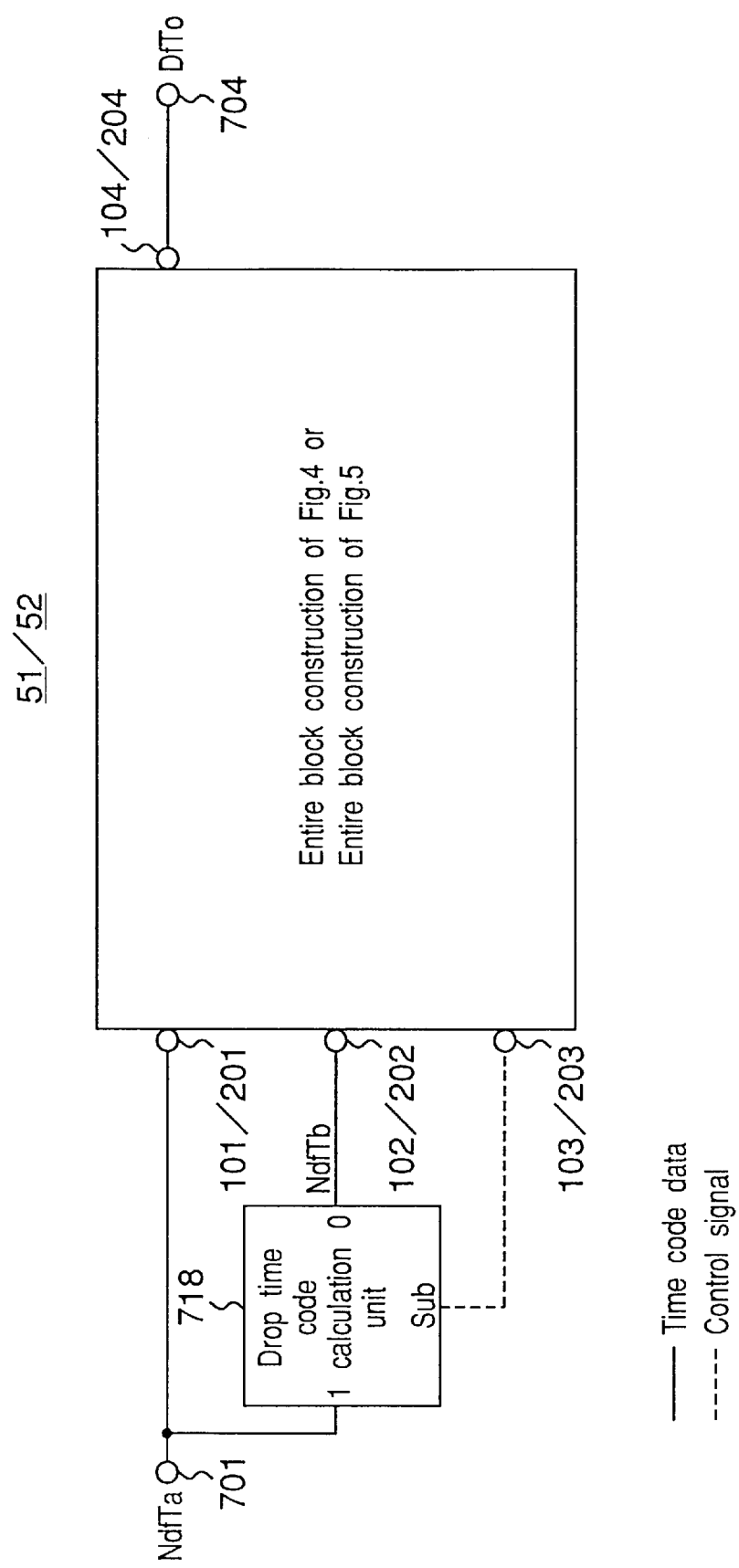
FIG. 10 is a general block diagram showing a time code arithmetic apparatus according to a seventh embodiment of the invention.
Figure 11:
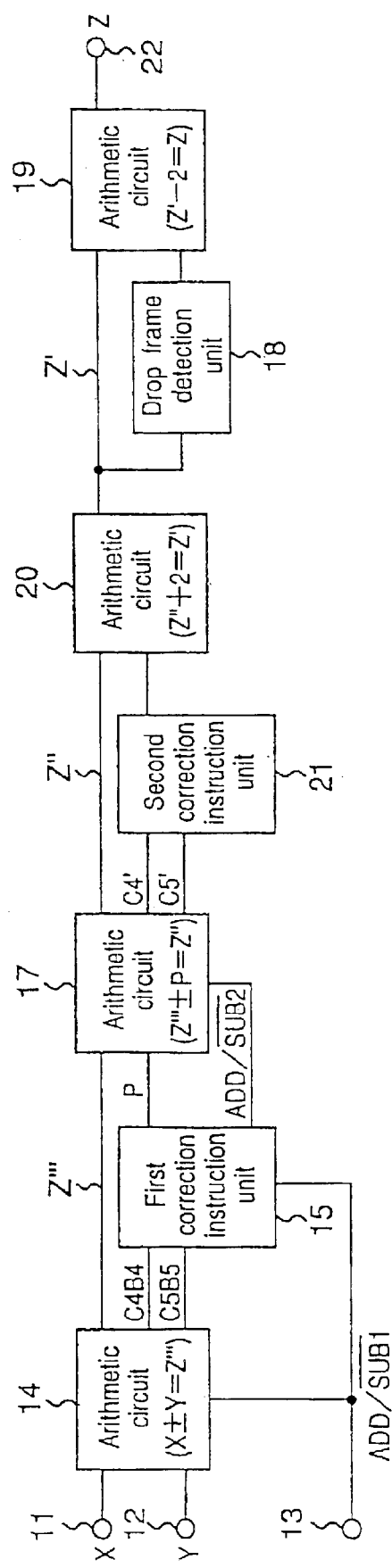
FIG. 11 is a block diagram showing JP-A-7-203345 constituting the prior art (Title of the Invention: SMPTE/EBU time code arithmetic apparatus)

FIG. 10 is a general block diagram showing an embodiment according to claims 8 and/or 9 of the invention.

The NDF time code o'clock NdfTa is input to the input terminal 701.

Now, the operation of the drop time code calculation circuit 718 will be explained.

In the drop time code calculation circuit 718, the total number of the drop frames (the drop frame amount DftD) skipped during the lapse of frame by frame from 00:00:00.00 o'clock to the NDF time code o'clock NdfTa input to the input terminal is calculated using equation 5.

Then, using equation 10, the NDF time code o'clock NdfTb corresponding to the drop frame amount DftD is calculated and output from the output terminal 0.

In the process, 0 designating the add operation is set by the signal Sub and output.

Also, the operation of the drop time code calculation circuit 718 is described in the operation list of Table 18.

The blocks in the time code arithmetic apparatus 51 or 52 according to the first or second embodiment described above perform the operation above, in which assuming that the NDF time code o'clock NdfTa is a DF reference time code o'clock input to the input terminal 101/201, the NDF time code o'clock for adding the NDF time code o'clock NdfTb is input to the input terminal 102/202, and the add signal Sub is input to the input terminal 103/203.

Among the six basic principles of the invention described above, the configuration described in claim for the seventh embodiment based on the sixth basic principle for converting the NDF time code o'clock of NTSC scheme into the DF time code o'clock is such that the NDF time code o'clock is finally converted to the DF time code o'clock and output as a DF time code o'clock DfTo from the output terminal 704 connected to the output terminal 104/204 of the particular block.

TABLE 1

| Input | | | Output P | |
|---|---|---|---|---|
| ADD/$\overline{SUB1}$ | C4B5 | C5B5 | (frame) | ADD/$\overline{SUB2}$ |
| 1 | 0 | 0 | 0 | * |
| 1 | 1 | 0 | 2 | 1 |
| 1 | 0 | 1 | 2 | 0 |
| 1 | 1 | 1 | 0 | * |
| 0 | 0 | 0 | 0 | * |
| 0 | 1 | 0 | 2 | 0 |
| 0 | 0 | 1 | 2 | 1 |
| 0 | 1 | 1 | 0 | * |

ADD/$\overline{SUB1}$: 1 add, 0 subtract, * Not controlled,
C4B5 C5B5: 1 present, 0 absent

TABLE 2

| Control (C) | Output (0) |
|---|---|
| 0 | 1b |
| 1 | 1a |

TABLE 3

| Input signal | | Output | |
|---|---|---|---|
| Sub | | Large | Time code 0ab |
| 0 | | 0, 1, 2 | 0ab = Ha ± Hb (calculated as 30 frames per sec) |
| 1 | | 0, 1, 2 | 0ab = Ha ± Hb (calculated as 30 frames per sec) |
| Input signal | Sub | | 0: add, 1: subtract |
| Output signal | Large | 0 | Pre-calculation time code o'clock Ha > post-calculation time code o'clock Oab |
| | | 1 | Pre-calculation time code o'clock Ha < post-calculation time code o'clock Oab |
| | | 2 | Pre-calculation time code o'clock Ha = post-calculation time code o'clock Oab |

TABLE 4

| Input signal | | | Output | |
|---|---|---|---|---|
| N/P | Sub | | Large | Time code 0ab |
| 0 | 0 | | 0, 1, 2 | 0ab = Ha ± Hb (calculated as 30 frames per sec) |
| | 1 | | 0, 1, 2 | 0ab = Ha ± Hb (calculated as 30 frames per sec) |
| 1 | — | | 2 | 0ab = Ha ± Hb (calculated as 25 frames per sec) |
| Input signal | N/P Sub | | | 0: NTSC scheme, 1: PAL•SECAM scheme 0: add, 1: subtract |
| Output signal | Large | 0 | | Pre-calculation time code o'clock Ha > post-calculation time code o'clock Oab |
| | | 1 | | Pre-calculation time code o'clock Ha < post-calculation time code o'clock Oab |
| | | 2 | | Pre-calculation time code o'clock Ha = post-calculation time code o'clock Oab |

TABLE 5

| Input time code | Number of output frames |
|---|---|
| hh hours mm minutes ss seconds ff frames | ((hh * 108) + ((mm − (mm/10)) * 2)) frames |
| Input time code    hh hours | 00 to 23 hours |
|                    mm minutes | 00 to 59 minutes |
|                    ss seconds | 00 to 59 seconds |
|                    ff frames | 00 to 29 frames |
| Number of output frames | 0 to 2592 frames |

TABLE 6

| Input signal | | | | Output | |
|---|---|---|---|---|---|
| Sub | D, Da | Large | Re Calc | Nb (difference of drop frame amount before and after arithmetic operation) | |
| (Initial state) | | | 0 | 00:00:00:00 (0 frame) | |
| 0 | D = Da | 0 | 1 | Time code converted from (D+2592−Da) frames to non-drop mode time code | |
| | | 1 | 0 | 00:00:00:00 (0 frame) | |
| | | 2 | 0 | 00:00:00:00 (0 frame) | |
| | D > Da | 0, 1, 2 | 1 | Time code converted from (D−Da) frames to non-drop mode time code | |
| | D < Da | 0, 1, 2 | 1 | Time code converted from (D+2592−Da) frames to non-drop mode time code | |
| 1 | D = Da | 0 | 0 | 00:00:00:00 (0 frame) | |
| | | 1 | 1 | Time code converted from (Da+2592−D) frames to non-drop mode time code | |

TABLE 6-continued

|  |  |  |  |
|---|---|---|---|
|  |  | 2 | 0 | 00:00:00:00 (0 frame) |
|  | D > Da | 0, 1, 2 | 1 | Time code converted from (Da+2592−D) frames to non-drop mode time code |
|  | D < Da | 0, 1, 2 | 1 | Time code converted from (Da−D) frames to non-drop mode time code |
| Input signal | Sub | | | 0: add, 1: subtract |
|  | D | | | Number of output frames of drop frame amount calculation circuit A108 |
|  | Da | | | Number of output frames of drop frame amount calculation circuit B109 |
|  | Large | 0 | | Pre-calculation time code o'clock Ha > post-calculation time code o'clock Oab |
|  |  | 1 | | Pre-calculation time code o'clock Ha < post-calculation time code o'clock Oab |
|  |  | 2 | | Pre-calculation time code o'clock Ha = post-calculation time code o'clock Oab |
| Output signal | ReCalc | 0 | | (initial value) Switch input of selector circuits A105, B106 to 1b to prohibit recalculation |
|  |  | 1 | | Switch input of selector circuits A105, B106 to 1a for recalculation |
|  | Nb | | | Time code of non-drop mode |

TABLE 7

| Input signal | | | | | Output |
|---|---|---|---|---|---|
| Sub | D, Da | Large | DfOn | ReCalc | Nb (difference of drop frame amount before and after arithmetic operation) |
| (Initial state) | | | | 0 | 00:00:00:00 (0 frame) |
| 0 | D = Da | 0 | — | 1 | Time code converted from (D+2592−Da) frames to non-drop mode time code |
|  |  | 1 | 0 | 0 | 00:00:00:00 (0 frame) |
|  |  |  | 1 | 1 | 00:00:00:02 (2 frames) |
|  |  | 2 | 0 | 0 | 00:00:00:00 (0 frame) |
|  |  |  | 1 | 1 | 00:00:00:02 (2 frames) |
|  | D > Da | 0, 1, 2 | — | 1 | Time code converted from (D−Da) frames to non-drop mode time code |
|  | D < Da | 0, 1, 2 | — | 1 | Time code converted from (D+2592−Da) frames to non-drop mode time code |
| 1 | D = Da | 0 | 0 | 0 | 00:00:00:00 (0 frame) |
|  |  |  | 1 | 1 | 00:00:00:02 (2 frames) |
|  |  | 1 | — | 1 | Time code converted from (Da+2592−D) frames to non-drop mode time code |
|  |  | 2 | 0 | 0 | 00:00:00:00 (0 frame) |
|  |  |  | 1 | 1 | 00:00:00:02 (2 frames) |
|  | D > Da | 0, 1, 2 | — | 1 | Time code converted from (Da+2592−D) frames to non-drop mode time code |
|  | D < Da | 0, 1, 2 | — | 1 | Time code converted from (Da−D) frames to non-drop mode time code |
| Input signal | Sub | | | | 0: add, 1: subtract |
|  | D | | | | Number of output frames of drop frame amount calculation circuit A(208) |
|  | Da | | | | Number of output frames of drop frame amount calculation circuit B(209) |
|  | Large | 0 | | | Pre-calculation time code o'clock Ha > post-calculation time code o'clock Oab |
|  |  | 1 | | | Pre-calculation time code o'clock Ha < post-calculation time code o'clock Oab |
|  |  | 2 | | | Pre-calculation time code o'clock Ha = post-calculation time code o'clock Oab |

TABLE 7-continued

|  |  |  |  |
|---|---|---|---|
| | DfOn | 0 | Information not corresponding to non-drop frames output from drop frame detection circuit 211 |
| | | 1 | Information not corresponding to non-drop frames output from drop frame detection circuit 211 |
| Output signal | ReCalc | 0 | (initial value) Switch input of selector circuits A205, B206 to 1b to prohibit recalculation |
| | | 1 | Switch input of selector circuits A205, B206 to 1a for recalculation |
| | Nb | | Time code of non-drop mode |

TABLE 8

| Input signal | | | | | | Output |
|---|---|---|---|---|---|---|
| Df | Sub | D, Da | Large | DfOn | ReCalc | Nb (difference of drop frame amount before and after arithmetic operation) |
| (Initial state) | | | | | 0 | 00:00:00:00 (0 frame) |
| 1 | 0 | D = Da | 0 | — | 1 | Time code converted from (D+2592−Da) frames to non-drop mode time code |
|  |  |  | 1 | 0 | 0 | 00:00:00:00 (0 frame) |
|  |  |  |  | 1 | 1 | 00:00:00:02 (2 frames) |
|  |  |  | 2 | 0 | 0 | 00:00:00:00 (0 frame) |
|  |  |  |  | 1 | 1 | 00:00:00:02 (2 frames) |
|  |  | D > Da | 0, 1, 2 | — | 1 | Time code converted from (D−Da) frames to non-drop mode time code |
|  |  | D < Da | 0, 1, 2 | — | 1 | Time code converted from (D+2592−Da) frames to non-drop mode time code |
|  | 1 | D = Da | 0 | 0 | 0 | 00:00:00:00 (0 frame) |
|  |  |  |  | 1 | 1 | 00:00:00:02 (2 frames) |
|  |  |  | 1 | — | 1 | Time code converted from (Da+2592−D) frames to non-drop mode time code |
|  |  |  | 2 | 0 | 0 | 00:00:00:00 (0 frame) |
|  |  |  |  | 1 | 1 | 00:00:00:02 (2 frames) |
|  |  | D > Da | 0, 1, 2 | — | 1 | Time code converted from (Da+2592−D) frames to non-drop mode time code |
|  |  | D < Da | 0, 1, 2 | — | 1 | Time code converted from (Da−D) frames to non-drop mode time code |
| 0 | — | — | — | — | 0 | 00:00:00:00 (0 frame) |
| Input signal | Df | | | | | 0: non-drop mode, 1: drop mode |
|  | Sub | | | | | 0: add, 1: subtract |
|  | D | | | | | Number of output frames of drop frame amount calculation circuit A408 |
|  | Da | | | | | Number of output frames of drop frame amount calculation circuit B409 |
|  | Large | 0 | | | | Pre-calculation time code o'clock Ha > post-calculation time code o'clock Oab |
|  |  | 1 | | | | Pre-calculation time code o'clock Ha < post-calculation time code o'clock Oab |
|  |  | 2 | | | | Pre-calculation time code o'clock Ha = post-calculation time code o'clock Oab |
|  | DfOn | 0 | | | | Information not corresponding to non-drop frames output from drop frame detection circuit 411 |
|  |  | 1 | | | | Information not corresponding to non-drop frames output from drop frame detection circuit 411 |
| Output signal | ReCalc | 0 | | | | (initial value) Switch input of selector circuits A405, B406 to 1b to prohibit recalculation |

TABLE 8-continued

| | | | |
|---|---|---|---|
| | | 1 | Switch input of selector circuits A405, B406 to 1a for recalculation |
| | Nb | | Time code of non-drop mode |

TABLE 9

| Input signal | | | | | | Output |
|---|---|---|---|---|---|---|
| N/P | Df | Sub | D, Da | Large | DfOn | ReCalc | Nb (difference of drop frame amount before and after arithmetic operation) |

| N/P | Df | Sub | D, Da | Large | DfOn | ReCalc | Nb |
|---|---|---|---|---|---|---|---|
| (Initial state) | | | | | | 0 | 00:00:00:00 (0 frame) |
| 0 | 1 | 0 | D = Da | 0 | — | 1 | Time code converted from (D+2592−Da) frames to non-drop mode time code |
| | | | | 1 | 0 | 0 | 00:00:00:00 (0 frame) |
| | | | | | 1 | 1 | 00:00:00:02 (2 frames) |
| | | | | 2 | 0 | 0 | 00:00:00:00 (0 frame) |
| | | | | | 1 | 1 | 00:00:00:02 (2 frames) |
| | | | D > Da | 0, 1, 2 | — | 1 | Time code converted from (D−Da) frames to non-drop mode time code |
| | | | D < Da | 0, 1, 2 | — | 1 | Time code converted from (D+2592−Da) frames to non-drop mode time code |
| | | 1 | D = Da | 0 | 0 | 0 | 00:00:00:00 (0 frame) |
| | | | | | 1 | 1 | 00:00:00:02 (2 frames) |
| | | | | 1 | — | 1 | Time code converted from (Da+2592−D) frames to non-drop mode time code |
| | | | | 2 | 0 | 0 | 00:00:00:00 (0 frame) |
| | | | | | 1 | 1 | 00:00:00:02 (2 frames) |
| | | | D > Da | 0, 1, 2 | — | 1 | Time code converted from (Da+2592−D) frames to non-drop mode time code |
| | | | D < Da | 0, 1, 2 | — | 1 | Time code converted from (Da−D) frames to non-drop mode time code |
| 0 | — | — | — | — | — | 0 | 00:00:00:00 (0 frame) |
| 1 | — | — | — | — | — | 0 | 00:00:00:00 (0 frame) |

| | | |
|---|---|---|
| Input signal | N/P | 0: NTSC scheme, 1: PAL·SECAM scheme |
| | Df | 0: non-drop mode, 1: drop mode |
| | Sub | 0: add, 1: subtract |
| | D | Number of output frames of drop frame amount calculation circuit A608 |
| | Da | Number of output frames of drop frame amount calculation circuit B609 |
| | Large 0 | Pre-calculation time code o'clock Ha > post-calculation time code o'clock Oab |
| | 1 | Pre-calculation time code o'clock Ha < post-calculation time code o'clock Oab |
| | 2 | Pre-calculation time code o'clock Ha = post-calculation time code o'clock Oab |
| | DfOn 0 | Information not corresponding to drop frames output from drop frame detection circuit 611 |
| | 1 | Information not corresponding to drop frames output from drop frame detection circuit 611 |
| Output signal | ReCalc 0 | (initial value) Switch input of selector circuits A605, B606 to 1b to prohibit recalculation |
| | 1 | Switch input of selector circuits A605, B606 to 1a for recalculation |
| | Nb | Time code of non-drop mode |

TABLE 10

| Input | | Output |
|---|---|---|
| Input signal | Time code | Time code o'clock DfTo |
| Sub | Oab | |
| 0 | Not corresponding to drop frame | DfTo = Oab |
| | Corresponding to drop frame | DfTo = Oab |
| 1 | Not corresponding to drop frame | DfTo = Oab |
| | Corresponding to drop frame | DfTo = Oab − 2 frames |
| Input signal | Sub | 0: add, 1: subtract |

TABLE 11

| Input time code (Oab) | Output signal (DfOn) |
|---|---|
| hh hours mm minutes ss seconds ff frames | 0: time code o'clock Oab fails to correspond to drop frame<br>1: time code o'clock Oab corresponds to drop frame |

TABLE 12

| Input time code 1 | Output time code 0 |
|---|---|
| hh hours mm minutes ss seconds ff frames | Output (0) = convert from time code (1) of drop mode to time code of non-drop mode (hh hours mm minutes ss seconds ff frames − ((hh * 108) + ((mm − (mm/10)) * 2) frames) |
| Input time code 1 (DF time code) | hh hours 00–23 hours<br>mm minutes 00–59 minutes<br>ss seconds 00–59 seconds<br>ff frames 00–29 frames |
| Output time code 0 (NDF time code) | hh hours 00–23 hours<br>mm minutes 00–59 minutes<br>ss seconds 00–59 seconds<br>ff frames 00–29 frames |

TABLE 13

| Input signal | | Output |
|---|---|---|
| F1 | | Time code (0) |
| 0 | | Output (0) = input (1) |
| 1 | | Output (0) = convert from time code (1) of drop mode to time code of non-drop mode |
| Input signal | F1 | 0: non-drop mode, 1: drop mode |

TABLE 14

| Input signal | | Output |
|---|---|---|
| N/P | F1 | Time code (0) |
| 0 | 0 | Output (0) = input (1) |
| | 1 | Output (0) = convert from time code (1) of drop mode to time code of non-drop mode |
| 1 | — | Output (0) = input (1) |
| Input signal | N/P | 0: NTSC scheme, 1: PAL·SECAM scheme |
| | F1 | 0: non-drop mode, 1: drop mode |

TABLE 15

| Input | | | Output | |
|---|---|---|---|---|
| Time code 1 hh hours mm minutes as seconds ff frames | | | Co 0 | Time code 0 output (0) = convert from time code (1) of drop mode to time code of non-drop mode (hh hours mm minutes ss seconds ff frames − ((hh * 108) + ((mm − (mm/10))* 2)) frames) |
| Input Time code 1 (DF time code) | hh hours mm minutes ss seconds ff frames | | | 00–23 hours 00–59 minutes 00–59 seconds 00–29 frames 0: non-drop mode, 1: drop mode |
| Output Time code 0 (NDF time code) | hh hours mm minutes ss seconds ff frames | | | 00–23 hours 00–59 minutes 00–59 seconds 00–29 frames |

TABLE 16

| Input signal | | | Output | |
|---|---|---|---|---|
| F1 | F2 | | Co | Time code (0) |
| 0 | 0 | | 0 | Output (0) = input (1) |
|  | 1 | | 0 | Output (0) = input (1) |
| 1 | 0 | | 0 | Output (0) = convert from time code (1) of drop mode to time code of non-drop mode |
|  | 1 | | 1 | Output (0) = input (1) |
| Input signal | F1 F2 | | | 0: non-drop mode, 1: drop mode 0: non-drop mode, 1: drop mode |
| Output signal | Co | | | 0: non-drop mode, 1: drop mode |

TABLE 17

| Input signal | | | | Output | |
|---|---|---|---|---|---|
| N/P | F1 | F2 | Co | Time code (0) | |
| 0 | 0 | 0 | 0 | Output (0) = input (1) | |
|  |  | 1 | 0 | Output (0) = input (1) | |
|  | 1 | 0 | 0 | Output (0) = convert from time code (1) of drop mode to time code of non-drop mode | |
|  |  | 1 | 1 | Output (0) = input (1) | |
| 1 | — | — | 0 | Output (0) = input (1) | |
| Input signal | N/P F1 F2 | | | 0: NTSC scheme, 1: PAL•SECAM scheme 0: non-drop mode, 1: drop mode 0: non-drop mode, 1: drop mode | |
| Output signal | Co | | | 0: non-drop mode, 1: drop mode | |

TABLE 18

| Input | | | Output |
|---|---|---|---|
| Time code 1 hh hours mm minutes ss seconds ff frames | | Sub 0 | Time code 0 Output (0) = convert to time code of non-drop mode corresponding to drop frame amount of input time code (1) |
| Output | Sub Time code 0 (NDF time code) | hh hours mm minutes ss seconds ff frames | 0: add, 1: subtract 00 hours 00–01 minutes 00–59 seconds 00–29 frames |

According to claims 1 and 2 of the invention, when adding/subtracting the NDF time code o'clock to or from the reference time code o'clock, the DF time code o'clock is added/subtracted in non-drop mode, and in the case where a new drop frame is generated in the process, the drop frame can be recalculated. Therefore, a time code arithmetic apparatus having a very simple configuration can be provided.

According to claims 3 and/or 4 of the invention, the input unit of the NDF time code o'clock according to claims 1 and/or 2 includes conversion means B for converting the DF time code o'clock to the NDF time code o'clock, wherein two DF time code o'clocks can be calculated, thereby providing a time code arithmetic apparatus having a very simple configuration capable of performing the operation equivalent to the prior art.

According to claim 5 of the invention, a time code arithmetic apparatus comprises conversion means A for converting an input time code of drop mode into a time code of non-drop mode, a mechanism for inputting the time code output from the conversion means A to the selector means A of the time code arithmetic apparatus according to claim 4, and a mechanism for inputting the control signal output from the conversion means A to the difference frame number calculation means of the time code arithmetic apparatus according to claim 4, wherein two NDF time code o'clocks are added/subtracted, and therefore no drop frame is generated during the arithmetic process, thereby greatly simplifying the time code arithmetic apparatus.

According to claim 6 of the invention, a time code arithmetic apparatus comprises a mechanism for inputting to the conversion means A the drop/non-drop mode information of the time code input to the conversion means A of the time code arithmetic apparatus according to claim 5 and inputting the information for setting the time code output from the time code arithmetic apparatus according to claim 5 to the drop/non-drop mode, and a mechanism for inputting to the conversion means B the drop/non-drop mode information of the time code input to the conversion means B of the time code arithmetic apparatus according to claim 5, wherein the two time codes are calculated in such a manner that the mode of an output time code is designated regardless of whether the time code added/subtracted to and from a reference time code is in drop mode or non-drop mode, so that the time code of the arithmetic result can be output in drop mode or in non-drop mode, thereby providing a time code arithmetic apparatus having a very simple configuration.

According to claim 7 of the invention, a time code arithmetic apparatus according to claim 6 comprises a mechanism in which the information designating which is used, NTSC scheme or PAL.SECOM scheme, for calculating the time code is input to the conversion means A, the conversion means B, the arithmetic means and the difference frame number calculation means of the time code arithmetic apparatus according to claim 6, wherein the time code is calculated for the PAL.SECOM scheme (25 frames) and the NTSC scheme (30 frames) having different constants of carry up and carry down of the frame digit in the television system, and the arithmetic operation of the DF time code o'clock and the NDF time code o'clock of the NTSC scheme can be realized in a single arithmetic apparatus, thereby providing a time code arithmetic apparatus having a very simple configuration.

According to claims 8 and 9 of the invention, there is provided a time code arithmetic apparatus comprising drop time code calculation means having an input terminal supplied with the time code of non-drop mode providing a reference for arithmetic operation and the time code of drop mode providing a reference for arithmetic operation of the time code arithmetic apparatus according to claim 1 or 2, the drop time code calculation means converting the total number of frames skipped in the time lapse frame by frame from 00:00:00.00 o'clock to a time code of non-drop mode on the assumption that the time code of non-drop mode providing a reference for arithmetic operation is a time code of drop mode, and a mechanism in which the output control signal output from the drop time code calculation means is used as an add/subtract signal and the output time code of non-drop mode is input as a time code of non-drop mode for add/ subtract operation to the time code arithmetic apparatus according to claim 1 or 2, the apparatus having the function of converting the NDF time code o'clock to the DF time code o'clock.

What is claimed is:

1. A time code arithmetic apparatus comprising:

a first selector circuit having first and second input terminals, and supplied with a first time code providing a reference for arithmetic operation at the first input terminal and an arithmetic operation result at the second input terminal, the first selector circuit selecting one of the first and second inputs and outputting the selected input as a second time code;

a second selector circuit having first and second input terminals, and supplied with a third time code providing an object of an arithmetic operation at the first input terminal and a second selector input time code o'clock at the second input terminal, the second selector circuit selecting one of the first and second inputs and outputting the selected input as a fourth time code;

an arithmetic circuit for adding or subtracting the second and fourth time codes selected in the first and second selector circuits simply as a time code in non-drop mode based on the add/subtract information, and outputting the arithmetic operation result to the first input terminal of the first selector circuit and before/after information indicating which is larger of the absolute value of the time code before and after the arithmetic operation;

a first drop frame amount calculation circuit for calculating a first total number of frames in the arithmetic operation result dropped in the process of time lapse one frame each from 00:00:00.00 o'clock and outputting the first total number of frames as a first drop frame amount;

a second drop frame amount calculation circuit for calculating a second total number of frames in the second time code dropped one frame each in the process of time lapse from 00:00:00.00 o'clock and outputting the second total number of frames as a second drop frame amount;

a difference frame number calculation circuit for determining a difference between the total number of frames dropped based on the first and second drop frame amounts and the before/after information, and in the case where the difference is 0, outputting the second selector input time code o'clock of the non-drop mode corresponding to the difference to the second input terminal of the second selector circuit while at the same time outputting two recalculation arithmetic signals; and a drop frame correction circuit for outputting the arithmetic operation result as a final time code finally in the case where the arithmetic operation is one of an add operation or a subtract operation with the arithmetic operation result failing to correspond to a drop frame, and for correcting the arithmetic result by −2 frames and outputting the corrected result as a corrected final time code in the case where the arithmetic operation is a subtract operation with the arithmetic operation result corresponding to a drop frame;

wherein in the case where the difference is not 0, the first selector circuit and the second selector circuit select the arithmetic operation result input to the first input terminal of the first selector circuit and the second selector input time code o'clock to the second input terminal of the second selector circuit, respectively, based on the two recalculation signals and carrying out a recalculation in the arithmetic circuit.

2. A time code arithmetic apparatus according to claim 1, wherein the first time code is of drop mode and the third time code is of non-drop mode, comprising a conversion circuit for converting an upstream drop mode time code of drop mode to the third time code of non-drop mode, wherein the output of the conversion circuit is supplied to the second selector circuit thereby to add/subtract the upstream drop mode time code of drop mode to and from the first time code of drop mode via the conversion circuit.

3. A time code arithmetic apparatus according to claim 1, comprising a drop time code calculation circuit in which an upstream non-drop time code of non-drop mode is interpreted as a time code of drop mode, and the total number of frames skipped in the process of time lapse from 00:00:00.00 o'clock to the first time code o'clock, frame by frame, is converted into a non-drop mode time code and output as the third time code, while at the same time outputting add information as the add/subtract signal, wherein the upstream non-drop time code is used directly as the first time code as an arithmetic reference and the non-drop mode time code output as the third time code is used as an object of arithmetic operation.

4. A time code arithmetic apparatus comprising:

a first selector circuit having first and second input terminals, and supplied with a first time code providing a reference for arithmetic operation at the first input terminal and an arithmetic operation result at the second input terminal, the first selector circuit selecting one of the first and second inputs and outputting the selected input as a second time code;

a second selector circuit having first and second input terminals, and supplied with a third time code providing an object of arithmetic operation at the first input terminal and a second selector input time code o'clock at the second input terminal, the second selector circuit selecting one of the first and second inputs and outputting the selected input as a fourth time code;

an arithmetic circuit for adding or subtracting the second and fourth time codes selected in the first and second selector circuits simply as a time code in non-drop mode based on add/subtract information, and outputting the arithmetic operation result to the first input terminal of the first selector circuit and before/after information indicating which is larger of the absolute value of the time code before and after the arithmetic operation;

a first drop frame amount calculation circuit for calculating a first total number of frames dropped in the arithmetic operation result one frame each in the process of time elapse from 00:00:00.00 o'clock and outputting the first total number of frames as a first drop frame amount;

a second drop frame amount calculation circuit for calculating a second total number of frames in the second time code dropped one frame each in the process of time lapse from 00:00:00.00 o'clock and outputting the second number of frames as a second drop frame amount;

a drop frame detection circuit for outputting result correspondence information indicating whether the arithmetic operation result corresponds to a drop frame or not; and a difference frame number calculation circuit for determining a difference between the total number of frames dropped based on the first and second drop frame amounts and the before/after information, and (i) in the case where the difference is not 0, performing a first recalculation process for outputting the second selector input time code o'clock of the non-drop mode corresponding to the difference to the second input terminal of the second selector circuit while at the same time outputting a recalculation signal;

(ii) the case where the difference is 0 and a drop frame is involved based on the result correspondence information, performing a second recalculation process for outputting a two frame o'clock as the second selector input time code o'clock to the second input terminal of the second selector circuit while at the same outputting the recalculation signal; and (iii) in the case where the preceding difference frame number calculation process corresponds to the second recalculation process, performing a third recalculation process for outputting a 0 frame o'clock as the second selector input time code o'clock not to perform the recalculation to the second input terminal of the second selector circuit while at the same time outputting the information not to perform the recalculation as the recalculation signal;

wherein the first selector circuit and the second selector circuit select the arithmetic operation result input to the first input terminal of the first selector circuit and the second selector input time code o'clock to the second input terminal of the second selector circuit, respectively, and carrying out the recalculation in the arithmetic circuit based on the recalculation signal.

5. A time code arithmetic apparatus according to claim 4, wherein the first time code is of drop mode and the third time code is of non-drop mode, comprising a conversion circuit for converting an upstream drop mode time code of drop mode to the third time code of non-drop mode, wherein the output of the conversion circuit is supplied to the second selector circuit thereby to add/subtract the upstream drop mode time code of drop mode to and from the first time code of drop mode via the conversion circuit.

6. A time code arithmetic apparatus according to claim 4, wherein the first time code is of non-drop mode and the third time code is of non-drop mode, comprising:

a first conversion circuit for converting a first upstream drop mode time code of drop mode providing an input arithmetic reference into the first time code of non-drop mode, supplying the first time code to the first selector circuit, and outputting non-drop conversion information to the difference frame number calculation circuit indicating that the first time code providing an arithmetic reference is in non-drop mode;

a second conversion circuit for converting a second upstream drop mode time code of drop mode providing an object of an arithmetic operation into the third time code of non-drop mode, and supplying the third time code to the second selector circuit;

wherein the difference frame number calculation circuit of the time code arithmetic apparatus executes a fourth recalculation process for outputting 00:00:00.00 o'clock as the second selector input time code o'clock not to perform the recalculation in response to the non-drop conversion information input thereto and also outputting recalculation-prohibiting information as the recalculation signal.

7. A time code arithmetic apparatus according to claim 4, wherein the first time code is one of drop mode and non-drop mode, the third time code is of non-drop mode, and the final time code is one of drop mode and non-drop mode, comprising:

a first conversion circuit supplied with a first upstream drop variable time code of one of drop mode or non-drop mode providing an input arithmetic reference, first drop/non-drop information indicating whether the upstream drop variable time code is of drop mode or the non-drop mode and final drop/non-drop information indicating whether the final time code output as the final result of arithmetic operation is of drop mode or in non-drop mode, and only in the case where the first upstream drop variable time code is in drop mode and the final time code is in non-drop mode, the first conversion circuit converting the first upstream drop variable time code in drop mode to the first time code in non-drop mode, otherwise the first time code is output from the first conversion circuit with the same mode of drop mode and non-drop mode as the first upstream drop variable time code while at the same time the first conversion circuit outputs conversion information indicating whether the first time code is in drop mode or in non-drop mode; and a second conversion circuit supplied with a second upstream drop variable time code of one of drop mode or non-drop mode and second drop/non-drop information indicating whether the second upstream drop variable time code is of drop mode or the non-drop mode, the second conversion circuit converting the second upstream drop variable time code, if in drop mode, into the third time code of non-drop mode, whereas the third time code, if the second upstream drop variable time code in non-drop mode, is output with the same mode of drop and non-drop mode as the mode of the second upstream drop variable time code.

8. A time code arithmetic apparatus according to claim 4, comprising:

a first conversion circuit supplied with a first upstream drop variable time code of one of drop mode or non-drop mode providing an input arithmetic reference, first drop/non-drop information indicating whether the upstream drop variable time code is of drop mode or the non-drop mode and final drop/non-drop information indicating whether the final time code output as the final result of arithmetic operation is of drop mode or in non-drop mode, and scheme information indicating which is used, NTSC or PAL/SECAM scheme for calculating the first upstream drop variable time code and final drop/non-drop time code; and a second conversion circuit supplied with a second upstream drop variable time code of one of drop mode or non-drop mode and second drop/non-drop information indicating whether said second upstream drop variable time code is of drop mode or non-drop mode and supplied with said scheme information, wherein said first conversion circuit outputs the first time code in the same mode of drop or non-drop mode as the first upstream drop variable time code and said second conversion circuit outputs the third time code in the same mode of drop or non-drop mode as the second upstream drop variable time code in the case where said scheme information indicates the PAL.SECAM scheme, wherein said arithmetic circuit sets the number of frames per second at 25 in the case where said scheme information indicates the PAL.SECAM scheme, and sets the number of frames per second at 30 in the case where said scheme information indicates the NTSC scheme, and wherein in the case where said scheme information indicates the PAL.SECAM scheme, the difference frame number calculation circuit outputs 00:00:00.00 o'clock as the second selector input time code o'clock and performs a fourth recalculation process for outputting information prohibiting the recalculation by the recalculation signal while at the same time calculating the time code for the NTSC and PAL.SECAM schemes.

9. A time code arithmetic apparatus according to claim 4, comprising a drop time code calculation circuit in which an upstream non-drop time code of non-drop mode is interpreted as a time code of drop mode, and the total number of frames skipped in the process of time lapse from 00:00:00.00 o'clock to the first time code o'clock, frame by frame, is converted into a non-drop mode time code and output as the third time code, while at the same time outputting add information as the add/subtract signal, wherein the upstream non-drop time code is used directly as the first time code as an arithmetic reference and the non-drop mode time code output as the third time code is used as an object of arithmetic operation.

* * * * *

UNITED STATES PATENT AND TRADEMARK OFFICE
CERTIFICATE OF CORRECTION

| | | |
|---|---|---|
| PATENT NO. | : 6,832,038 B1 | Page 1 of 1 |
| APPLICATION NO. | : 09/646889 | |
| DATED | : December 14, 2004 | |
| INVENTOR(S) | : T. Hosoda | |

It is certified that error appears in the above-identified patent and that said Letters Patent is hereby corrected as shown below:

On the cover of the printed patent, at Item (57), Abstract, line 19, "device" should be --means--.

On the cover of the printed patent, at Item (73), the "assignee" should be listed as --Matsushita Electric Industrial Co., Ltd.--.

Signed and Sealed this

Nineteenth Day of December, 2006

JON W. DUDAS
*Director of the United States Patent and Trademark Office*